(12) United States Patent
Kobayashi et al.

(10) Patent No.: US 8,289,829 B2
(45) Date of Patent: Oct. 16, 2012

(54) INFORMATION RECORDING MEDIUM AND RECORDING/REPRODUCTION APPARATUS

(75) Inventors: Isao Kobayashi, Osaka (JP); Atsushi Nakamura, Osaka (JP); Yasumori Hino, Nara (JP)

(73) Assignee: Panasonic Corporation, Osaka (JP)

( * ) Notice: Subject to any disclaimer, the term of this patent is extended or adjusted under 35 U.S.C. 154(b) by 132 days.

(21) Appl. No.: 12/570,063

(22) Filed: Sep. 30, 2009

(65) Prior Publication Data

US 2010/0142338 A1    Jun. 10, 2010

Related U.S. Application Data

(63) Continuation-in-part of application No. 12/243,086, filed on Oct. 1, 2008.

(51) Int. Cl.
 *G11B 7/0045* (2006.01)
(52) U.S. Cl. .................. 369/59.11; 369/59.1; 369/59.12; 369/47.15; 369/53.2; 369/275.1
(58) Field of Classification Search .................... None
See application file for complete search history.

(56) References Cited

U.S. PATENT DOCUMENTS

| | | | |
|---|---|---|---|
| 6,631,110 B1 | 10/2003 | Seo et al. | |
| 7,082,566 B2 | 7/2006 | Kashihara et al. | |
| 7,336,589 B2 | 2/2008 | Kato et al. | |
| 2005/0078579 A1* | 4/2005 | Miyashita et al. | 369/53.13 |
| 2006/0067189 A1 | 3/2006 | Miyashita et al. | |
| 2006/0072403 A1 | 4/2006 | Matsui | |
| 2006/0274625 A1 | 12/2006 | Nakamura et al. | |
| 2007/0121450 A1 | 5/2007 | Shoji et al. | |
| 2007/0127341 A1 | 6/2007 | Sagara et al. | |

(Continued)

FOREIGN PATENT DOCUMENTS

JP    2004-335079    11/2004

(Continued)

OTHER PUBLICATIONS

International Search Report for corresponding Application No. PCT/JP2009/004893 mailed Dec. 22, 2009.
Form PCT/ISA/237 for corresponding Application No. PCT/JP2009/004893 and partial English translation.
International Search Report for corresponding Application No. PCT/JP2009/004892 mailed Dec. 22, 2009.
Form PCT/ISA/237 for corresponding Application No. PCT/JP2009/004892 and partial English translation.

(Continued)

*Primary Examiner* — Joseph Haley
*Assistant Examiner* — Ifedayo Iluyomade
(74) *Attorney, Agent, or Firm* — Renner, Otto, Boisselle & Sklar, LLP

(57) ABSTRACT

An information recording medium according to the present invention includes a track on which a data sequence including a plurality of recording marks and a plurality of spaces provided between the plurality of recording marks is recordable; and a recording condition recording area in which a recording condition for recording the data sequence on the track is recordable. Where a recording mark which is included in the data sequence and is to be formed on the track based on the recording condition is a first recording mark, when a length of the first recording mark is longer than a prescribed length, the recording condition is classified using a combination of the length of the first recording mark and a length of a first space located adjacently previous or subsequent to the first recording mark, and when the length of the first recording mark is equal to or shorter than the prescribed length, the recording condition is classified using a combination of the length of the first recording mark, the length of the first space, and a length of a second space not located adjacent to the first space and located adjacent to the first recoding mark.

9 Claims, 38 Drawing Sheets

| M (i) | 2Tm | | 3Tm | 4Tm | ≧5Tm |
|---|---|---|---|---|---|
| S(i+1) \ S(i-1) | 2Ts | !2Ts | xTs | | |
| 2Ts | 2s2Tm2s | 2s2Tm!2s | (2s3Tm) | (2s4Tm) | (2s5Tm) |
| 3Ts | 3s2Tm2s | 3s2Tm!2s | (3s3Tm) | (3s4Tm) | (3s5Tm) |
| 4Ts | 4s2Tm2s | 4s2Tm!2s | (4s3Tm) | (4s4Tm) | (4s5Tm) |
| ≧5Ts | 5s2Tm2s | 5s2Tm!2s | (5s3Tm) | (5s4Tm) | (5s5Tm) |

| M (i) | 2Tm | | | 3Tm | 4Tm | ≧5Tm |
|---|---|---|---|---|---|---|
| S (i+1) | 2Ts | | !2Ts | xTs | | |
| M(i+2) \ S(i-1) | 2Tm | !2Tm | | xTm | | |
| 2Ts | 2s2Tm2s2m | 2s2Tm2s!2m | 2s2Tm!2s | (2s3Tm) | (2s4Tm) | (2s5Tm) |
| 3Ts | 3s2Tm2s2m | 3s2Tm2s!2m | 3s2Tm!2s | (3s3Tm) | (3s4Tm) | (3s5Tm) |
| 4Ts | 4s2Tm2s2m | 4s2Tm2s!2m | 4s2Tm!2s | (4s3Tm) | (4s4Tm) | (4s5Tm) |
| ≧5Ts | 5s2Tm2s2m | 5s2Tm2s!2m | 5s2Tm!2s | (5s3Tm) | (5s4Tm) | (5s5Tm) |

U.S. PATENT DOCUMENTS

| | | | |
|---|---|---|---|
| 2007/0165506 A1* | 7/2007 | Nakamura et al. | 369/59.11 |
| 2007/0291621 A1* | 12/2007 | Aoyama et al. | 369/116 |
| 2008/0025180 A1 | 1/2008 | Aoyama et al. | |
| 2008/0151726 A1 | 6/2008 | Yamakawa et al. | |
| 2008/0159104 A1 | 7/2008 | Miyashita et al. | |
| 2008/0165651 A1 | 7/2008 | Miyashita et al. | |
| 2008/0205221 A1 | 8/2008 | Kakimoto et al. | |
| 2009/0034381 A1 | 2/2009 | Shoji et al. | |
| 2009/0073835 A1 | 3/2009 | Adachi et al. | |
| 2009/0103412 A1 | 4/2009 | Miyashita et al. | |
| 2010/0080095 A1* | 4/2010 | Kobayashi et al. | 369/47.15 |
| 2010/0309773 A1* | 12/2010 | Kobayashi et al. | 369/275.2 |

FOREIGN PATENT DOCUMENTS

| | | |
|---|---|---|
| JP | 2005-092952 | 4/2005 |
| JP | 2005-243234 | 9/2005 |
| JP | 2007-317334 | 12/2007 |
| JP | 2008-112509 | 5/2008 |
| WO | 2005/066940 A1 | 7/2005 |
| WO | 2008/081820 | 10/2008 |

OTHER PUBLICATIONS

Illustrated Blu-ray Disc Reader published by Ohmsha, Ltd., Dec. 10, 2006, pp. 144-155 and pp. 246-247 with a partial English translation.
Adaptive signal Processing Algorithm published by Baifukan Co., Ltd., Jul. 19, 2000, pp. 32-35 with a partial English translation.
Illustrated Blu-ray Disc Reader published by Ohmsha, Ltd., Dec. 10, 2006, pp. 247-248.
Blu-ray Disc Reader ("Illustrated Blu-Ray Disc Reader") published by Ohmsha, Ltd., Dec. 10, 2006, pp. 247-248 with a partial English translation.
Blu-ray Disc Reader ("Illustrated Blu-Ray Disc Reader") published by Ohmsha, Ltd., Dec. 10, 2006, pp. 13-28 and a concise explanation.
White paper, Blu-ray Disc Format, General, Aug. 2004, pp. 1-37.
White paper, Blu-ray Disc Format, 3. File System Specifications for BD-RE, R, ROM, Aug. 2004, pp. 1-6.
White paper, Blu-ray Disc Format, 4. Key Technologies, Aug. 2004, pp. 1-8.
Office Action for U.S. Appl. No. 12/243,086 mailed on Dec. 9, 2011.

* cited by examiner

| LEADING | | RECORDING MARK M(i) | | | |
|---|---|---|---|---|---|
| | | 2Tm | 3Tm | 4Tm | ≧5Tm |
| IMMEDIATELY PREVIOUS SPACE S(i-1) | 2Ts | 2Ts2Tm | 2Ts3Tm | 2Ts4Tm | 2Ts5Tm |
| | 3Ts | 3Ts2Tm | 3Ts3Tm | 3Ts4Tm | 3Ts5Tm |
| | 4Ts | 4Ts2Tm | 4Ts3Tm | 4Ts4Tm | 4Ts5Tm |
| | ≧5Ts | 5Ts2Tm | 5Ts3Tm | 5Ts4Tm | 5Ts5Tm |

| TRAILING | | RECORDING MARK M(i) | | | |
|---|---|---|---|---|---|
| | | 2Tm | 3Tm | 4Tm | ≧5Tm |
| IMMEDIATELY SUBSEQUENT SPACE S(i+1) | 2Ts | 2Tm2Ts | 3Tm2Ts | 4Tm2Ts | 5Tm2Ts |
| | 3Ts | 2Tm3Ts | 3Tm3Ts | 4Tm3Ts | 5Tm3Ts |
| | 4Ts | 2Tm4Ts | 3Tm4Ts | 4Tm4Ts | 5Tm4Ts |
| | ≧5Ts | 2Tm5Ts | 3Tm5Ts | 4Tm5Ts | 5Tm5Ts |

FIG.8

| State Transition | Transition Data Sequence $(b_{k-i}, \cdots, b_k)$ | Pattern | k-9 | k-8 | k-7 | k-6 | k-5 | k-4 | k-3 | k-2 | k-1 | k | PR Equalization Ideal Value | | | | | | Square Of Euclidean Distance between Paths |
|---|---|---|---|---|---|---|---|---|---|---|---|---|---|---|---|---|---|---|---|
| $S0_{k-5} \to S6_k$ | (0,0,0,0,x,1,1,0,0) | [14]1A | | | | | S0 | S1 | S2 | S3 | S5 | S6 | 1 | 3 | 5 | 6 | 6 | 5 | 14 |
| | | [14]1B | | | | | S0 | S0 | S1 | S2 | S9 | S6 | 0 | 1 | 3 | 5 | 4 | 4 | |
| $S0_{k-5} \to S5_k$ | (0,0,0,0,x,1,1,1,0) | [14]2A | | | | | S0 | S1 | S2 | S3 | S4 | S5 | 1 | 3 | 5 | 7 | 7 | 7 | 14 |
| | | [14]2B | | | | | S0 | S0 | S1 | S2 | S3 | S5 | 0 | 1 | 3 | 5 | 5 | 6 | |
| $S0_{k-5} \to S4_k$ | (0,0,0,0,x,1,1,1,1) | [14]3A | | | | | S0 | S1 | S2 | S3 | S4 | S4 | 1 | 3 | 5 | 7 | 7 | 8 | 14 |
| | | [14]3B | | | | | S0 | S0 | S1 | S2 | S3 | S4 | 0 | 1 | 3 | 5 | 5 | 7 | |
| $S2_{k-5} \to S0_k$ | (0,0,1,1,x,0,0,0,0) | [14]4A | | | | | S2 | S9 | S6 | S7 | S0 | S0 | 5 | 6 | 5 | 3 | 1 | 0 | 14 |
| | | [14]4B | | | | | S2 | S3 | S5 | S6 | S7 | S0 | 4 | 4 | 3 | 1 | 0 | 1 | |
| $S2_{k-5} \to S1_k$ | (0,0,1,1,x,0,0,0,1) | [14]5A | | | | | S2 | S9 | S6 | S7 | S0 | S1 | 5 | 6 | 5 | 3 | 1 | 0 | 14 |
| | | [14]5B | | | | | S2 | S3 | S5 | S6 | S7 | S1 | 4 | 4 | 3 | 1 | 0 | 2 | |
| $S2_{k-5} \to S2_k$ | (0,0,1,1,x,0,0,1,1) | [14]6A | | | | | S2 | S9 | S6 | S8 | S1 | S2 | 5 | 6 | 5 | 3 | 1 | 1 | 14 |
| | | [14]6B | | | | | S2 | S3 | S5 | S6 | S8 | S2 | 4 | 4 | 3 | 2 | 2 | 4 | |
| $S3_{k-5} \to S0_k$ | (0,1,1,1,x,0,0,0,0) | [14]7A | | | | | S3 | S4 | S5 | S6 | S7 | S0 | 5 | 5 | 4 | 2 | 1 | 3 | 14 |
| | | [14]7B | | | | | S3 | S4 | S5 | S6 | S7 | S0 | 7 | 7 | 5 | 3 | 1 | 0 | |
| $S3_{k-5} \to S1_k$ | (0,1,1,1,x,0,0,0,1) | [14]8A | | | | | S3 | S4 | S5 | S6 | S7 | S1 | 6 | 7 | 5 | 3 | 1 | 2 | 14 |
| | | [14]8B | | | | | S3 | S5 | S6 | S7 | S0 | S1 | 6 | 5 | 3 | 1 | 4 | 1 | |
| $S3_{k-5} \to S2_k$ | (0,1,1,1,x,0,0,1,1) | [14]9A | | | | | S3 | S4 | S5 | S6 | S8 | S2 | 7 | 7 | 5 | 3 | 2 | 4 | 14 |
| | | [14]9B | | | | | S3 | S5 | S6 | S8 | S1 | S2 | 6 | 5 | 3 | 2 | 1 | 3 | |
| $S7_{k-5} \to S6_k$ | (1,0,0,0,x,1,1,0,0) | [14]10A | | | | | S7 | S0 | S1 | S2 | S3 | S5 | 2 | 3 | 5 | 6 | 6 | 5 | 14 |
| | | [14]10B | | | | | S7 | S1 | S2 | S3 | S5 | S6 | 1 | 1 | 3 | 5 | 4 | 4 | |
| $S7_{k-5} \to S5_k$ | (1,0,0,0,x,1,1,1,0) | [14]11A | | | | | S7 | S0 | S1 | S2 | S3 | S5 | 2 | 3 | 5 | 7 | 7 | 7 | 14 |
| | | [14]11B | | | | | S7 | S1 | S2 | S3 | S4 | S5 | 1 | 1 | 3 | 5 | 5 | 6 | |
| $S7_{k-5} \to S4_k$ | (1,0,0,0,x,1,1,1,1) | [14]12A | | | | | S7 | S0 | S1 | S2 | S3 | S4 | 2 | 3 | 5 | 7 | 7 | 8 | 14 |
| | | [14]12B | | | | | S7 | S1 | S2 | S3 | S4 | S4 | 1 | 1 | 3 | 5 | 5 | 7 | |
| $S6_{k-5} \to S6_k$ | (1,1,0,0,x,1,1,0,0) | [14]13A | | | | | S6 | S8 | S1 | S2 | S3 | S5 | 4 | 4 | 4 | 4 | 5 | 6 | 14 |
| | | [14]13B | | | | | S6 | S7 | S0 | S1 | S2 | S6 | 3 | 2 | 2 | 3 | 5 | 5 | |
| $S6_{k-5} \to S5_k$ | (1,1,0,0,x,1,1,1,0) | [14]14A | | | | | S6 | S8 | S2 | S3 | S4 | S5 | 4 | 4 | 4 | 5 | 5 | 7 | 14 |
| | | [14]14B | | | | | S6 | S7 | S1 | S2 | S3 | S5 | 3 | 2 | 3 | 5 | 6 | 6 | |
| $S6_{k-5} \to S4_k$ | (1,1,0,0,x,1,1,1,1) | [14]15A | | | | | S6 | S8 | S2 | S3 | S4 | S4 | 4 | 4 | 4 | 5 | 5 | 7 | 14 |
| | | [14]15B | | | | | S6 | S7 | S1 | S2 | S3 | S4 | 3 | 2 | 3 | 5 | 7 | 8 | |
| $S4_{k-5} \to S0_k$ | (1,1,1,1,x,0,0,0,0) | [14]16A | | | | | S4 | S4 | S5 | S6 | S7 | S0 | 8 | 7 | 5 | 3 | 1 | 0 | 14 |
| | | [14]16B | | | | | S4 | S5 | S6 | S7 | S0 | S0 | 7 | 5 | 3 | 1 | 0 | 2 | |
| $S4_{k-5} \to S1_k$ | (1,1,1,1,x,0,0,0,1) | [14]17A | | | | | S4 | S5 | S6 | S7 | S0 | S1 | 8 | 7 | 5 | 3 | 1 | 1 | 14 |
| | | [14]17B | | | | | S4 | S4 | S5 | S6 | S8 | S1 | 7 | 5 | 3 | 1 | 3 | 2 | |
| $S4_{k-5} \to S2_k$ | (1,1,1,1,x,0,0,1,1) | [14]18A | | | | | S4 | S5 | S6 | S8 | S1 | S2 | 8 | 7 | 5 | 3 | 4 | 4 | 14 |
| | | [14]18B | | | | | S4 | S5 | S6 | S7 | S1 | S2 | 7 | 5 | 3 | 2 | 2 | 3 | |

FIG.9

| State Transition | Transition Data Sequence $(b_{k-7}, \cdots, b_k)$ | Pattern | k-9 | k-8 | k-7 | k-6 | k-5 | k-4 | k-3 | k-2 | k-1 | k | PR Equalization Ideal Value | | | | | | | | | Square Of Euclidean Distance between Paths |
|---|---|---|---|---|---|---|---|---|---|---|---|---|---|---|---|---|---|---|---|---|---|---|
| $S0_{k-7} \to S0_k$ | (0,0,0,0,x,1,x,0,0,0,0) | [12A]1A | | | S0 | S0 | S1 | S2 | S6 | S7 | S0 | S0 | 1 | 3 | 4 | 4 | 4 | 3 | 1 | 1 | 0 | |
| | | [12A]1B | | | S0 | S1 | S2 | S9 | S6 | S7 | S0 | S0 | 0 | 1 | 3 | 4 | 4 | 3 | 1 | 3 | 1 | 12 |
| $S0_{k-7} \to S1_k$ | (0,0,0,0,x,1,x,0,0,0,1) | [12A]2A | | | S0 | S0 | S1 | S2 | S6 | S7 | S0 | S1 | 1 | 3 | 4 | 4 | 4 | 3 | 1 | 1 | 1 | |
| | | [12A]2B | | | S0 | S1 | S2 | S9 | S6 | S7 | S0 | S1 | 0 | 1 | 3 | 4 | 4 | 3 | 1 | 3 | 2 | 12 |
| $S0_{k-7} \to S2_k$ | (0,0,0,0,x,1,x,0,0,1,1) | [12A]3A | | | S0 | S0 | S1 | S2 | S6 | S7 | S1 | S2 | 1 | 3 | 4 | 4 | 4 | 3 | 2 | 2 | 3 | |
| | | [12A]3B | | | S0 | S1 | S2 | S9 | S6 | S7 | S1 | S2 | 0 | 1 | 3 | 4 | 4 | 3 | 2 | 4 | 4 | 12 |
| $S2_{k-7} \to S6_k$ | (0,0,1,1,x,0,x,1,1,0,0) | [12A]4A | | | S2 | S3 | S9 | S6 | S8 | S2 | S5 | S6 | 0 | 1 | 3 | 4 | 4 | 4 | 4 | 4 | 4 | |
| | | [12A]4B | | | S2 | S3 | S9 | S6 | S8 | S2 | S5 | S6 | 5 | 6 | 5 | 4 | 4 | 4 | 4 | 4 | 4 | 12 |
| $S2_{k-7} \to S5_k$ | (0,0,1,1,x,0,x,1,1,1,0) | [12A]5A | | | S2 | S3 | S9 | S6 | S8 | S2 | S5 | S5 | 4 | 4 | 4 | 5 | 4 | 4 | 6 | 6 | 5 | |
| | | [12A]5B | | | S2 | S3 | S9 | S6 | S8 | S2 | S5 | S5 | 5 | 6 | 5 | 4 | 4 | 4 | 5 | 5 | 6 | 12 |
| $S2_{k-7} \to S4_k$ | (0,0,1,1,x,0,x,1,1,1,1) | [12A]6A | | | S2 | S3 | S9 | S6 | S8 | S2 | S5 | S4 | 4 | 4 | 4 | 5 | 4 | 4 | 4 | 5 | 7 | |
| | | [12A]6B | | | S2 | S3 | S9 | S6 | S8 | S2 | S5 | S4 | 5 | 6 | 5 | 4 | 4 | 4 | 5 | 7 | 7 | 12 |
| $S3_{k-7} \to S6_k$ | (0,1,1,1,x,0,x,1,1,0,0) | [12A]7A | | | S3 | S9 | S6 | S8 | S2 | S3 | S4 | S6 | 4 | 4 | 4 | 5 | 4 | 4 | 4 | 5 | 4 | |
| | | [12A]7B | | | S3 | S9 | S6 | S8 | S2 | S3 | S4 | S6 | 4 | 4 | 4 | 5 | 4 | 4 | 5 | 6 | 5 | 12 |
| $S3_{k-7} \to S5_k$ | (0,1,1,1,x,0,x,1,1,1,0) | [12A]8A | | | S3 | S9 | S6 | S8 | S2 | S3 | S4 | S5 | 6 | 5 | 4 | 4 | 4 | 5 | 4 | 5 | 6 | |
| | | [12A]8B | | | S3 | S9 | S6 | S8 | S2 | S3 | S4 | S5 | 7 | 7 | 5 | 4 | 4 | 5 | 4 | 5 | 7 | 12 |
| $S3_{k-7} \to S4_k$ | (0,1,1,1,x,0,x,1,1,1,1) | [12A]9A | | | S3 | S9 | S6 | S8 | S2 | S3 | S4 | S4 | 6 | 5 | 4 | 4 | 4 | 5 | 4 | 5 | 7 | |
| | | [12A]9B | | | S3 | S9 | S6 | S8 | S2 | S3 | S4 | S4 | 7 | 7 | 5 | 4 | 4 | 5 | 4 | 5 | 7 | 12 |
| $S7_{k-7} \to S0_k$ | (1,0,0,0,x,1,x,0,0,0,0) | [12A]10A | | | S7 | S1 | S0 | S1 | S2 | S6 | S7 | S0 | 6 | 5 | 4 | 4 | 4 | 3 | 1 | 1 | 0 | |
| | | [12A]10B | | | S7 | S0 | S1 | S2 | S9 | S6 | S7 | S0 | 2 | 3 | 1 | 3 | 4 | 3 | 1 | 3 | 1 | 12 |
| $S7_{k-7} \to S1_k$ | (1,0,0,0,x,1,x,0,0,0,1) | [12A]11A | | | S7 | S1 | S0 | S1 | S2 | S6 | S7 | S1 | 1 | 1 | 3 | 4 | 4 | 3 | 1 | 1 | 1 | |
| | | [12A]11B | | | S7 | S0 | S1 | S2 | S9 | S6 | S7 | S1 | 2 | 3 | 1 | 3 | 4 | 3 | 1 | 3 | 2 | 12 |
| $S7_{k-7} \to S2_k$ | (1,0,0,0,x,1,x,0,0,1,1) | [12A]12A | | | S7 | S1 | S0 | S1 | S2 | S6 | S7 | S2 | 1 | 1 | 3 | 4 | 4 | 3 | 2 | 2 | 3 | |
| | | [12A]12B | | | S7 | S0 | S1 | S2 | S9 | S6 | S7 | S2 | 2 | 3 | 1 | 3 | 4 | 3 | 2 | 4 | 4 | 12 |
| $S6_{k-7} \to S0_k$ | (1,1,0,0,x,1,x,0,0,0,0) | [12A]13A | | | S6 | S8 | S7 | S1 | S0 | S1 | S7 | S0 | 4 | 4 | 4 | 3 | 4 | 3 | 1 | 1 | 0 | |
| | | [12A]13B | | | S6 | S7 | S1 | S2 | S9 | S6 | S7 | S0 | 3 | 2 | 3 | 4 | 4 | 3 | 1 | 3 | 1 | 12 |
| $S6_{k-7} \to S1_k$ | (1,1,0,0,x,1,x,0,0,0,1) | [12A]14A | | | S6 | S8 | S7 | S1 | S0 | S1 | S7 | S1 | 4 | 4 | 4 | 3 | 4 | 3 | 1 | 1 | 1 | |
| | | [12A]14B | | | S6 | S7 | S1 | S2 | S9 | S6 | S7 | S1 | 3 | 2 | 3 | 4 | 4 | 3 | 1 | 3 | 2 | 12 |
| $S6_{k-7} \to S2_k$ | (1,1,0,0,x,1,x,0,0,1,1) | [12A]15A | | | S6 | S8 | S7 | S1 | S0 | S1 | S7 | S2 | 4 | 4 | 4 | 3 | 4 | 3 | 2 | 2 | 3 | |
| | | [12A]15B | | | S6 | S7 | S1 | S2 | S9 | S6 | S7 | S2 | 3 | 2 | 3 | 4 | 4 | 3 | 2 | 4 | 4 | 12 |
| $S4_{k-7} \to S6_k$ | (1,1,1,1,x,0,x,1,1,0,0) | [12A]16A | | | S4 | S5 | S6 | S8 | S2 | S3 | S4 | S6 | 8 | 7 | 5 | 4 | 4 | 4 | 4 | 4 | 4 | |
| | | [12A]16B | | | S4 | S5 | S6 | S8 | S2 | S3 | S4 | S6 | 7 | 5 | 4 | 4 | 4 | 4 | 4 | 6 | 5 | 12 |
| $S4_{k-7} \to S5_k$ | (1,1,1,1,x,0,x,1,1,1,0) | [12A]17A | | | S4 | S5 | S6 | S8 | S2 | S3 | S4 | S5 | 8 | 7 | 5 | 4 | 4 | 5 | 4 | 5 | 6 | |
| | | [12A]17B | | | S4 | S5 | S6 | S8 | S2 | S3 | S4 | S5 | 7 | 5 | 4 | 4 | 4 | 5 | 5 | 7 | 7 | 12 |
| $S4_{k-7} \to S4_k$ | (1,1,1,1,x,0,x,1,1,1,1) | [12A]18A | | | S4 | S5 | S6 | S8 | S2 | S3 | S4 | S4 | 8 | 7 | 5 | 4 | 4 | 5 | 4 | 5 | 7 | |
| | | [12A]18B | | | S4 | S5 | S6 | S8 | S2 | S3 | S4 | S4 | 7 | 5 | 4 | 4 | 4 | 5 | 5 | 7 | 8 | 12 |

FIG. 10

| State Transition | Transition Data Sequence $(b_{k-i}, \cdots, b_k)$ | Pattern | k-9 | k-8 | k-7 | k-6 | k-5 | k-4 | k-3 | k-2 | k-1 | k | PR Equalization Ideal Value | | | | | | | | | | | Square Of Euclidean Distance between Paths |
|---|---|---|---|---|---|---|---|---|---|---|---|---|---|---|---|---|---|---|---|---|---|---|---|
| $S0_{k-9} \to S6_k$ | (0,0,0,0,x,1,!x,0,x,1,1,0,0) | [12B]1A | S0 | S1 | S2 | S6 | S8 | S8 | S2 | S3 | S5 | S6 | 1 | 3 | 4 | 4 | 4 | 5 | 6 | 6 | 5 | | 12 |
| | | [12B]1B | S0 | S0 | S1 | S2 | S9 | S9 | S8 | S2 | S9 | S6 | 0 | 1 | 3 | 4 | 4 | 4 | 4 | 4 | 4 | | |
| $S0_{k-9} \to S5_k$ | (0,0,0,0,x,1,!x,0,x,1,1,1,0) | [12B]2A | S0 | S1 | S2 | S6 | S8 | S8 | S2 | S3 | S4 | S5 | 1 | 3 | 4 | 4 | 4 | 5 | 6 | 7 | 7 | | 12 |
| | | [12B]2B | S0 | S0 | S1 | S2 | S9 | S9 | S8 | S2 | S3 | S5 | 0 | 1 | 3 | 4 | 4 | 4 | 4 | 5 | 6 | | |
| $S0_{k-9} \to S4_k$ | (0,0,0,0,x,1,!x,0,x,1,1,1,1) | [12B]3A | S0 | S1 | S2 | S6 | S8 | S8 | S2 | S3 | S4 | S4 | 1 | 3 | 4 | 4 | 4 | 5 | 6 | 7 | 8 | | 12 |
| | | [12B]3B | S0 | S0 | S1 | S2 | S9 | S9 | S8 | S2 | S3 | S4 | 0 | 1 | 3 | 4 | 4 | 4 | 4 | 5 | 7 | | |
| $S0_{k-9} \to S0_k$ | (0,0,1,1,x,0,!x,1,x,0,0,0,0) | [12B]4A | S2 | S3 | S5 | S6 | S6 | S6 | S7 | S0 | S0 | S0 | 1 | 3 | 4 | 4 | 4 | 4 | 3 | 1 | 0 | | 12 |
| | | [12B]4B | S2 | S3 | S4 | S4 | S5 | S6 | S7 | S0 | S0 | S0 | 0 | 1 | 3 | 4 | 4 | 4 | 4 | 3 | 1 | | |
| $S2_{k-9} \to S0_k$ | (0,0,1,1,x,0,!x,1,x,0,0,0,1) | [12B]5A | S2 | S3 | S5 | S6 | S6 | S6 | S7 | S0 | S0 | S1 | 1 | 3 | 4 | 4 | 4 | 4 | 3 | 1 | 0 | | 12 |
| | | [12B]5B | S2 | S3 | S4 | S4 | S5 | S6 | S7 | S0 | S0 | S1 | 0 | 1 | 3 | 4 | 4 | 4 | 4 | 3 | 1 | | |
| $S2_{k-9} \to S1_k$ | (0,0,1,1,x,0,!x,1,x,0,0,1,1) | [12B]6A | S2 | S3 | S5 | S6 | S6 | S6 | S7 | S0 | S1 | S2 | 1 | 3 | 4 | 4 | 4 | 4 | 3 | 1 | 0 | | 12 |
| | | [12B]6B | S2 | S3 | S4 | S4 | S5 | S6 | S7 | S0 | S1 | S2 | 0 | 1 | 3 | 4 | 4 | 4 | 4 | 3 | 1 | | |
| $S2_{k-9} \to S2_k$ | (0,1,1,1,x,0,!x,1,x,0,0,0,0) | [12B]7A | S3 | S4 | S5 | S5 | S6 | S7 | S0 | S0 | S0 | S0 | 0 | 7 | 5 | 4 | 4 | 4 | 4 | 3 | 1 | | 12 |
| | | [12B]7B | S3 | S4 | S4 | S5 | S6 | S7 | S0 | S0 | S0 | S0 | 6 | 5 | 7 | 4 | 4 | 4 | 4 | 3 | 1 | | |
| $S3_{k-9} \to S0_k$ | (0,1,1,1,x,0,!x,1,x,0,0,0,1) | [12B]8A | S3 | S4 | S5 | S5 | S6 | S7 | S0 | S0 | S0 | S1 | 7 | 5 | 7 | 4 | 4 | 4 | 4 | 3 | 1 | | 12 |
| | | [12B]8B | S3 | S4 | S4 | S5 | S6 | S7 | S0 | S0 | S0 | S1 | 6 | 5 | 7 | 4 | 4 | 4 | 4 | 3 | 1 | | |
| $S3_{k-9} \to S1_k$ | (0,1,1,1,x,0,!x,1,x,0,0,1,1) | [12B]9A | S3 | S4 | S5 | S5 | S6 | S7 | S0 | S0 | S1 | S2 | 7 | 5 | 7 | 4 | 4 | 4 | 4 | 3 | 1 | | 12 |
| | | [12B]9B | S3 | S4 | S4 | S5 | S6 | S7 | S0 | S0 | S1 | S2 | 6 | 5 | 7 | 4 | 4 | 4 | 4 | 3 | 1 | | |
| $S3_{k-9} \to S2_k$ | (1,0,0,0,x,1,!x,0,x,1,1,0,0) | [12B]10A | S7 | S1 | S2 | S6 | S8 | S8 | S2 | S3 | S5 | S6 | 2 | 1 | 3 | 4 | 4 | 4 | 5 | 6 | 5 | | 12 |
| | | [12B]10B | S7 | S0 | S1 | S2 | S9 | S9 | S8 | S2 | S3 | S6 | 2 | 1 | 3 | 4 | 4 | 4 | 4 | 4 | 4 | | |
| $S7_{k-9} \to S6_k$ | (1,0,0,0,x,1,!x,0,x,1,1,1,0) | [12B]11A | S7 | S1 | S2 | S6 | S8 | S8 | S2 | S3 | S4 | S5 | 2 | 1 | 3 | 4 | 4 | 4 | 5 | 7 | 7 | | 12 |
| | | [12B]11B | S7 | S0 | S1 | S2 | S9 | S9 | S8 | S2 | S3 | S5 | 2 | 1 | 3 | 4 | 4 | 4 | 4 | 5 | 6 | | |
| $S7_{k-9} \to S5_k$ | (1,0,0,0,x,1,!x,0,x,1,1,1,1) | [12B]12A | S7 | S1 | S2 | S6 | S8 | S8 | S2 | S3 | S4 | S4 | 2 | 1 | 3 | 4 | 4 | 4 | 5 | 7 | 8 | | 12 |
| | | [12B]12B | S7 | S0 | S1 | S2 | S9 | S9 | S8 | S2 | S3 | S4 | 2 | 1 | 3 | 4 | 4 | 4 | 4 | 5 | 7 | | |
| $S7_{k-9} \to S4_k$ | (1,1,0,0,x,1,!x,0,x,0,1,1,0,0) | [12B]13A | S6 | S8 | S8 | S2 | S3 | S5 | S5 | S6 | S7 | | | | | | | | | | | | |
| $S6_{k-9} \to S6_k$ | (1,1,0,0,x,1,!x,0,x,1,1,0,0) | [12B]13B | S6 | S7 | S8 | S8 | S8 | S2 | S3 | S5 | S6 | 4 | 3 | 1 | 3 | 4 | 4 | 5 | 6 | 6 | 5 | | 12 |
| | | [12B]14A | S6 | S8 | S8 | S2 | S3 | S5 | S6 | 4 | 4 | 1 | 3 | 4 | 4 | 4 | 4 | 4 | 4 | | | | |
| $S6_{k-9} \to S5_k$ | (1,1,0,0,x,1,!x,0,x,1,1,1,0) | [12B]14B | S6 | S7 | S8 | S8 | S8 | S2 | S3 | S4 | S5 | 4 | 3 | 1 | 3 | 4 | 4 | 5 | 7 | 7 | | 12 |
| | | [12B]15A | S6 | S8 | S8 | S2 | S3 | S4 | S5 | 4 | 4 | 1 | 3 | 4 | 4 | 4 | 5 | 6 | | | | | |
| $S6_{k-9} \to S4_k$ | (1,1,0,0,x,1,!x,0,x,1,1,1,1) | [12B]15B | S6 | S7 | S8 | S8 | S8 | S2 | S3 | S4 | S4 | 4 | 3 | 1 | 3 | 4 | 4 | 5 | 7 | 8 | | 12 |
| | | [12B]16A | S6 | S8 | S8 | S2 | S3 | S4 | S4 | 4 | 4 | 1 | 3 | 4 | 4 | 4 | 5 | 7 | | | | | |
| $S4_{k-9} \to S0_k$ | (1,1,1,1,x,0,!x,1,x,0,0,0,0) | [12B]16B | S4 | S5 | S6 | S6 | S6 | S7 | S0 | S0 | S0 | 8 | 7 | 5 | 4 | 4 | 4 | 4 | 3 | 1 | 0 | | 12 |
| | | [12B]17A | S4 | S4 | S5 | S6 | S7 | S0 | S0 | S0 | 7 | 5 | 7 | 4 | 4 | 4 | 3 | 1 | | | | | |
| $S4_{k-9} \to S1_k$ | (1,1,1,1,x,0,!x,1,x,0,0,0,1) | [12B]17B | S4 | S5 | S6 | S6 | S6 | S7 | S0 | S0 | S1 | 8 | 7 | 5 | 4 | 4 | 4 | 4 | 3 | 1 | | 12 |
| | | [12B]18A | S4 | S4 | S5 | S6 | S7 | S0 | S0 | S1 | 7 | 5 | 7 | 4 | 4 | 4 | 3 | 1 | | | | | |
| $S4_{k-9} \to S2_k$ | (1,1,1,1,x,0,!x,1,x,0,0,1,1) | [12B]18B | S4 | S4 | S5 | S6 | S7 | S0 | S1 | S2 | 7 | 5 | 7 | 4 | 4 | 4 | 3 | 2 | | | | | 12 |

FIG.15

LEADING

| | M(i) / S(i+1) | M(i+2) / S(i-1) | 2Tm | 2Ts | 2Tm | 3Tm | 4Tm | ≥5Tm |
|---|---|---|---|---|---|---|---|---|
| S(i-3) | M(i-2) | | !2Tm | | !2Ts | xTs | xTs | xTs |
| 2Ts | 2Tm | 2Ts | | | xTm | xTm | xTm | xTm |
| !2Ts | !2Tm | | | | | | | |
| xTs | xTm | | | | [14]13A | [14]14A | [14]15A | |
| 3Ts | | | | [14]13B | [14]10A, [14]14B | [14]11A, [14]15B | [14]12A | |
| 4Ts | | | | [14]10B | [14]11A, [14]11B | [14]2A, [14]12B | [14]3A | |
| ≥5Ts | | | | [14]1B | [14]2B | [14]3B | [14]3A, [14]3B | |

TRAILING

| | M(i) / S(i-1) | M(i+2) / S(i+1) | 2Tm | 2Ts | 2Tm | 3Tm | 4Tm | ≥5Tm |
|---|---|---|---|---|---|---|---|---|
| S(i+3) | M(i+2) | | !2Tm | | !2Ts | xTs | xTs | xTs |
| 2Ts | 2Tm | 2Ts | | | xTm | xTm | xTm | xTm |
| !2Ts | !2Tm | | | | | | | |
| xTs | xTm | | | | [14]6A | [14]9A | [14]18A | |
| 3Ts | | | | [14]6B | [14]5A, [14]9B | [14]8A, [14]18B | [14]17A | |
| 4Ts | | | | [14]5B | [14]4A, [14]18B | [14]7A, [14]17B | [14]16A | |
| ≥5Ts | | | | [14]4B | [14]7B | [14]16B | [14]16A, [14]16B | |

FIG.16

LEADING

| S(i-3) | M(i-2) | M(i) / S(i+1) / M(i+2) / S(i-1) | 2Tm | 2Ts / !2Ts | 2Tm | 3Tm / xTs / xTm | 4Tm / xTs / xTm | ≥5Tm / xTs / xTm |
|---|---|---|---|---|---|---|---|---|
| 2Ts | 2Tm | 2Ts | | | | [12A] 4B | [12A] 5B | [12A] 6B |
| !2Ts | | | | | | [12A]7B, [12A]16B | [12A]8B, [12A]17B | [12A]9B, [12A]17B [12A]18B |
| xTs | !2Tm | 3Ts | | [12A] 15B | | | | |
| | | 4Ts | | [12A] 12B | | | | |
| | xTm | ≥5Ts | | [12A]3B | [12A]13B, [12A]14B [12A]10B, [12A]11B [12A]1B, [12A]2B | | | |

TRAILING

| S(i+3) | M(i+2) | M(i) / S(i-1) / M(i+2) / S(i+1) | 2Tm | 2Ts / !2Ts | 2Tm | 3Tm / xTs / xTm | 4Tm / xTs / xTm | ≥5Tm / xTs / xTm |
|---|---|---|---|---|---|---|---|---|
| 2Ts | 2Tm | 2Ts | | | | [12A] 4A | [12A] 7A | [12A] 16A |
| !2Ts | | | | | | [12A]5A, [12A]6A | [12A]8A, [12A]9A | [12A]17A, [12A]18A |
| xTs | !2Tm | 3Ts | | [12A] 15A | [12A]3A, [12A]12A | | | |
| | | 4Ts | | [12A] 14A | [12A]2A, [12A]11A | | | |
| | xTm | ≥5Ts | | [12A] 13A | [12A]1A, [12A]10A | | | |

FIG.17

LEADING

| | | M(i) S(i+1) | | | | | | |
|---|---|---|---|---|---|---|---|---|
| | | M(i+2) S(i-1) | 2Tm 2Ts | 2Tm 12Ts | 3Tm xTs | 4Tm xTs | ≥5Tm xTs |
| | M(i-2) | S(i-3) | 2Tm | 12Tm | xTm | xTm | xTm |
| 2Ts | 2Tm | | | | | | [12B] 15A |
| 12Ts | | | | | | [12B] 14A | [12B]3A, [12B]12A |
| | 12Tm | | | | [12B] 13A | [12B]2A, [12B]11A | |
| xTs | xTm | 3Ts | [12B] 13B | [12B]14B, [12B]15B | [12B]1A, [12B]10A | | |
| | | 4Ts | [12B] 10B | [12B]11B, [12B]12B | | | |
| | | ≥5Ts | [12B] 1B | [12B]2B, [12B]3B | | | |

TRAILING

| | | M(i) S(i-1) | | | | | | |
|---|---|---|---|---|---|---|---|---|
| | | M(i-2) S(i+1) | 2Tm 2Ts | 2Tm 12Ts | 3Tm xTs | 4Tm xTs | ≥5Tm xTs |
| | M(i+2) | S(i+3) | 2Tm | 12Tm | xTm | xTm | xTm |
| 2Ts | 2Tm | | | | | | [12B] 18A |
| 12Ts | | | | | | [12B] 9A | [12B]16A, [12B]17A |
| | 12Tm | | | | [12B] 6A | [12B]7A, [12B]8A | |
| xTs | xTm | 3Ts | [12B] 6B | [12B]9B, [12B]18B | [12B]4A, [12B]5A | | |
| | | 4Ts | [12B] 5B | [12B]8B, [12B]17B | | | |
| | | ≥5Ts | [12B] 4B | [12B]7B, [12B]16B | | | |

FIG.18

| M(i-2) | S(i-1) | M(i) 2Tm | 3Tm | 4Tm | ≥5Tm |
|---|---|---|---|---|---|
| 2Tm | 2Ts | 2m2s2Tm | 2m2s3Tm | 2m2s4Tm | 2m2s5Tm |
| !2Tm | | !2m2s2Tm | !2m2s3Tm | !2m2s4Tm | !2m2s5Tm |
| xTm | 3Ts | (3s2Tm) | (3s3Tm) | (3s4Tm) | (3s5Tm) |
| | 4Ts | (4s2Tm) | (4s3Tm) | (4s4Tm) | (4s5Tm) |
| | ≥5Ts | (5s2Tm) | (5s3Tm) | (5s4Tm) | (5s5Tm) |

FIG.20

| S(i-3) | M(i-2) | S(i-1) | M(i) 2Tm | 3Tm | 4Tm | ≥5Tm |
|---|---|---|---|---|---|---|
| 2Ts | 2Tm | 2Ts | 2s2m2s2Tm | 2s2m2s3Tm | 2s2m2s4Tm | 2s2m2s5Tm |
| !2Ts | 2Tm | 2Ts | !2s2m2s2Tm | !2s2m2s3Tm | !2s2m2s4Tm | !2s2m2s5Tm |
| xTs | !2Tm | 2Ts | !2m2s2Tm | !2m2s3Tm | !2m2s4Tm | !2m2s5Tm |
| xTs | xTm | 3Ts | (3s2Tm) | (3s3Tm) | (3s4Tm) | (3s5Tm) |
| xTs | xTm | 4Ts | (4s2Tm) | (4s3Tm) | (4s4Tm) | (4s5Tm) |
| xTs | xTm | ≥5Ts | (5s2Tm) | (5s3Tm) | (5s4Tm) | (5s5Tm) |

FIG.22

| M(i) | 2Tm | | 3Tm | 4Tm | ≧5Tm |
|---|---|---|---|---|---|
| S(i+1) \ S(i-1) | 2Ts | !2Ts | | xTs | |
| 2Ts | 2s2Tm2s | 2s2Tm!2s | (2s3Tm) | (2s4Tm) | (2s5Tm) |
| 3Ts | 3s2Tm2s | 3s2Tm!2s | (3s3Tm) | (3s4Tm) | (3s5Tm) |
| 4Ts | 4s2Tm2s | 4s2Tm!2s | (4s3Tm) | (4s4Tm) | (4s5Tm) |
| ≧5Ts | 5s2Tm2s | 5s2Tm!2s | (5s3Tm) | (5s4Tm) | (5s5Tm) |

FIG.24

| M(i) | 2Tm | | | 3Tm | 4Tm | ≥5Tm |
|---|---|---|---|---|---|---|
| S(i+1) | 2Ts | | !2Ts | xTs | xTs | xTs |
| M(i+2) | 2Tm | !2Tm | | xTm | | |
| S(i-1) | | | | | | |
| 2Ts | 2s2Tm2s2m | 2s2Tm2s!2m | 2s2Tm!2s | (2s3Tm) | (2s4Tm) | (2s5Tm) |
| 3Ts | 3s2Tm2s2m | 3s2Tm2s!2m | 3s2Tm!2s | (3s3Tm) | (3s4Tm) | (3s5Tm) |
| 4Ts | 4s2Tm2s2m | 4s2Tm2s!2m | 4s2Tm!2s | (4s3Tm) | (4s4Tm) | (4s5Tm) |
| ≥5Ts | 5s2Tm2s2m | 5s2Tm2s!2m | 5s2Tm!2s | (5s3Tm) | (5s4Tm) | (5s5Tm) |

FIG. 26

| M(i+2) | M(i) / S(i+1) | 2Tm | 3Tm | 4Tm | ≧5Tm |
|---|---|---|---|---|---|
| 2Tm | 2Ts | 2Tm2s2m | 3Tm2s2m | 4Tm2s2m | 5Tm2s2m |
| !2Tm | | 2Tm2s!2m | 3Tm2s!2m | 4Tm2s!2m | 5Tm2s!2m |
| xTm | 3Ts | (2Tm3s) | (3Tm3s) | (4Tm3s) | (5Tm3s) |
| | 4Ts | (2Tm4s) | (3Tm4s) | (4Tm4s) | (5Tm4s) |
| | ≧5Ts | (2Tm5s) | (3Tm5s) | (4Tm5s) | (5Tm5s) |

FIG.28

| S(i+3) | M(i+2) | S(i+1) | M(i) 2Tm | 3Tm | 4Tm | ≥5Tm |
|---|---|---|---|---|---|---|
| 2Ts | 2Tm | 2Ts | 2Tm2s2m2s | 3Tm2s2m2s | 4Tm2s2m2s | 5Tm2s2m2s |
| !2Ts | | | 2Tm2s2m!2s | 3Tm2s2m!2s | 4Tm2s2m!2s | 5Tm2s2m!2s |
| | !2Tm | | 2Tm2s!2m | 3Tm2s!2m | 4Tm2s!2m | 5Tm2s!2m |
| xTs | xTm | 3Ts | (2Tm3s) | (3Tm3s) | (4Tm3s) | (5Tm3s) |
| | | 4Ts | (2Tm4s) | (3Tm4s) | (4Tm4s) | (5Tm4s) |
| | | ≥5Ts | (2Tm5s) | (3Tm5s) | (4Tm5s) | (5Tm5s) |

FIG.30

| M(i) S(i-1) \ S(i+1) | 2Tm | | 3Tm | 4Tm | ≥5Tm |
|---|---|---|---|---|---|
| | 2Ts | !2Ts | | xTs | |
| 2Ts | 2s2Tm2s | !2s2Tm2s | | | |
| 3Ts | 2s2Tm3s | !2s2Tm3s | (3Tm2s) | (4Tm2s) | (5Tm2s) |
| 4Ts | 2s2Tm4s | !2s2Tm4s | (3Tm3s) | (4Tm3s) | (5Tm3s) |
| ≥5Ts | 2s2Tm5s | !2s2Tm5s | (3Tm4s) | (4Tm4s) | (5Tm4s) |
| | | | (3Tm5s) | (4Tm5s) | (5Tm5s) |

FIG.32

| M(i) | 2Tm | | | | 3Tm | xTm | 4Tm | ≥5Tm |
|---|---|---|---|---|---|---|---|---|
| S(i-1) | 2Ts | | !2Ts | | | | xTs | |
| S(i+1) \ M(i-2) | 2Tm | !2Tm | | | | | | |
| 2Ts | 2m2s2Tm2s | !2m2s2Tm2s | !2s2Tm2s | | (3Tm2s) | | (4Tm2s) | (5Tm2s) |
| 3Ts | 2m2s2Tm3s | !2m2s2Tm3s | !2s2Tm3s | | (3Tm3s) | | (4Tm3s) | (5Tm3s) |
| 4Ts | 2m2s2Tm4s | !2m2s2Tm4s | !2s2Tm4s | | (3Tm4s) | | (4Tm4s) | (5Tm4s) |
| ≥5Ts | 2m2s2Tm5s | !2m2s2Tm5s | !2s2Tm5s | | (3Tm5s) | | (4Tm5s) | (5Tm5s) |

512    521    210

INFORMATION RECORDING MEDIUM AND RECORDING/REPRODUCTION APPARATUS

This application is a Continuation-in-Part of U.S. patent application Ser. No. 12/243,086 filed on Oct. 1, 2008 which is hereby incorporated herein by reference in its entirely.

BACKGROUND OF THE INVENTION

1. Field of the Invention

The present invention relates to an information recording medium and a recording/reproduction apparatus usable for optically recording information, and specifically to an information recording medium and a recording/reproduction apparatus allowing recording conditions to be adjusted and thus realizing stable high density recording.

2. Description of the Related Art

Various types of recordable information recording mediums have been put into practice for recording video or audio data or storing personal computer data or the like. For example, CD mainly used for recording audio data or storing personal computer data and DVD used for recording video data or storing personal computer data have increasingly spread. Recently, BD (Blu-ray Disc) on which high vision video of high image quality including video of digital broadcasting can be recorded has been put on the market.

The above-described information such as video, audio or personal computer data is recorded on an information recording medium as user data. Specifically, the user data is provided with an error correction code and is modulated into a data sequence including recording marks and spaces having a prescribed range of length. The data sequence is recorded on a track of the information recording medium using a light beam. From the information recorded on the information recording medium, an analog reproduction signal is generated. The analog reproduction signal is specifically generated from reflected light which is obtained by irradiating the track with a light beam and includes information corresponding to the data sequence, namely, the recording marks and spaces. From the reproduction signal, a data sequence, which is a binary signal, is generated. The data sequence is decoded and then subjected with error correction. Thus, user data is obtained.

FIG. 1 shows various types of signals usable for forming a recording mark on an information recording medium. FIG. 1, part (a), shows a channel clock signal of a cycle Tw, which acts as a reference signal used for generating recording data. FIG. 1, part (b), shows an NRZI (Non Return to Zero Inverting) signal, which is a modulation code obtained by modulating information to be recorded.

In the case of, for example, BD, the NRZI signal is obtained by modulating information to be recorded using recording marks and spaces having a length of 2T (2×Tw) to 8T based on the cycle Tw as the reference. FIG. 1, part (b), shows a pattern of 2T mark—2T space—4T mark as a general example of a part of the NRZI signal.

FIG. 1, parts (c) and (d), respectively show a recording pulse sequence of recording laser generated based on the NRZI signal and a data sequence (recording mark sequence) formed on the information recording medium.

A recording mark of each length is formed by a recording pulse sequence including at least a first pulse (also referred to as a "leading pulse"). The recording mark further includes a last pulse and at least one middle pulse located between the first pulse and the last pulse, depending on the length of the recording mark. A pulse width of the first pulse, Ttop, and a pulse width of the last pulse, Tlp, are each set in accordance with the length of the recording mark. A pulse width of the middle pulse, Tmp, is always set to the same length regardless of the length of the recording mark.

A level of the recording pulse sequence, namely, a laser intensity is classified as a peak power Pp201 which provides a heating effect required for forming a recording mark, a bottom power Pb202 having a cooling effect, a cooling power Pc203, and a space power Ps204 which is a recording power in the space. The peak power Pp201, the bottom power Pb202, the cooling power Pc203 and the space power Ps204 are set with respect to an extinction level 205, detected when the laser light is turned off, as the reference level.

The bottom power Pb202 and the cooling power Pc203 are generally set to an equivalent recording power. However, the cooling power Pc203 may be set to a different value from the bottom power Pb202 in order to adjust the heat amount at an end of a recording mark. The space power Ps204 is generally set to a low recording power (for example, a recording power equivalent to a reproduction power or the bottom power) because it is not necessary to form a recording mark in a space. However, for a rewritable optical disc (for example, DVD-RAM or BD-RE), the existing recording mark needs to be erased to create a space. For a write once optical disc (for example, DVD-R or BD-R), a preheating power for creating the next recording mark may be occasionally provided. For these reasons, the space power Ps204 may be set to a relatively high recording power. Even in this case, the space power Ps204 is never set to be a higher value than that of the peak power Pp201.

The recording mark formed by irradiation with laser of a prescribed power depends on the characteristics of each information recording layer of the information recording medium. Therefore, the information recording medium has recorded thereon laser emission conditions for recording such as the laser power value, the pulse width and the like of the recording pulse sequence suitable to the information recording medium. By appropriately reproducing the laser power and the pulse width of the recording pulses recorded in the information recording medium and irradiating the information recording medium with appropriate laser light, a recording mark sequence can be formed.

However, the characteristics of each information recording layer of the information recording medium and the laser emission characteristics of the recording apparatus are varied for an individual information recording medium or an individual recording apparatus. The influence of heat is also varied in accordance with the environment of use. Thermal interference may be caused from an adjacent recording mark. For these reasons, at least each time a new information recording medium is mounted, the recording apparatus generally performs test recording to evaluate the obtained reproduction signal and to fine-tune the pulse shape of the recording laser based on the evaluation results, so that correct recording marks are formed. For example, for each length of recording mark, recording start position offset dTtop for adjusting the start position of the recording mark and the recording end position offset dTs for adjusting the end position of the recording mark are set, and these offset values are adjusted at the time of test recording.

The recording pulses included in the recording pulse sequence may have a mono-pulse waveform, an L-shaped pulse waveform or a castle-type pulse waveform as shown in FIG. 2, parts (a), (b) and (c) in addition to the above-described multi-pulse waveform. In general, with the mono-pulse waveform, as the recording mark is longer, the amount of accumulated heat increases. With the L-shaped pulse waveform, as the recording mark is longer, the amount of accumulated heat decreases. With the castle-type pulse waveform, the heat amount at the end of the recording mark is adjusted. With the multi-pulse waveform, the amount of accumulated heat is constant regardless of the length of the recording mark. In consideration of these, an appropriate waveform is selected in accordance with the layer characteristics of the information recording layer of the information recording medium, especially the characteristics of the accumulated heat.

Recently, as the display precision of video is raised, an information recording medium having a larger capacity is desired. In order to increase the recording density of the information recording medium, the recording marks used for recording information need to be smaller. However, as the recording marks become smaller, the shortest recording mark length is close to the limit of the optical resolution, and so the increase of the inter-symbol interference and the deterioration of the SNR (signal-to-noise ratio) become conspicuous. As a result, the leading edge or the trailing edge of the recording mark cannot be correctly detected, which makes it difficult to correctly decode the recorded information from the reproduction signal.

For this reason, for reproducing information from an information recording medium on which information is recorded with small recording marks, it has become popular to process the reproduction signal using a PRML (Partial Response Maximum Likelihood) system or the like. The PRML system is a combination technology of partial response (PR) and maximum likelihood decoding (ML), and estimates waveforms of the reproduction signal when known inter-symbol interference occurs and selects a most likely signal sequence from the estimated waveforms.

As the recording marks become small, thermal interference occurs. Specifically, the heat at the end of the recording mark is conducted through the space and influences the temperature rise at the start of the subsequent recording mark, or the heat at the start of the subsequent recording mark influences the cooling process at the end of the previous recording mark. When such thermal interference occurs, space compensation needs to be provided by test recording. Space compensation is to change the recording parameters (for example, dTtop) of the recording pulse in accordance with the length of the previous space or the subsequent space.

Japanese Laid-Open Patent Publications Nos. 2004-335079 and 2008-112509, for example, each describe a conventional method for controlling the recording pulse in consideration of the influence of the inter-symbol interference or thermal interference.

According to the method disclosed in Japanese Laid-Open Patent Publication No. 2004-335079, a correct bit stream obtained by correct demodulation and an error bit stream with a maximum likelihood of error, which is generated as a result of one bit of the correct bit stream being shifted, are used to calculate an Euclidian distance between the reproduction signal and each of both bit streams. Thus, a reproduction signal adaptively equalized is evaluated, thereby detecting an edge shift direction and an edge shift amount of each pattern. Adaptive recording parameters classified by the length of the recording mark to be formed and the length of the space immediately previous or subsequent thereto are optimized in accordance with the edge shift direction and the edge shift amount corresponding to each pattern.

According to Japanese Laid-Open Patent Publication No. 2008-112509, for an edge at which one bit is shifted from a correct bit stream and an incorrect bit stream, a difference between the amplitude value of an adaptively equalized reproduction signal and an expected amplitude value calculated in each stream is quantified. Thus, an edge shift direction and an edge shift amount are detected. Like in Japanese Laid-Open Patent Publication No. 2008-335079, the adaptive recording parameters organized in a table by the length of the mark and the length of the space immediately previous or subsequent thereto are optimized in accordance with the edge shift direction and the edge shift amount corresponding to each pattern.

In Japanese Laid-Open Patent Publications Nos. 2004-335079 and 2008-112509, a reproduction signal is processed by a PR1221ML system. The recording pulse control disclosed in Japanese Laid-Open Patent Publication No. 2004-335079 will be further described with reference to FIG. 3.

Information read from an information recording medium 1 is generated as an analog reproduction signal by an optical head 2. The analog reproduction signal is amplified and AC-coupled by a preamplifier 3, and then input to an AGC section 4. The AGC section 4 adjusts the amplitude such that the output from a waveform equalizer 5 on a later stage has a constant amplitude. The amplitude-adjusted analog reproduction signal is waveform-shaped by the waveform equalizer 5 and input to an A/D conversion section 6. The A/D conversion section 6 samples the analog reproduction signal in synchronization with a reproduction clock output from a PLL section 7. The PLL section 7 extracts the reproduction clock from a digital reproduction signal obtained by the sampling performed by the A/D conversion section 6.

The digital reproduction signal generated by the sampling performed by the A/D conversion section 6 is input to a PR equalization section 8. The PR equalization section 8 adjusts the frequency of the digital reproduction signal such that the frequency characteristic of the digital reproduction signal at the time of recording/reproduction is the characteristic assumed by a maximum likelihood decoding section 9 (for example, PR(1,2,2,1) equalization characteristic). The maximum likelihood decoding section 9 performs maximum likelihood decoding on the waveform-shaped digital reproduction signal output from the PR equalization section 8 to generate a binary signal. The reproduction signal processing technology provided by combining the PR equalization section 8 and the maximum likelihood decoding section 9 is the PRML system.

An edge shift detection section 10 receives the waveform-shaped digital reproduction signal output from the PR equalization section 8 and the binary signal output from the maximum likelihood decoding section 9. The edge shift detection section 10 distinguishes a state transfer from the binary signal, and finds the reliability of the decoding result from the distinguishing result and the branch metric. The edge shift detection section 10 also assigns the reliability for each of leading edge/trailing edge patterns of recording marks based on the binary signal and finds a shift of a recording compensation parameter from the optimal value (hereinafter, the shift will be referred to as the "edge shift").

Test recording is performed using a data sequence having a prescribed recording pattern. An information recording control section 15 changes a recording parameter, the setting change of which is possible, in conformity to the information indicating that the setting change of the recording parameter is determined as being required based on the edge shift amount detected for each pattern. The recording parameters, the setting of which is changeable, are predetermined. Such recording parameters include, for example, the recording start position offset dTtop regarding the leading edge of a recording mark and the recording end position offset dTs regarding the trailing edge of a recording mark. The information recording control section 15 changes the recording parameter in accordance with the table of the recording parameters shown in FIG. 4. FIG. 4 shows recording parameters regarding the leading edge classified by the length of the recording mark and the length of the space immediately previous thereto, and recording parameters regarding the trailing edge classified by the length of the recording mark and the length of the space immediately subsequent thereto.

In FIG. 4, the symbols of recording mark M'(i), immediately previous space S(i−1) and immediately subsequent space S(i+1) are used in the time series of recording marks and spaces shown in FIG. 5. Symbol M represents a recording mark and symbol S represents a space. A position in the time series of an arbitrary recording mark or space is represented using symbol i.

The recording mark corresponding to the recording parameter shown in FIG. 4 is represented by M(i). As shown in FIG. 5, a space immediately previous to the recording mark M(i) is S(i−1), a recording mark further immediately previous is M(i−2), and a space still further immediately previous is S(i−3). A space immediately subsequent to the recording mark M(i) is S(i+1), a recording mark further immediately subsequent is M(i+2), and a space still further immediately subsequent is S(i+3).

The leading edge is located between the recording mark M(i) and the immediately previous space S(i−1). As shown in FIG. 4, the value of dTtop is classified by the pattern in accordance with a combination of the lengths thereof. For example, in the case where the length of the immediately previous space is 3T and the length of the recording mark is 4T, the pattern 3Ts4Tm is used. The trailing edge is located between the recording mark M(i) and the immediately subsequent space S(i+1). As shown in FIG. 4, the value of dTs is classified by the pattern in accordance with a combination of the lengths thereof. For example, in the case where the length of the recording mark is 3T and the length of the immediately subsequent space is 2T, the pattern 3Tm2Ts is used. As shown in FIG. 4, there are a total of 32 recording parameter values regarding the leading edge and the trailing edge.

In order to adjust, for example, the leading edge of a recording mark of 4T having an immediately previous space of 3T, the information recording control section 15 changes a recording parameter of 3Ts4Tm (for example, dTop). In order to adjust, for example, the trailing edge of a recording mark of 3T having an immediately subsequent space of 2T, the information recording control section 15 changes a recording parameter of 3Tm2Ts (for example, dTs).

A recording pattern generation section 11 generates an NRZI signal which is modulated by input information to be recorded. A recording compensation section 12 generates a recording pulse sequence in accordance with the NRZI signal based on the recording parameter changed by the information recording control section 15. A recording power setting section 14 sets recording powers including the peak power Pp, the bottom power Pbw and the like. A laser driving section 13 controls the laser light emitting operation of the optical head 2 in accordance with the recording pulse sequence and the recording powers set by the recording power setting section 14.

In this manner, test recording is performed on the information recording medium 1, and a recording pulse shape is controlled so as to decrease the edge shift amount. Thus, by the recording control method using the PRML system and space compensation of recording parameters, more appropriate recording marks and spaces can be formed.

SUMMARY OF THE INVENTION

As the recording density of information recording mediums is more improved, the problems of the inter-symbol interference and SNR deterioration become more serious. This makes it necessary to process a reproduction signal obtained from the information recording medium by a higher order PRML system.

In this case, in order to appropriately reproduce the information recorded on the information recording medium by the higher order PRML system, it is necessary to perform test recording to adjust the edge position of the recording mark at higher precision and adjust the recording conditions to reduce the error rate at the time of signal reproduction.

The present invention has an object of providing an information recording medium and a recording/reproduction apparatus allowing recording conditions to be adjusted such that the probability of error generation at the time of maximum likelihood decoding is minimized in consideration of a high order PRML system and thus realizing stable high density recording. More specifically, the present invention has an object of reducing the error rate of recording information in high density recording and realizing a more stable recording/reproduction system.

An information recording medium according to the present invention includes a track on which a data sequence including a plurality of recording marks and a plurality of spaces provided between the plurality of recording marks is recordable; and a recording condition recording area in which a recording condition for recording the data sequence on the track is recordable. Where a recording mark which is included in the data sequence and is to be formed on the track based on the recording condition is a first recording mark, when a length of the first recording mark is longer than a prescribed length, the recording condition is classified using a combination of the length of the first recording mark and a length of a first space located adjacently previous or subsequent to the first recording mark, and when the length of the first recording mark is equal to or shorter than the prescribed length, the recording condition is classified using a combination of the length of the first recording mark, the length of the first space, and a length of a second space not located adjacent to the first space and located adjacent to the first recording mark.

In a preferable embodiment, the prescribed length is a length of a shortest recording mark in the data sequence.

In a preferable embodiment, in the classification performed using a combination of the length of the first recording mark, the length of the first space, and the length of the second space, the number of types of the lengths of the first space is larger than the number of types of the lengths of the second space.

In a preferable embodiment, the recording condition is a parameter for adjusting a position of a leading edge of the first recording mark, and the first space is adjacently previous to the first recording mark.

In a preferable embodiment, the recording condition is a parameter for adjusting a position of a trailing edge of the first recording mark, and the first space is adjacently subsequent to the first recording mark.

A reproduction apparatus according to the present invention is a reproduction apparatus for reproducing information from the information recording medium defined by any of the above. The information recording medium includes a PIC area for storing disc information on the information recording medium. The reproduction apparatus includes a reproduction signal processing section for executing at least one of irradiation of the PIC area with laser light to reproduce the disc information and irradiation of the track with the laser light to reproduce information which is recorded based on the recording condition.

A recording apparatus according to the present invention is a recording apparatus for recording a data sequence, including a plurality of recording marks and a plurality of spaces provided between the plurality of recording marks, on an information recording medium based on a recording condition recorded on the information recording medium. The recording apparatus includes a reproduction signal processing section for irradiating the information recording medium with laser light to reproduce the recording condition; and a recording control section for recording information on the information recording medium based on the recording condition. Where a recording mark which is included in the data sequence and is to be formed on the track based on the recording condition is a first recording mark, when a length of the first recording mark is longer than a prescribed length, the recording condition is classified using a combination of the length of the first recording mark and a length of a first space located adjacently previous or subsequent to the first recording mark; and when the length of the first recording mark is equal to or shorter than the prescribed length, the recording condition is classified using a combination of the length of the first recording mark, the length of the first space, and a length of a second space not located adjacent to the first space and located adjacent to the first recording mark.

An evaluation apparatus according to the present invention is an evaluation apparatus for evaluating an information recording medium having a recording parameter recorded thereon, the recording parameter being for recording a data sequence including a plurality of recording marks and a plurality of spaces provided between the plurality of recording marks. Where a recording mark which is included in the data sequence and is to be formed on the track based on the recording condition is a first recording mark, when a length of the first recording mark is longer than a prescribed length, the recording parameter is classified using a combination of the length of the first recording mark and a length of a first space located adjacently previous or subsequent to the first recording mark, and when the length of the first recording mark is equal to or shorter than the prescribed length, the recording parameter is classified using a combination of the length of the first recording mark, the length of the first space, and a length of a second space not located adjacent to the first space and located adjacent to the first recording mark. The evaluation apparatus comprises a reproduction signal processing section for generating a digital signal from a signal reproduced from the information recording medium using a PRML signal processing system, decoding a binary signal from the digital signal, calculating a differential metric, which is a difference of the reproduction signal from each of a most likely first state transition sequence and a most likely second state transition sequence, from the binary signal and detecting each differential metric as an edge shift, and determining whether or not the information recording medium fulfills a prescribed quality based on the edge shifts.

A recording/reproduction apparatus according to the present invention performs at least one of reproduction from and recording on an information recording medium determined by the evaluation apparatus of claim 8 as fulfilling the prescribed quality.

An information recording medium according to the present invention is an information recording medium which includes a recording condition recording area in which recording conditions are recordable, and on which a data sequence including a plurality of recording marks and a plurality of spaces provided between the plurality of recording marks is recordable. The recording conditions are classified by a length of the recording mark. Where the recording conditions are each a parameter for adjusting a position of a leading edge of the recording mark, at least one of the recording conditions classified by the length of the recording mark is further classified into two in accordance with whether a length of a space adjacently subsequent to the recording mark is equal to or shorter than a prescribed length or longer than the prescribed length. Where the recording conditions are each a parameter for adjusting a position of a trailing edge of the recording mark, at least one of the recording conditions classified by the length of the recording mark is further classified into two in accordance with whether a length of a space adjacently previous to the recording mark is equal to or shorter than the prescribed length or longer than the prescribed length.

A reproduction apparatus according to the present invention is a reproduction apparatus for reproducing information from the information recording medium. The information recording medium includes a PIC area for storing disc information on the information recording medium. The reproduction apparatus includes a reproduction signal processing section for executing at least one of irradiation of the PIC area with laser light to reproduce the disc information and irradiation of the track with the laser light to reproduce information which is recorded based on the recording condition.

A recording apparatus according to the present invention is a recording apparatus for recording a data sequence, including a plurality of recording marks and a plurality of spaces provided between the plurality of recording marks, on an information recording medium based on a recording condition recorded on the information recording medium. The recording apparatus includes a reproduction signal processing section for irradiating the information recording medium with laser light to reproduce the recording condition; and a recording control section for recording information on the information recording medium based on the recording condition. The recording conditions are classified by a length of the recording mark. Where the recording conditions are each a parameter for adjusting a position of a leading edge of the recording mark, at least one of the recording conditions classified by the length of the recording mark is further classified into two in accordance with whether a length of a space adjacently subsequent to the recording mark is equal to or shorter than a prescribed length or longer than the prescribed length. Where the recording conditions are each a parameter for adjusting a position of a trailing edge of the recording mark, at least one of the recording conditions classified by the length of the recording mark is further classified into two in accordance with whether a length of a space adjacently previous to the recording mark is equal to or shorter than the prescribed length or longer than the prescribed length.

An evaluation apparatus according to the present invention is an evaluation apparatus for evaluating an information recording medium having recording conditions recorded thereon, the recording conditions being for recording a data sequence including a plurality of recording marks and a plurality of spaces provided between the plurality of recording marks. The recording conditions are classified by a length of the recording mark. Where recording conditions are each a parameter for adjusting a position of a leading edge of the recording mark, at least one of the recording conditions classified by the length of the recording mark is further classified into two in accordance with whether a length of a space adjacently subsequent to the recording mark is equal to or shorter than a prescribed length or longer than the prescribed length. Where the recording conditions are each a parameter for adjusting a position of a trailing edge of the recording mark, at least one of the recording conditions classified by the length of the recording mark is further classified into two in accordance with whether a length of a space adjacently previous to the recording mark is equal to or shorter than the prescribed length or longer than the prescribed length. The evaluation apparatus includes a reproduction signal processing section for generating a digital signal from a signal reproduced from the information recording medium using a PRML signal processing system, decoding a binary signal from the digital signal, calculating a differential metric, which is a difference of the reproduction signal from each of a most likely first state transition sequence and a most likely second state transition sequence, from the binary signal and detecting each differential metric as an edge shift, and determining whether or not the information recording medium fulfills a prescribed quality based on the edge shifts.

A recording/reproduction apparatus according to the present invention performs at least one of reproduction from and recording on an information recording medium determined by the above evaluation apparatus as fulfilling the prescribed quality.

An information recording medium according to the present invention includes a track on which a data sequence including a plurality of recording marks and a plurality of spaces provided between the plurality of recording marks is recordable; and at least one of a PIC area in which a recording condition for recording the data sequence on the track is recorded, and wobbling of the track by which the recording condition is recorded. The recording condition includes a parameter for adjusting a position of a trailing end of a cooling pulse in a recording pulse waveform for forming the recording mark. The parameter is classified using a combination of a length of the recording mark and a length of a space located adjacently previous or subsequent to the recording mark.

A reproduction apparatus according to the present invention is a reproduction apparatus for reproducing information from the above information recording medium. The reproduction apparatus includes a reproduction signal processing section for executing at least one of irradiation of the PIC area with laser light to reproduce disc information and irradiation of the track with the laser light to reproduce information which is recorded based on the recording condition.

A recording apparatus according to the present invention is a recording apparatus for recording a data sequence, including a plurality of recording marks and a plurality of spaces provided between the plurality of recording marks, on an information recording medium based on a recording condition recorded on the information recording medium. The recording apparatus includes a reproduction signal processing section for irradiating the information recording medium with laser light to reproduce the recording condition; and a recording control section for recording information on the information recording medium based on the recording condition. The recording condition includes a parameter for adjusting a position of a trailing end of a cooling pulse in a recording pulse waveform for forming the recording mark. The parameter is classified using a combination of a length of the recording mark and a length of a space located adjacently previous or subsequent to the recording mark.

An evaluation apparatus according to the present invention is an evaluation apparatus for evaluating an information recording medium having a recording parameter recorded thereon, the recording parameter being for recording a data sequence including a plurality of recording marks and a plurality of spaces provided between the plurality of recording marks. The recording condition includes a parameter for adjusting a position of a trailing end of a cooling pulse in a recording pulse waveform for forming the recording mark. The parameter is classified using a combination of a length of the recording mark and a length of a space located adjacently previous or subsequent to the recording mark. The evaluation apparatus comprises a reproduction signal processing section for generating a digital signal from a signal reproduced from the information recording medium using a PRML signal processing system, decoding a binary signal from the digital signal, calculating a differential metric, which is a difference of the reproduction signal from each of a most likely first state transition sequence and a most likely second state transition sequence, from the binary signal and detecting each differential metric as an edge shift, and determining whether or not the information recording medium fulfills a prescribed quality based on the edge shifts.

A recording/reproduction apparatus according to the present invention performs at least one of reproduction from and recording on an information recording medium determined by the above evaluation apparatus as fulfilling the prescribed quality.

A recording control apparatus, according to the present invention, for recording information on an information recording medium includes a recording compensation parameter determination section for classifying recording conditions by data pattern, including at least one recording mark and at least one space, of a data sequence to be recorded. The classification of the recording conditions by data pattern is performed using a combination of the length of a first recording mark included in the data sequence and the length of a first space located adjacently previous or subsequent to the first recording mark, and then further performed using the length of a second recording mark which is not located adjacent to the first recording mark and is located adjacent to the first space.

In a preferable embodiment, the classification using the length of the second recording mark is performed only when the length of the first space is equal to or less than a prescribed length.

In a preferable embodiment, the classification by data pattern is further performed using the length of a second space which is not located adjacent to the first recording mark or the first space and is located adjacent to the second recording mark.

In a preferable embodiment, the classification using the length of the second space is performed only when the length of the second recording mark is equal to or less than the prescribed length.

In a preferable embodiment, the prescribed length is the shortest length in the data sequence.

A recording control apparatus, according to the present invention, for recording information on an information recording medium includes a recording compensation parameter determination section for classifying recording conditions by data pattern, including at least one recording mark and at least one space, of a data sequence to be recorded. The classification of the recording conditions by data pattern is performed using a combination of the length of a first recording mark included in the data sequence and the length of a first space located adjacently previous or subsequent to the first recording mark, and then further performed using the length of a second space which is not located adjacent to the first space and is located adjacent to the first recording mark.

In a preferable embodiment, the classification using the length of the second space is performed only when the length of the first recording mark is equal to or less than the prescribed length.

In a preferable embodiment, the classification by data pattern is further performed using the length of a second recording mark which is not located adjacent to the first recording mark or the first space and is located adjacent to the second space.

In a preferable embodiment, the classification using the length of the second recording mark is performed only when the length of the second space is equal to or less than the prescribed length.

In a preferable embodiment, the prescribed length is the shortest length in the data sequence.

A recording control method according to the present invention is for recording information on an information recording medium. By the recording control method, recording conditions are classified by data pattern, including at least one recording mark and at least one space, of a data sequence to be recorded. The classification of the recording conditions by data pattern is performed using a combination of the length of a first recording mark included in the data sequence and the length of a first space located adjacently previous or subsequent to the first recording mark, and then further performed using the length of a second recording mark which is not located adjacent to the first recording mark and is located adjacent to the first space.

In a preferable embodiment, the classification using the length of the second recording mark is performed only when the length of the first space is equal to or less than a prescribed length.

In a preferable embodiment, the classification by data pattern is further performed using the length of a second space which is not located adjacent to the first recording mark or the first space and is located adjacent to the second recording mark.

In a preferable embodiment, the classification using the length of the second space is performed only when the length of the second recording mark is equal to or less than the prescribed length.

In a preferable embodiment, the prescribed length is the shortest length in the data sequence.

A recording control method according to the present invention is for recording information on an information recording medium. By the recording control method, recording conditions are classified by data pattern, including at least one recording mark and at least one space, of a data sequence to be recorded. The classification of the recording conditions by data pattern is performed using a combination of the length of a first recording mark included in the data sequence and the length of a first space located adjacently previous or subsequent to the first recording mark, and then further performed using the length of a second space which is not located adjacent to the first space and is located adjacent to the first recording mark.

In a preferable embodiment, the classification using the length of the second space is performed only when the length of the first recording mark is equal to or less than the prescribed length.

In a preferable embodiment, the classification by data pattern is further performed using the length of a second recording mark which is not located adjacent to the first recording mark or the first space and is located adjacent to the second space.

In a preferable embodiment, the classification using the length of the second recording mark is performed only when the length of the second space is equal to or less than the prescribed length.

In a preferable embodiment, the prescribed length is the shortest length in the data sequence.

A recording/reproduction apparatus according to the present invention includes a reproduction signal processing section for generating a digital signal and decoding the digital signal into a binary signal, from a signal reproduced from an information recording medium using a PRML signal processing system; and a recording control section for adjusting a recording parameter for recording information on the information recording medium based on the digital signal and the binary signal and recording the information on the information recording medium. The recording control section includes a recording compensation parameter determination section for classifying recording conditions by data pattern, including at least one recording mark and at least one space, of a data sequence to be recorded. The classification of the recording conditions by data pattern is performed using a combination of the length of a first recording mark included in the data sequence and the length of a first space located adjacently previous or subsequent to the first recording mark, and then further performed using the length of a second recording mark which is not located adjacent to the first recording mark and is located adjacent to the first space.

A recording/reproduction apparatus according to the present invention includes a reproduction signal processing section for generating a digital signal and decoding the digital signal into a binary signal, from a signal reproduced from an information recording medium using a PRML signal processing system; and a recording control section for adjusting a recording parameter for recording information on the information recording medium based on the digital signal and the binary signal and recording the information on the information recording medium. The recording control section includes a recording compensation parameter determination section for classifying recording conditions by data pattern, including at least one recording mark and at least one space, of a data sequence to be recorded. The classification of the recording conditions by data pattern is performed using a combination of the length of a first recording mark included in the data sequence and the length of a first space located adjacently previous or subsequent to the first recording mark, and then further performed using the length of a second space which is not located adjacent to the first space and is located adjacent to the first recording mark.

In a preferable embodiment, the reproduction signal processing section includes an edge shift detection section for calculating, from the binary signal, a differential metric which is a difference of a reproduction signal from a most likely first state transition sequence and a most likely second state transition sequence, assigning the differential metric to each of leading edge/trailing edge patterns of the recording marks based on the binary signal, and finding an edge shift of the recording parameter from an optimal value for each pattern. The recording parameter is adjusted such that the edge shift approaches a prescribed target value.

In a preferable embodiment, the classification by data pattern obtained in the recording compensation parameter determination step and the classification by pattern obtained in the edge shift detection step are the same.

A recording/reproduction method according to the present invention includes a reproduction signal processing step of generating a digital signal and decoding the digital signal into a binary signal, from a signal reproduced from an information recording medium using a PRML signal processing system; and a recording control step of adjusting a recording parameter for recording information on the information recording medium based on the digital signal and the binary signal and recording the information on the information recording medium. The recording control step includes a recording compensation parameter determination step of classifying recording conditions by data pattern, including at least one recording mark and at least one space, of a data sequence to be recorded, the data pattern. The classification of the recording conditions by data pattern is performed using a combination of the length of a first recording mark included in the data sequence and the length of a first space located adjacently previous or subsequent to the first recording mark, and then further performed using the length of a second recording mark which is not located adjacent to the first recording mark and is located adjacent to the first space.

A recording/reproduction method according to the present invention includes a reproduction signal processing step of generating a digital signal and decoding the digital signal into a binary signal, from a signal reproduced from an information recording medium using a PRML signal processing system; and a recording control step of adjusting a recording parameter for recording information on the information recording medium based on the digital signal and the binary signal and recording the information on the information recording medium. The recording control step includes a recording compensation parameter determination step of classifying recording conditions by data pattern, including at least one recording mark and at least one space, of a data sequence to be recorded, the data pattern. The classification of the recording conditions by data pattern is performed using a combination of the length of a first recording mark included in the data sequence and the length of a first space located adjacently previous or subsequent to the first recording mark, and then further performed using the length of a second space which is not located adjacent to the first space and is located adjacent to the first recording mark.

In a preferable embodiment, the reproduction signal processing step includes an edge shift detection step of calculating, from the binary signal, a differential metric which is a difference of a reproduction signal from a most likely first state transition sequence and a most likely second state transition sequence, assigning the differential metric to each of leading edge/trailing edge patterns of the recording marks based on the binary signal, and finding an edge shift of the recording parameter from an optimal value for each pattern. The recording parameter is adjusted such that the edge shift approaches a prescribed target value.

In a preferable embodiment, the classification by data pattern obtained in the recording compensation parameter determination step and the classification by pattern obtained in the edge shift detection step are the same.

According to the present invention, a recording condition for recording a data sequence on a track is classified using a combination of a length of a recording mark as a target of the recording parameter adjustment and a length of a space adjacently previous or subsequent thereto. When the length of the recording mark as the target of the recording parameter adjustment is equal to or shorter than a prescribed length, the recording condition is further classified also using a length of a space adjacently subsequent or previous to the above adjacent space. Therefore, even where the size of the recording mark is extremely decreased and the recording density of the information recording medium becomes high, a recording mark having an appropriate shape can be recorded at an appropriate position at higher precision in consideration of the influence of the heat generated when an adjacent recording mark is formed.

Accordingly, by adjusting the recording condition in accordance with the present invention, the error rate of recorded information can be reduced in high density recording which requires a high-order PRML system and thus a more stable recording/reproduction system can be provided.

BRIEF DESCRIPTION OF THE DRAWINGS

FIG. 8 shows state transition sequence patterns by PR12221ML.

FIG. 9 shows state transition sequence patterns by PR12221ML.

FIG. 10 shows state transition sequence patterns by PR12221ML.

FIG. 15 shows classification into detailed patterns of differential metrics having a 14-detection pattern by PR(1,2,2,2,1)ML.

FIG. 16 shows classification into detailed patterns of differential metrics having a 12A-detection pattern by PR(1,2,2,2,1)ML.

FIG. 17 shows classification into detailed patterns of differential metrics having a 12B-detection pattern by PR(1,2,2,2,1)ML.

FIG. 18 shows a pattern table of recording parameters according to an embodiment of the present invention.

FIG. 20 shows another pattern table of recording parameters according to an embodiment of the present invention.

FIG. 22 shows still another pattern table of recording parameters according to an embodiment of the present invention.

FIG. 24 shows still another pattern table of recording parameters according to an embodiment of the present invention.

FIG. 26 shows still another pattern table of recording parameters according to an embodiment of the present invention.

FIG. 28 shows still another pattern table of recording parameters according to an embodiment of the present invention.

FIG. 30 shows still another pattern table of recording parameters according to an embodiment of the present invention.

FIG. 32 shows still another pattern table of recording parameters according to an embodiment of the present invention.

DETAILED DESCRIPTION OF THE PREFERRED EMBODIMENTS

Hereinafter, embodiments of the present invention will be described with reference to the figures.

According to the present invention, in order to increase the recording density of an information recording medium, the scanning speed with the laser beam, namely, the linear velocity is decreased to shorten the recording mark and the space. Owing to this, the recording capacity of an information recording layer of, for example, a 12 cm optical disc can be increased from 25 GB up to 33.3 GB.

Also according to the present invention, in order to select a most likely signal sequence from the waveform of the reproduction signal, a higher order PRML system is adopted. Specifically, a PR12221ML system is used to reproduce information recorded on an information recording medium.

When a high order PRML system is adopted, the evaluation of a reproduction signal also needs to be conducted by a higher order method, for the following reasons. As the recording density of the information recording medium is improved, recording marks and spaces which are shorter than the resolution of the detection system appear. For determining the recording quality of the information recording medium, a positional shift of a recording mark itself and a positional shift of a space itself, namely, a positional shift of a set of at least one recording mark and at least one space needs to be considered, in addition to a positional shift between a recording mark and a space. For such positional shifts, a pattern including a plurality of edges is detected. For example, in the case of a positional shift of a recording mark itself, there is a space at the start and the end of the recording mark, and so the leading edge and the trailing edge are detected at the same time. In the case of a positional shift of a set of one mark and one space, for example, "recording mark A-space B", another space and another mark are present adjacent to the mark and the space, as "space A-mark A-space B-mark B". Therefore, a total of three edges are detected.

With the conventional PR1221ML system, it is considered to evaluate the recording quality when one edge is detected in order to evaluate the edge position of the reproduction signal. With the PR12221ML system, the recording quality when a pattern including a plurality of edge shifts is detected as described above needs to be evaluated. According to the present invention, the edge position of the reproduction signal is evaluated using, as an index, the MLSE (Maximum Likelihood Sequence Error) disclosed in the U.S. patent application Ser. No. 11/964,825 and the International Publication No. 2008/081820 A1 pamphlet assigned to the same assignee as the present application. The entire disclosure of the U.S. patent application Ser. No. 11/964,825 is incorporated herein by reference.

Figure 6:
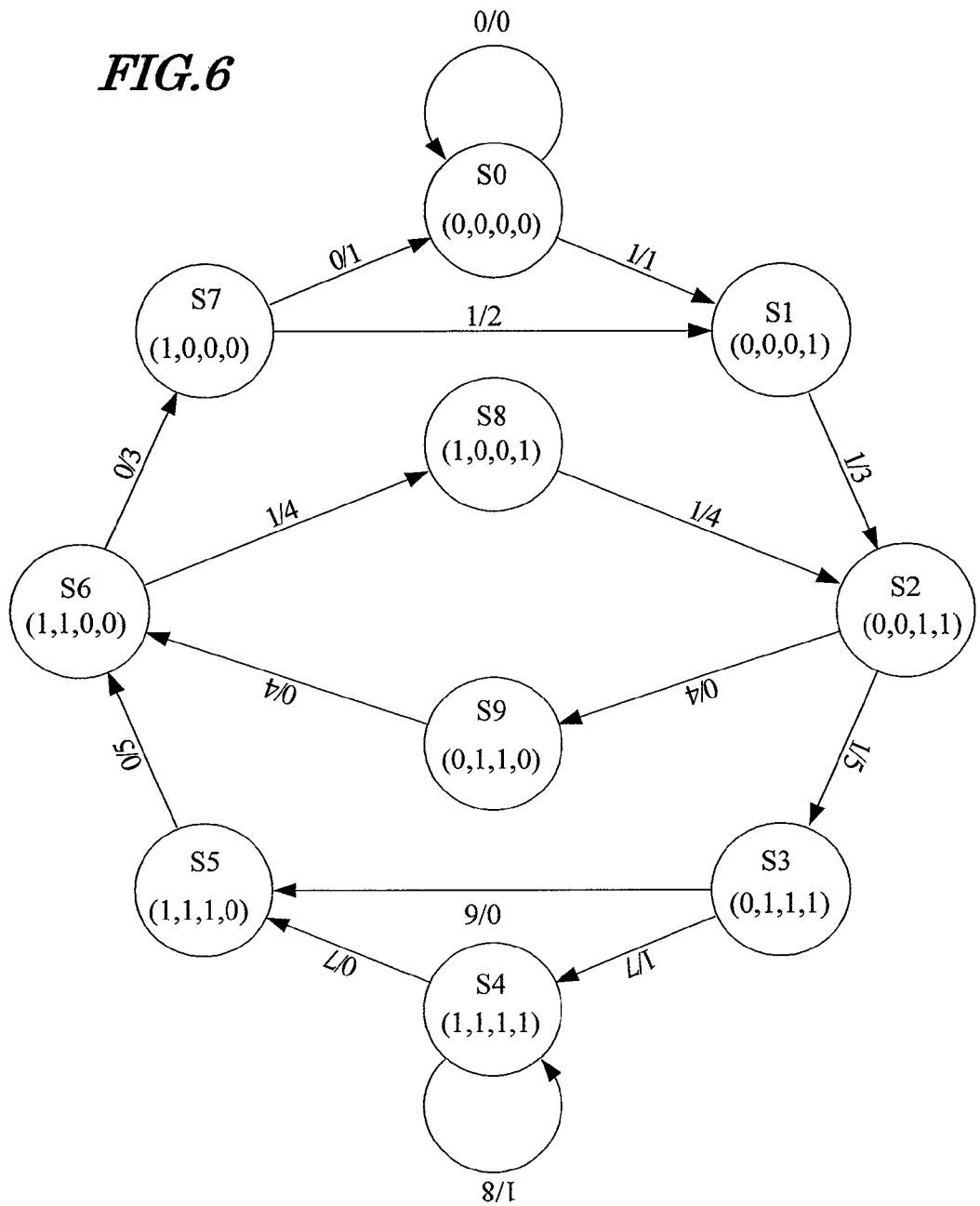
FIG. 6 shows a state transition rule defined by the RLL(1,7) recording code and the equalization system PR(1,2,2,2,1) according to an embodiment of the present invention.
Figure 7:
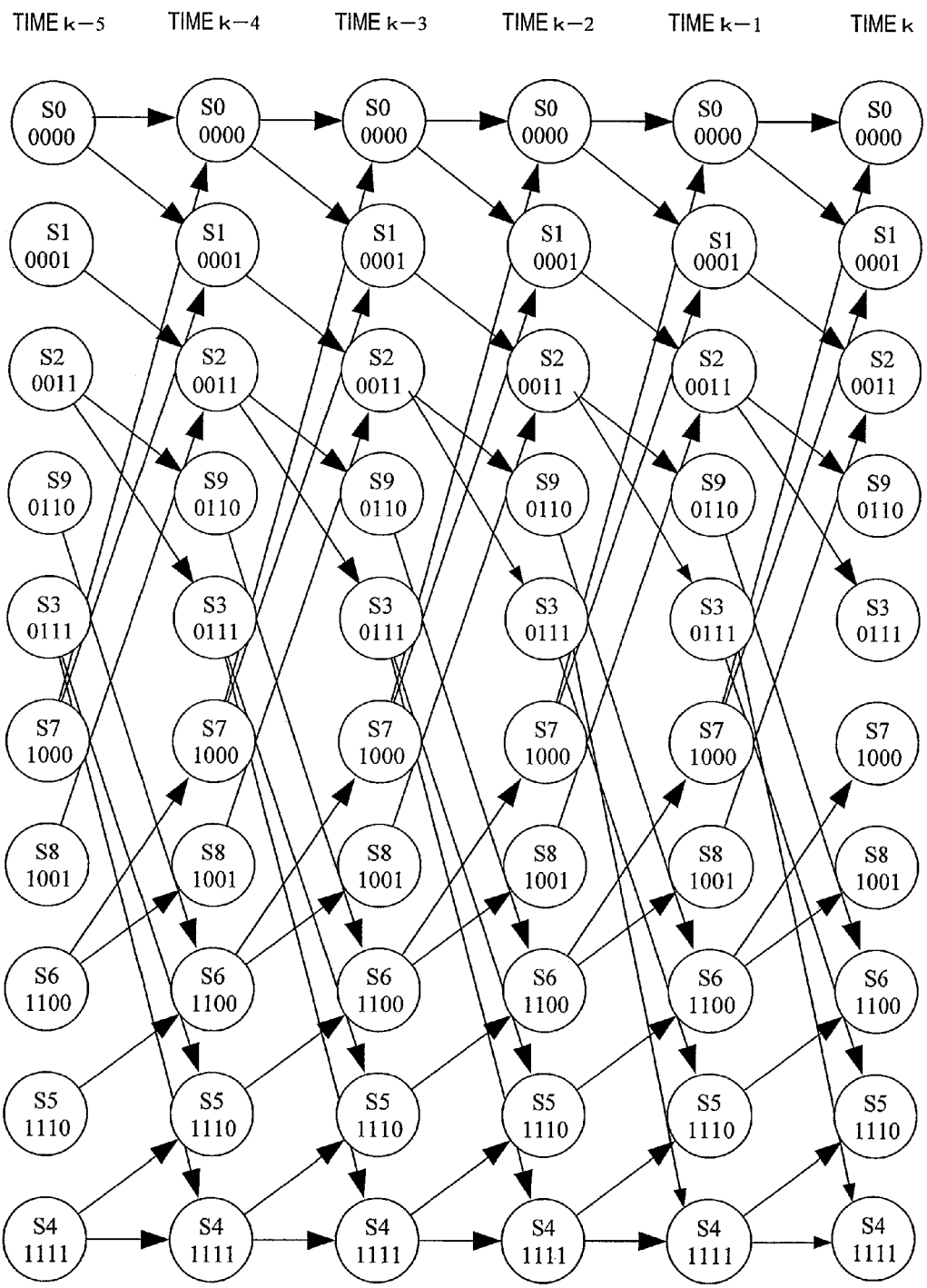
FIG. 7 is a trellis diagram corresponding to the state transition rule shown in FIG. 6.

First, with reference to FIG. 6 and FIG. 7, PR12221ML will be briefly described. FIG. 6 is a state transition diagram showing a state transition rule defined by the RLL(1,7) recording code and the equalization system PR(1,2,2,2,1). FIG. 7 is a trellis diagram corresponding to the state transition rule shown in FIG. 6.

By a combination of PR12221ML and RLL(1,7), the number of states in a decoding section is limited to 10, the number of state transition paths is 16, and the number of reproduction levels are 9.

Referring to the state transition rule of PR12221 shown in FIG. 6, ten states at a certain time are represented as follows. State S(0,0,0,0) is represented as "0, state S(0,0,0,1) is represented as S1, state S(0,0,1,1) is represented as S2, state S(0,1,1,1) is represented as S3, state S(1,1,1,1) is represented as S4, state S(1,1,1,0) is represented as S5, state S(1,1,0,0) is represented as S6, state S(1,0,0,0) is represented as S7, state S(1,0,0,1) is represented as S8, and state S(0,1,1,0) is represented as S9. "0" or "1" in parentheses represents a signal on the time axis, and represents which state will possibly occur at the next time by a state transition from one state. The trellis diagram shown in FIG. 7 is obtained by developing this state transition diagram along the time axis.

In the state transition of PR12221ML shown in FIG. 7, there are numerous state transition sequence patterns (state combinations) by which a prescribed state at one time is changed to another prescribed state at the next time via either one of two state transitions. However, the patterns which are highly likely to cause an error are limited to specific patterns which are difficult to be distinguished. Focusing on such patterns which are likely to cause an error, the state transition sequence patterns of PR12221 can be summarized as FIGS. 8, 9 and 10.

In FIGS. 8 through 10, the first column represents the state transition ($Sm_{k-9} \rightarrow Sn_k$) by which two state transitions which are likely to cause an error are branched and rejoin.

The second column represents the state data sequence $(b_{k-1}, \ldots, b_k)$ which causes the corresponding state transition. "X" in the demodulated data sequence represents a bit which is highly likely to cause an error in such data. When the corresponding state transition is determined to be an error, the number of X (also the number of !X) is the number of errors. Among a transition data sequence in which X is 1 and a transition data sequence in which X is 0, one corresponds to a most likely first state transition sequence, and the other corresponds to a most likely second state transition sequence. In FIGS. 9 and 10, "!X" represents an inverted bit of X.

From the demodulated data sequences obtained by demodulation performed by a Viterbi decoding section, the most likely first state transition sequence of causing an error and the most likely second state transition sequence of causing an error can be extracted by comparing each demodulated data sequence and the transition data sequence (X: Don't care).

The third column represents the first state transition sequence and the second state transition sequence.

The fourth column represents two ideal reproduction waveforms (PR equalization ideal values) after the respective state transitions. The fifth column represents the square of the Euclidean distance between the two ideal signals (suqare of Euclidean distance between paths).

Among combination patterns of two possible state transitions, FIG. 8 shows 18 patterns by which the square of the Euclidean distance between the two possible state transitions is 14. These patterns correspond to a portion of an optical disc medium at which a recording mark is switched to a space (the leading edge and the trailing edge of the recording mark). In other words, these patterns are 1-bit edge shift error patterns.

As an example, state transition paths from S0(k-5) to S6(k) in the state transition rule in FIG. 7 will be described. In this case, one path in which the recording sequence is changed as "0,0,0,0,1,1,1,0,0" is detected. Considering that "0" of the reproduction data is a space and "1" of the reproduction data is a mark, this state transition path corresponds to a 4T or longer space, a 3T mark, and a 2T or longer space.

Figure 11:
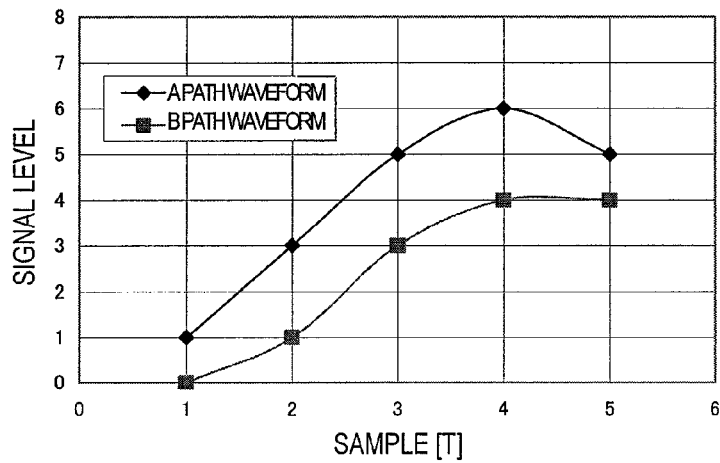
FIG. 11 shows an example of PR equalization ideal waveforms shown in FIG. 8.
Figure 12:
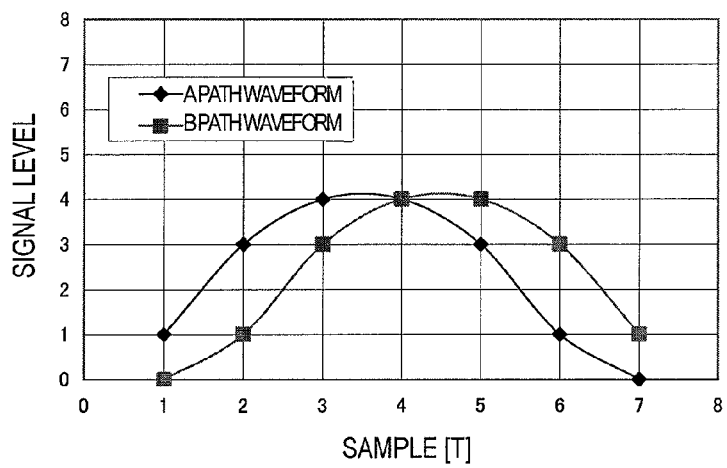
FIG. 12 shows an example of PR equalization ideal waveforms shown in FIG. 9.
Figure 13:
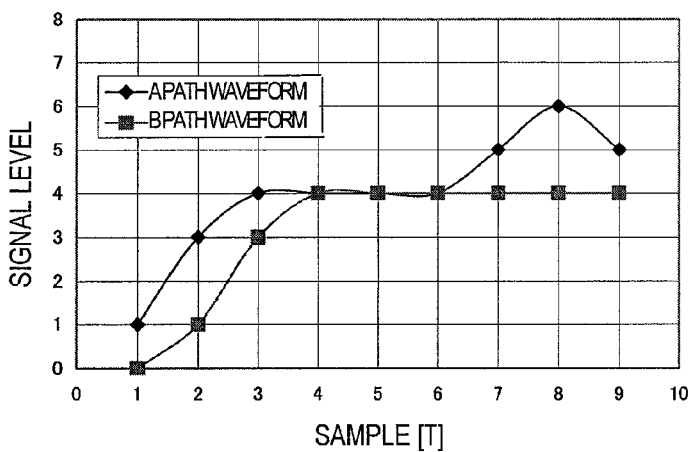
FIG. 13 shows an example of PR equalization ideal waveforms shown in FIG. 10.

FIG. 11 shows an example of the PR equalization ideal waveforms in the recording sequence shown in FIG. 8. In FIG. 8, "A path waveform" of FIG. 11 represents the PR equalization ideal waveform of the recording sequence. Similarly, FIG. 12 shows an example of the PR equalization ideal waveforms shown in FIG. 9. FIG. 13 shows an example of the PR equalization ideal waveforms shown in FIG. 10.

In FIGS. 11, 12 and 13, the horizontal axis represents the sampling time (sampled at one time unit of the recording sequence), and the vertical axis represents the reproduction signal level.

As described above, in PR12221ML, there are 9 ideal reproduction signal levels (level 0 through level 8).

In the state transition rule shown in FIG. 7, there is another path from S0(k-5) to S6(k), in which the recording sequence is changed as "0,0,0,0,0,1,1,0,0". Considering that "0" of the reproduction data is a space and "1" of the reproduction data is a mark, this state transition path corresponds to a 5T or longer space, a 2T mark, and a 2T or longer space.

In FIG. 11, "B path waveform" represents the PR equalization ideal waveform of this path. The patterns shown in FIG. 8 corresponding to the Euclidean distance of 14 have a feature of necessarily including one piece of edge information.

FIG. 9 shows 18 patterns by which the square of the Euclidean distance between the two possible state transitions is 12. These patterns correspond to a shift error of a 2T mark or a 2T space; namely, are 2-bit shift error patterns.

As an example, state transition paths from S0(k-7) to S0(k) in the state transition rule in FIG. 7 will be described. In this case, one path in which the recording sequence is changed as "0,0,0,0,1,1,0,0,0,0" is detected. Considering that "0" of the reproduction data is a space and "1" of the reproduction data is a mark, this state transition path corresponds to a 4T or longer space, a 2T mark, and a 5T or longer space. In FIG. 12, "A path waveform" represents the PR equalization ideal waveform of this path.

There is another path in which the recording sequence is changed as "0,0,0,0,0,1,1,0,0,0,0". Considering that "0" of the reproduction data is a space and "1" of the reproduction data is a mark, this state transition path corresponds to a 5T or longer space, a 2T mark, and a 4T or longer space. In FIG. 12, "B path waveform" represents the PR equalization ideal waveform of this path. The patterns shown in FIG. 9 corresponding to the Euclidean distance of 12 have a feature of necessarily including two pieces of edge information on a 2T rise and a 2T fall.

FIG. 10 also shows 18 patterns by which the square of the Euclidean distance between two possible state transitions is 12. These patterns correspond to a portion at which a 2T mark is continuous to a 2T space; namely, are 3-bit error patterns.

As an example, state transition paths from S0(k-9) to S6(k) in the state transition rule in FIG. 7 will be described. In this case, one path in which the recording sequence is changed as "0,0,0,0,1,1,0,0,1,1,1,0,0" is detected. Considering that "0" of the reproduction data is a space and "1" of the reproduction data is a mark, this state transition path corresponds to a 4T or longer space, a 2T mark, a 2T space, a 3T mark, and a 2T or longer space. In FIG. 13, "A path waveform" represents the PR equalization ideal waveform of this path.

There is another path in which the recording sequence is changed as "0,0,0,0,0,1,1,0,0,1,1,0,0". Considering that "0" of the reproduction data is a space and "1" of the reproduction data is a mark, this state transition path corresponds to a 5T or longer space, a 2T mark, a 2T space, a 2T mark, and a 2T or longer space. In FIG. 13, "B path waveform" represents the PR equalization ideal waveform of this path. The patterns shown in FIG. 10 corresponding to the square of the Euclidean distance of 12 have a feature of including at least three pieces of edge information.

Figure 3:
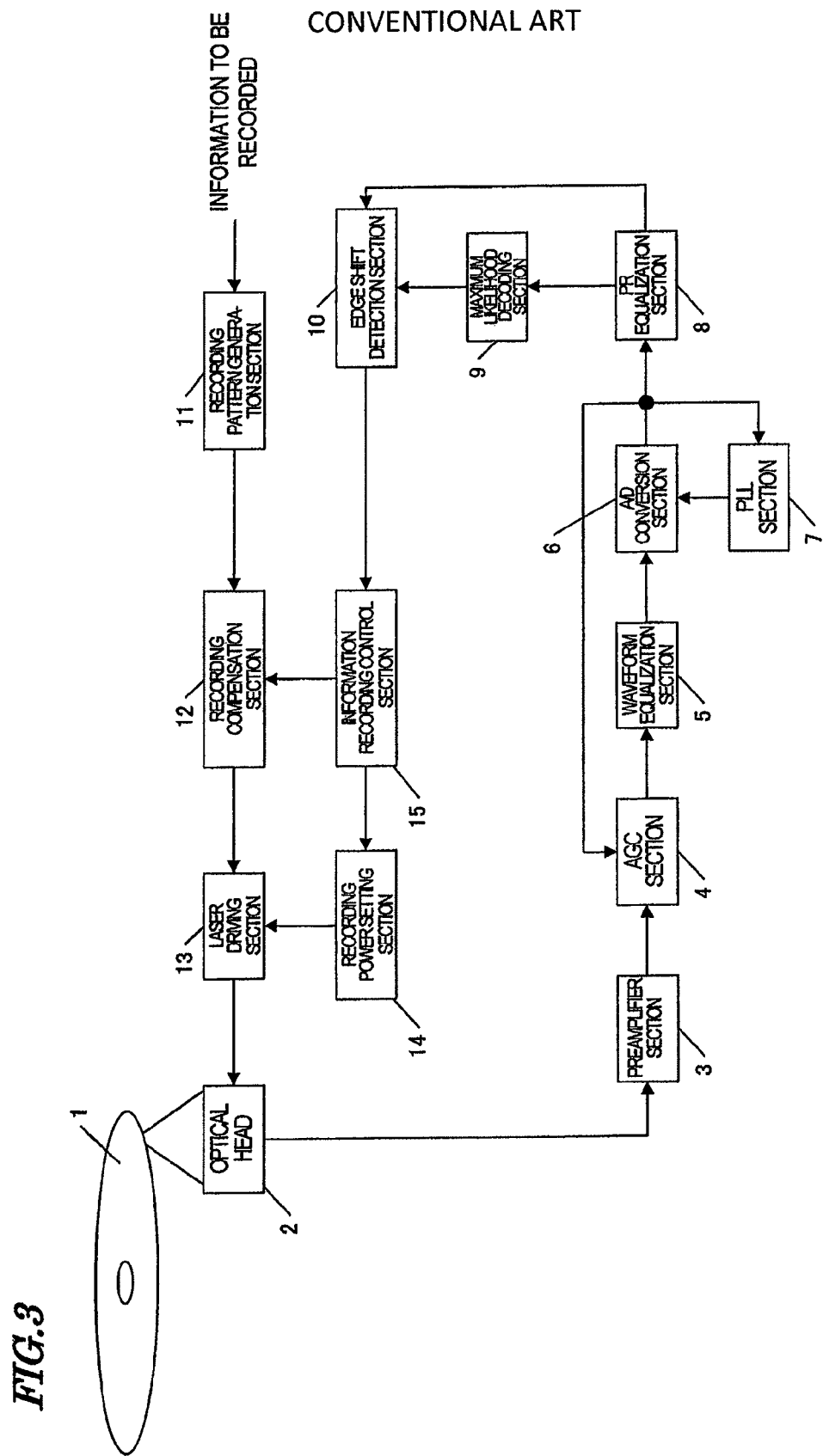
FIG. 3 shows a conventional recording control apparatus.
Figure 14:
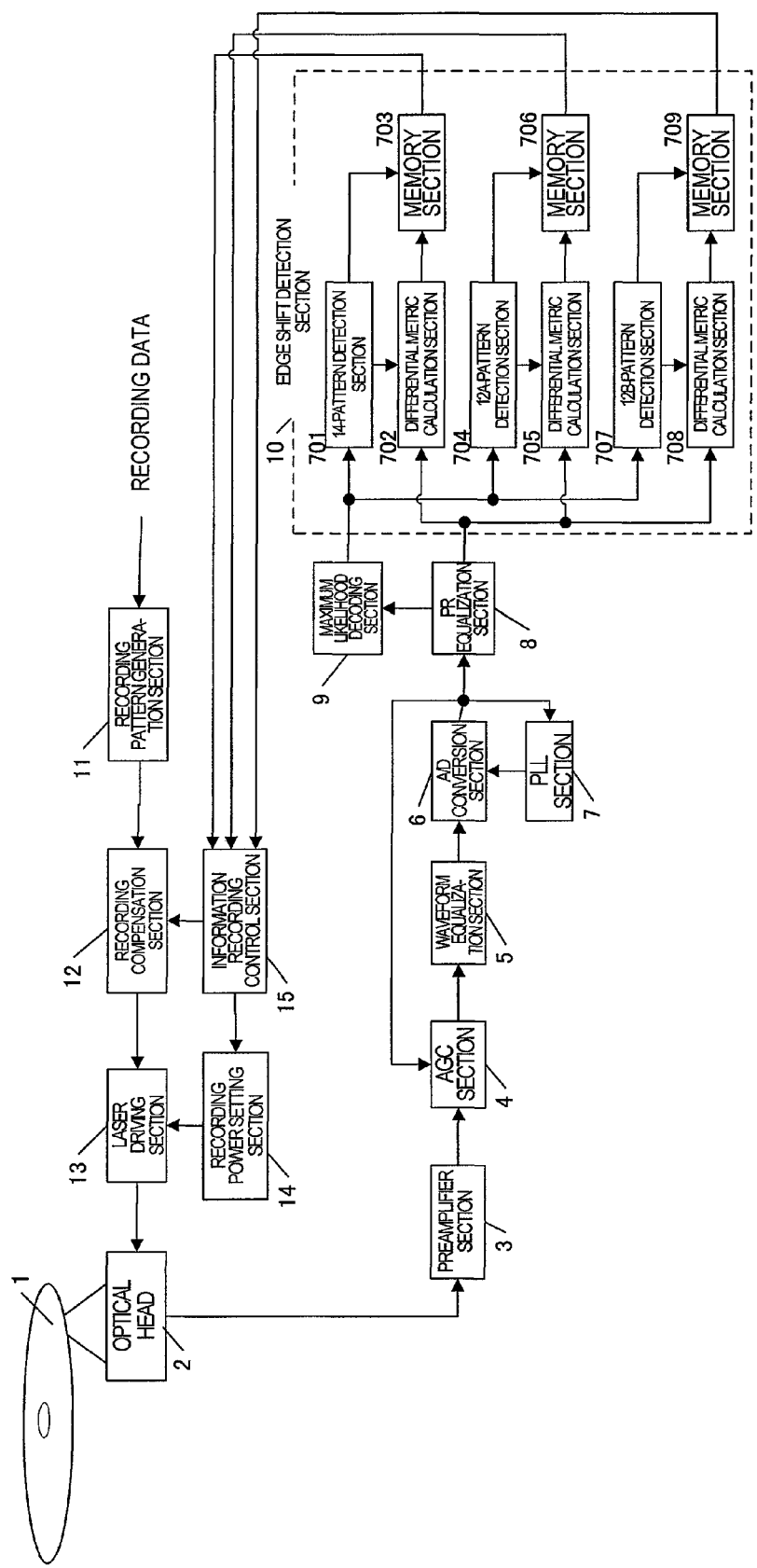
FIG. 14 shows a signal evaluation apparatus using the PR12221ML system.

FIG. 14 shows a structure of a signal evaluation apparatus for evaluating the quality of a reproduction signal in the case where the reproduction signal is processed using the PR12221ML system. The quality of the reproduction signal is evaluated by the edge position of the recording mark. In the signal evaluation apparatus shown in FIG. 14, identical elements as those in the recording control apparatus shown in FIG. 3 bear identical reference numerals thereto, and similar descriptions thereof will be omitted. The recording code is the RLL (Run Length Limited) code, which is an RLL (1,7) code.

As shown in FIG. 14, an edge shift detection section 10 includes a 14-pattern detection section 701, a 12A-pattern detection section 704 and a 12B-pattern detection section 707 for respectively detecting patterns corresponding to FIG. 8 (14-patterns), FIG. 9 (12A-patterns) and FIG. 10 (12B-patterns); differential metric calculation sections 702, 705 and 708 for calculating a metric difference of each pattern; and memory sections 703, 706, and 709 for accumulating and storing a positional shift index of each pattern calculated by the differential metric calculation sections. The PR equalization section 8 has a frequency characteristic which is set such that the frequency characteristic of the reproduction system is the PR(1,2,2,2,1) equalization characteristic.

The pattern detection sections 701, 704 and 707 compare the transition data sequences in FIGS. 8, 9 and 10 with the binary data. When the binary data matches the transition data sequences in FIGS. 8, 9 and 10, the pattern detection sections 701, 704 and 707 select a most likely first state transition sequence 1 and a most likely second state transition sequence 2 based on FIGS. 8, 9 and 10.

Based on the selection results, the differential metric calculation sections 702, 705 and 708 calculate a metric, which is a distance between an ideal value of each state transition sequence (PR equalization ideal value; see FIGS. 8, and 10) and the digital reproduction signal, and also calculate a difference between the metrics calculated based on the two state transition matrices. Such a metric difference has a positive or a negative value, and therefore is subjected to absolute value processing.

Based on the binary data, the pattern detection sections 701, 704 and 707 generate a pulse signal to be assigned to each of leading edge and the trailing edge patterns of the recording mark shown in FIGS. 15, 16 and 17, and output the pulse signal to the memory sections 703, 706 and 709.

Based on the pulse signal output from the pattern detection sections 701, 704 and 707, the memory sections 703, 706 and 709 accumulatively add the metric differences obtained by the differential metric calculation sections 702, 705 and 708 for each pattern shown in FIGS. 15, 16 and 17.

Now, the detailed pattern classification in FIGS. 15, 16 and 17 will be described in detail. In FIGS. 15, 16 and 17, symbols M and S represent the time series of marks and spaces shown in FIG. 5. Symbol !2Tm indicates that the recording mark is a mark other than a 2T mark (for example, is a 3T mark). Similarly, a space other than a 2T space is indicated by !2Ts. Symbol xTm represents a recording mark having an arbitrary length, and symbol xTs represents a space having an arbitrary length. In the case of the RLL(1,7) recording code, the recording marks and the spaces have a length of 2T through 8T. Each pattern number corresponds to the pattern number in FIGS. 8, 9 and 10.

As shown in FIG. 15, by the pattern classification of the 14-detection patterns in FIG. 15, one edge shift of one space and one mark is classified. The "start" of a 14-detection pattern indicates an edge shift of a mark at time i and a space at time i−1. The "end" of a 14-detection pattern indicates an edge shift of a mark at time i and a space at time i+1.

As shown in FIG. 16, by the pattern classification of the 12A-detection patterns, a shift of a 2T mark or a 2T space in a 14-detection pattern shown in FIG. 14 is further classified by the mark or space at the immediately previous time or the immediately subsequent time.

In the "start" of the 12A-detection pattern, a shift of a 2T mark at time i sandwiched between a space at time i−1 and a space at time i+1 is classified by the length of the space at time i+1, or a shift of a 2T space at time i−1 sandwiched between a mark at time i and a mark at time i−2 is classified by the length of the mark at time i−2. In the "end" of the 12A-detection pattern, a shift of a 2T mark at time i sandwiched between a space at time i−1 and a space at time i+1 is classified by the length of the space at time i−1, or a shift of a 2T space at time i+1 sandwiched between a mark at time i and a mark at time i+2 is classified by the length of the mark at time i+2.

By the pattern classification of the 12B-detection patterns shown in FIG. 17, a shift of continuous 2T mark and 2T space in a 12A-detection pattern shown in FIG. 16 is further classified by the mark or space at the further immediately previous time or the further immediately subsequent time. Specifically, a shift of a 2T mark and a 2T space located in succession and sandwiched between one mark and one space is classified.

In the "start" of the 12B-detection pattern, a shift of a 2T mark at time i and a 2T space at time i+1 sandwiched between a mark at time i+2 and a space at time i−1 is classified by the length of the mark at time i+2, or a shift of a 2T mark at time i−2 and a 2T space at time i+1 sandwiched between a space at time i−3 and a mark at time i is classified by the length of the mark at time i−3.

In the "end" of the 12B-detection pattern, a shift of a 2T mark at time i and a 2T space at time i−1 sandwiched between a space at time i+1 and a mark at time i−2 is classified by the length of the mark at time i−2, or a shift of a 2T space at time i+1 and a 2T mark at time i+2 sandwiched between a mark at time i and a space at time i+3 is classified by the length of the mark at time i+3.

Owing to the apparatus shown in FIG. 14, it is now possible to provide an index representing a positional shift of a set of one mark and one space including three edge shifts, i.e., a shift of the mark itself including two edge shifts and a shift of the space itself, in addition to a positional shift between a mark and a space including one edge shift.

Thus, when a pattern including a plurality of edge shifts is detected, how the edges are shifted with respect to the most likely path can be determined. Accordingly, the recording quality can be evaluated, and a pattern having a high error rate can be distinguished.

It should be noted that the present invention is related to a method for adjusting a recording condition for forming a recording mark on an information recording medium. The evaluation method of a reproduction signal is not limited to the above-described method. An index value called SAM (Sequence Amplitude Margin) or any other index value or evaluation method may be used to evaluate the degree of an edge shift, and the edge shift of a recording mark may be adjusted based on the evaluation result.

According to the present invention, the recording condition is adjusted to decrease the edge shift of a recording mark, using an index regarding the edge shift of the recording mark obtained in the above-described manner as the evaluation reference. The edge of a recording mark is the border between the recording mark and a space. Therefore, by the conventional art, the recording condition is classified in accordance with the lengths of a recording mark and a space adjacent to the edge as described above with reference to FIG. 4.

By contrast, according to the present invention, the influence of heat which is caused when an adjacent recording mark is formed due to the size decrease of the recording mark is considered. Thus, a recording parameter is changed in accordance with the length of each of a recording mark as the target of the edge adjustment, an adjacent space, and a recording mark adjacent to the space, or in accordance with the length of each of a recording mark as the target of the edge adjustment and spaces sandwiching the recording mark. Hereinafter, embodiments of an information recording medium and a recording/reproduction apparatus, according to the present invention, capable of adjusting the recording method and recording conditions and thus realizing stable high density recording will be described.

Embodiment 1

In this embodiment, an information recording medium and a recording/reproduction apparatus, according to the present invention, capable of adjusting the recording method and recording conditions and thus realizing stable high density recording will be described. In the following description, a recording pulse condition will be described as a recording condition to be adjusted. Alternatively, a recording power condition or any other recording parameter may be adjusted. Hereinafter, a condition for controlling the position of a leading edge and a trailing edge of a recording mark will be described. Alternatively, a recording pulse width determined by the leading edge and the trailing edge (for example, Ttop) may be controlled. In this embodiment, a PR12221ML system is used for processing a reproduction signal, and the RLL (Run Length Limited) code such as the RLL(1,7) code is used as a recording code.

<Recording Condition Adjustment Method 1-1 Regarding the Leading Edge>

The recording condition adjustment method 1-1 is regarding a leading edge and is characterized by the following: where a recording mark having a leading edge to be adjusted is a first recording mark, the recording condition is classified using a length of the first recording mark, a length of a first space located adjacently previous to the first recording mark and a length of a second recording mark not located adjacent to the first recording mark and located adjacent to the first space.

FIG. 18 provides a recording parameter table which shows a specific classification method of the recording condition used for the recording condition adjustment method 1-1. In FIG. 18, a recording mark as the target of the recording parameter adjustment is represented by recording mark M(i) as described above with reference to FIG. 4. The other spaces and recording marks are also represented by the same symbols as above. In FIG. 18, symbol !2Tm in M(i−2) indicates that the recording mark is a mark other than a 2T mark (for example, is a 3T mark). Similarly, a space other than a 2T space is indicated by !2Ts. Symbol xTm indicates that it is not necessary to limit the length of the recording mark. Similarly in the following description, symbol xTs indicates that it is not necessary to limit the length of the space. It is noted that in the case of the RLL(1,7) code, the length of the recording mark and the space is 2T through 8T.

Figures 4, 5:
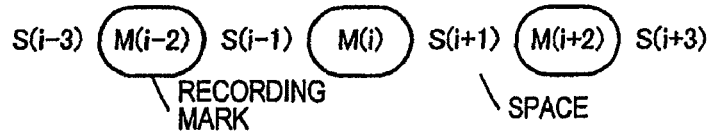
FIG. 4 shows conventional recording parameter tables.
FIG. 5 shows a time series of recording marks and spaces.

Now, symbols different from those in FIG. 4 will be described. In this embodiment, the representation of the relationship between a recording mark and a space or a recording mark previous thereto or subsequent thereto in the pattern table is complicated. Therefore, in a representation of each pattern, T is added only to the recording mark M(i) which is the target of the recording parameter adjustment. For example, when the immediately previous space S(i−1) is a 3T space and the recording mark M(i) is a 2T mark, the pattern is represented as pattern 3s2Tm. A pattern represented in the same manner as in FIG. 4 is provided with parentheses. Accordingly, pattern 3s2Tm is represented as pattern (3s2Tm). Such symbols are also used in the other pattern tables used for the other recording condition adjustment methods described later.

As shown in the pattern table in FIG. 18, the recording condition is classified in the same manner as in the conventional pattern table in FIG. 4 in the case where the immediately previous space S(i−1) is a space other than the shortest space (2Ts), i.e., a 3T or longer space. Only in the case where the immediately previous space is the shortest space, the pattern representation varies in accordance with the length of the mark M(i−1) immediately previous to the shortest space. Namely, in this case, the recording parameter is set differently in accordance with the difference in the length of the mark immediately previous to the shortest space.

One reason for this is that when the immediately previous space is the shortest space, the recording mark as the target of the recording parameter adjustment is most influenced by the heat used for forming a recording mark previous to the immediately previous space. Another reason is that the shortest mark is extremely short in high density recording. In a recording/reproduction system for BD, the length of the shortest mark and the shortest space is about 149 nm in the case of the 25 GB recording, and about 112 nm in the case of the 33.4 GB recording. The size of the beam spot is about 250 nm. In the case of the 33.4 GB recording, even the pattern 2m2s including the shortest mark and the shortest space in continuation is encompassed in the beam spot. In high density recording, as the recording mark length is shorter, the expansion of the recording mark in the width direction is also extremely reduced. When the shortest mark is formed, the heat amount accumulated in the recording film is smallest and so the heat amount given to the next recording mark is also small. Therefore, in this embodiment, the recording parameter is set differently in accordance with the difference in the length of the mark immediately previous to the shortest space, so that a more appropriate recording mark can be formed in high density recording.

In this embodiment, the length of the immediately previous mark is classified as the shortest mark 2Tm which is most liable to be influenced by the thermal interference or a recording mark of another length !2Tm. This is performed in consideration of the scale of the circuit having the recording parameter. In the case where the circuit scale can be ignored, it is desirable that 3T or longer marks can be individually classified.

Especially in the case where the recording mark M(i) is a 3T mark or longer, when the previous recording mark is the shortest mark 2Tm, the recording condition to be adjusted is a recording condition regarding the 12B patterns of the transition data sequence shown in FIG. 10 (more strictly, also including the 12A patterns relating to the 2T continuous patterns). When the previous recording mark is other than the shortest mark, i.e., !2Tm, the recording condition to be adjusted is a recording condition regarding the 12A patterns of the transition data sequence, shown in FIG. 9, which are not related to the 2T continuous patterns. Accordingly, when performing the evaluation using the above-described MLSE as an index, the 12A patterns (not related to the 2T continuous patterns) and the 12B patterns (including the 12A patterns relating to the 2T continuous patterns) can be separately evaluated and the recording conditions for these two types of patterns can be independently adjusted.

Figure 19:
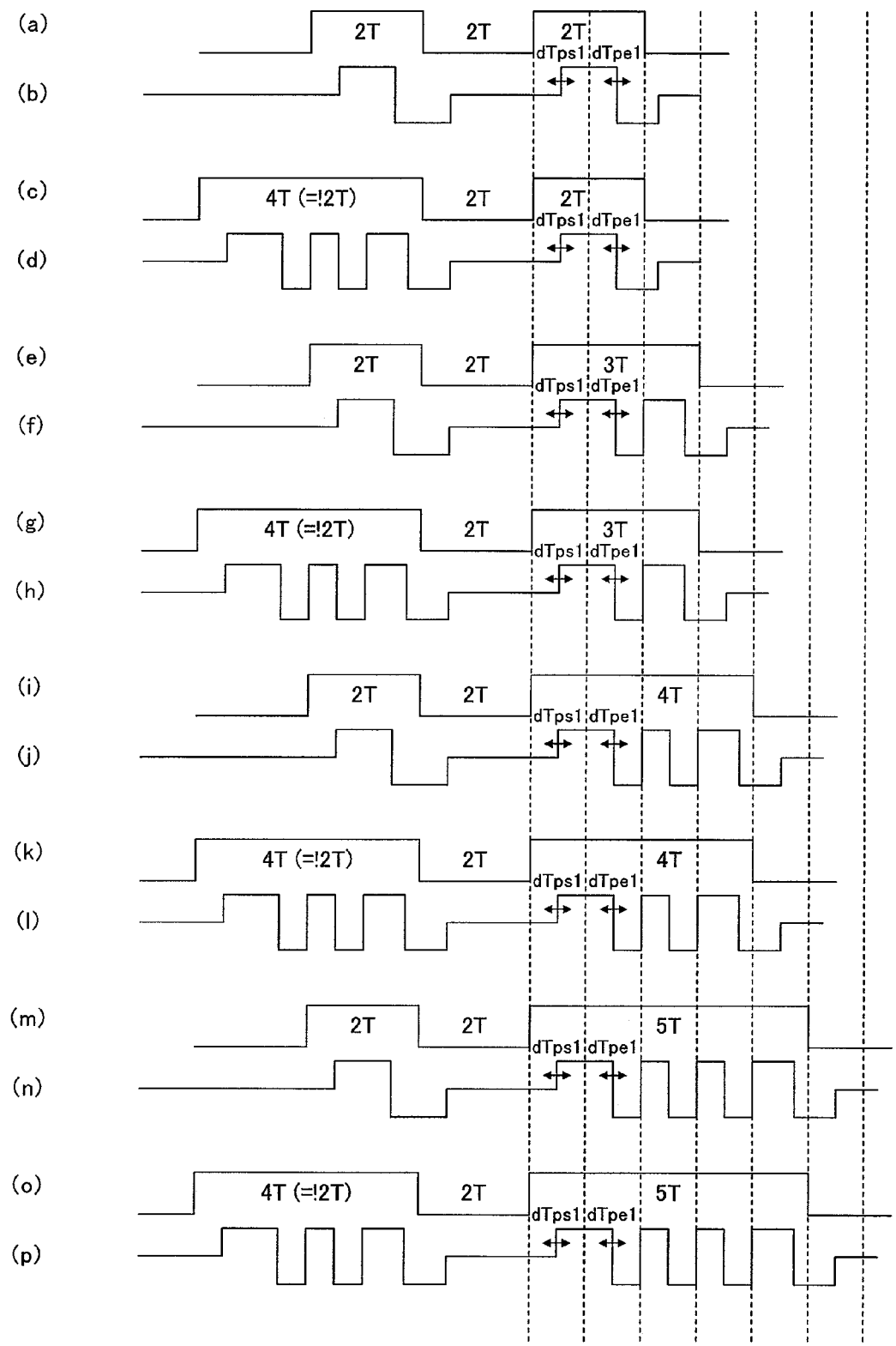
FIG. 19 shows recording pulses corresponding to the pattern table shown in FIG. 18.

FIG. 19 shows recording pulses corresponding to different recording parameters regarding the leading edge of a recording mark in the case where the immediately previous space is the shortest space. FIG. 19, part (a), shows an NRZI signal of pattern 2m2s2Tm, and FIG. 19, part (b), shows a recording pulse for the NRZI signal of pattern 2m2s2Tm; FIG. 19, part (c), shows an NRZI signal of pattern 4m2s2Tm, and FIG. 19, part (d), shows a recording pulse for the NRZI signal of pattern 4m2s2Tm; FIG. 19, part (e), shows an NRZI signal of pattern 2m2s3Tm, and FIG. 19, part (f), shows a recording pulse for the NRZI signal of pattern 2m2s3Tm; FIG. 19, part (g), shows an NRZI signal of pattern 4m2s3Tm, and FIG. 19, part (h), shows a recording pulse for the NRZI signal of pattern 4m2s3Tm; FIG. 19, part (i), shows an NRZI signal of pattern 2m2s4Tm, and FIG. 19, part (j), shows a recording pulse for the NRZI signal of pattern 2m2s4Tm; FIG. 19, part (k), shows an NRZI signal of pattern 4m2s4Tm, and FIG. 19, part (l), shows a recording pulse for the NRZI signal of pattern 4m2s4Tm; FIG. 19, part (m), shows an NRZI signal of pattern 2m2s5Tm, and FIG. 19, part (n), shows a recording pulse for the NRZI signal of pattern 2m2s5Tm; and FIG. 19, part (o), shows an NRZI signal of pattern 4m2s5Tm, and FIG. 19, part (p), shows a recording pulse for the NRZI signal of pattern 4m2s5Tm.

The recording mark as the target of the recording parameter adjustment is: in FIG. 19, parts (a) and (c), a 2T mark; in FIG.

19, parts (e) and (g), a 3T mark; in FIG. 19, parts (i) and (k), a 4T mark; and in FIG. 19, parts (m) and (o), a 5T mark. The two NRZI signals shown in FIG. 19, parts (a) and (c), indicate that the space immediately previous to the recording mark as the target of the recording parameter adjustment (2T mark in both cases) is the shortest space in both cases, but the length of the recording mark immediately previous to the space is the shortest 2T mark in one case and is a mark other than the shortest 2T mark in the other case. Therefore, even for recording the same 2T mark, different recording parameters of different recording pulses are set in accordance with the pattern of the NRZI signal as shown in FIG. 19, parts (b) and (d). In FIG. 19, parts (b) and (d), the recording mark is a 2T mark. Regarding recording marks of other lengths, different recording parameters are set for different patterns in a similar manner.

Here, the leading edge of the recording mark is adjusted to an appropriate edge position by the recording parameters of the rise edge position dTps1 of the first pulse and the fall edge position dTpe1 of the first pulse. Therefore, dTps1 and dTpe1 each have a value classified in accordance with the pattern table shown in FIG. 18. Namely, there are a table of dTps1 and a table of dTpe1. In this embodiment, the leading edge of the recording mark is adjusted by the recording parameters of dTps1 and dTpe1. Alternatively, only the position of the rise edge position dTps1 of the first pulse may be changed.

<Recording Condition Adjustment Method 1-2 Regarding the Leading Edge>

The recording condition adjustment method 1-2 is also regarding a leading edge and is characterized by the following: in the case where the previous mark is the shortest mark in the adjustment method 1-1, the recording parameter is classified by the length of a space immediately previous to the previous mark. Namely, where a recording mark having a leading edge to be adjusted is a first recording mark, the recording condition is classified using a length of the first recording mark, a length of a first space located adjacently previous to the first recording mark, a length of a second recording mark not located adjacent to the first recording mark and located adjacent to the first space, and a second space located adjacent neither to the first recording mark nor the first space and located adjacent to the second recording mark.

FIG. 20 provides a recording parameter table which shows a specific classification method of the recording condition used for the recording condition adjustment method 1-2. In FIG. 20, the patterns framed by the thick line is expanded with respect to FIG. 18. The patterns in the expanded part will be described.

As shown in FIG. 20, according to the recording condition adjustment method 1-2, in the case where the previous recording mark M(i−2) is the shortest mark, the recording parameter is set differently in accordance with the length of the space S(i−3) immediately previous to the shortest mark. Specifically, the recording parameter is set differently in accordance with whether the length of the space S(i−3) is 2T or not. Owing to this, for example, in an error that a 2T continuous pattern 2m2s located immediately previous to the recording mark M(i) is entirely bit-shifted, different recording parameters can be set for a three 2T continuous pattern of 2s2m2s and for a two 2T continuous pattern of !2s2m2s. Therefore, the recording parameter can be more appropriately set for a 2T continuous pattern, and the shift of the 2T continuous pattern, which is the cause of the error, can be decreased.

Figure 21:
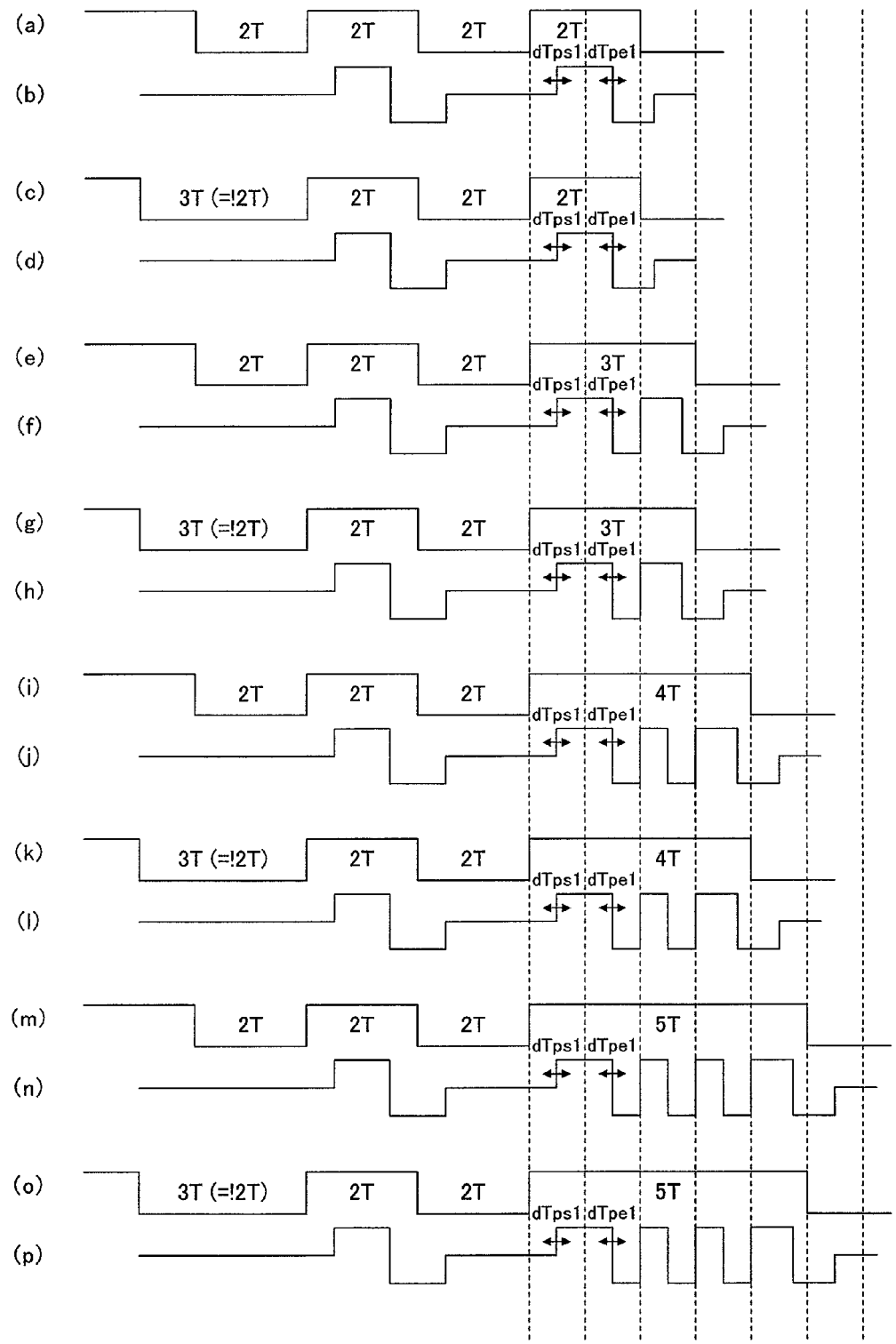
FIG. 21 shows recording pulses corresponding to the pattern table shown in FIG. 20.

FIG. 21 shows recording pulses corresponding to different recording parameters regarding the leading edge of a recording mark in the case where the space immediately previous thereto is the shortest space and the recording mark immediately previous to the shortest space is the shortest mark. FIG. 21, part (a), shows an NRZI signal of pattern 2s2m2s2Tm, and FIG. 21, part (b), shows a recording pulse for the NRZI signal of pattern 2s2m2s2Tm; FIG. 21, part (c), shows an NRZI signal of pattern 3s2m2s2Tm, and FIG. 21, part (d), shows a recording pulse for the NRZI signal of pattern 3s2m2s2Tm; FIG. 21, part (e), shows an NRZI signal of pattern 2s2m2s3Tm, and FIG. 21, part (f), shows a recording pulse for the NRZI signal of pattern 2s2m2s3Tm; FIG. 21, part (g), shows an NRZI signal of pattern 3s2m2s3Tm, and FIG. 21, part (h), shows a recording pulse for the NRZI signal of pattern 3s2m2s3Tm; FIG. 21, part (i), shows an NRZI signal of pattern 2s2m2s4Tm, and FIG. 21, part (j), shows a recording pulse for the NRZI signal of pattern 2s2m2s4Tm; FIG. 21, part (k), shows an NRZI signal of pattern 3s2m2s4Tm, and FIG. 21, part (l), shows a recording pulse for the NRZI signal of pattern 3s2m2s4Tm; FIG. 21, part (m), shows an NRZI signal of pattern 2s2m2s5Tm, and FIG. 21, part (n), shows a recording pulse for the NRZI signal of pattern 2s2m2s5Tm; and FIG. 21, part (o), shows an NRZI signal of pattern 3s2m2s5Tm, and FIG. 21, part (p), shows a recording pulse for the NRZI signal of pattern 3s2m2s5Tm.

The recording mark as the target of the recording parameter adjustment is: in FIG. 21, parts (a) and (c), a 2T mark; in FIG. 21, parts (e) and (g), a 3T mark; in FIG. 21, parts (i) and (k), a 4T mark; and in FIG. 21, parts (m) and (o), a 5T mark. The two NRZI signals shown in FIG. 21, parts (a) and (c), indicate that the space immediately previous the 2T shortest mark which is immediately previous to the recording mark as the target of the recording parameter adjustment is the shortest 2T space in one case and is a space other than the shortest 2T space (here, 3T space) in the other case. Therefore, even for recording the same 2T mark, different recording parameters of different recording pulses are set in accordance with the pattern of the NRZI signal as shown in FIG. 21, parts (b) and (d). In FIG. 21, parts (b) and (d), the recording mark is a 2T mark. Regarding recording marks of other lengths, different recording parameters are set for different patterns in a similar manner.

<Recording Condition Adjustment Method 2-1 Regarding the Leading Edge>

The recording condition adjustment method 2-1 is regarding a leading edge and is characterized by the following: where a recording mark having a leading edge to be adjusted is a first recording mark, the recording condition is classified using a length of the first recording mark, a length of a first space located adjacently previous to the first recording mark and a length of a second space not located adjacent to the first space and located adjacent to the first recording mark.

More specifically, when a length of the first recording mark is longer than a prescribed length, the recording condition is classified using a combination of the length of the first recording mark and the length of the first space located adjacently previous to the first recording mark. By contrast, when the length of the first recording mark is equal to or shorter than the prescribed length, the recording condition is classified using a combination of the length of the first recording mark, the length of the first space, and the length of the second space not located adjacent to the first space and located adjacent to the first recording mark.

FIG. 22 provides a recording parameter table which shows a specific classification method of the recording condition used for the recording condition adjustment method 2-1. As shown in FIG. 22, it is understood that the recording condition is classified in the same manner as in the conventional pattern table in FIG. 4 in the case where the recording mark is a mark other than the shortest mark, i.e., a 3T or longer mark. Only in the case where the recording mark M(i) is the shortest mark, the pattern representation varies in accordance with the length of the space S(i+1) immediately subsequent to the shortest mark. Namely, the recording parameter is set differently in accordance with whether the length of the space immediately subsequent to the shortest mark is 2T or not. As shown in FIG. 22, in the case where the recording mark M(i) is the shortest mark, the recording parameter is classified in accordance with the type of the immediately previous space S(i−1) among four types of 2T, 3T, 4T and 5T and also in accordance with the type of the immediately subsequent space S(i+1) among two types of 2T and other than 2T. In the case where the recording mark M(i) is 3T or longer, the recording parameter is classified in accordance with the type of the immediately previous space S(i−1) among four types of 2T, 3T, 4T and 5T but is not classified in accordance with the type of the immediately subsequent space S(i+1). Therefore, the number of types of the lengths of the immediately previous space is larger than the number of types of the lengths of the immediately subsequent space regardless of the length of the recording mark M(i).

As described above, in high density recording, the shortest mark is shorter than the other recording marks. Therefore, even when the immediately previous space is long, if the immediately subsequent space is short, the heat amount generated at the time of forming a recording mark immediately subsequent to the short space is conducted. Namely, after a recording mark is formed, this formed recording mark is deformed by the influence of the heat generated by the later formation of a recording mark. Generally in this case, the influence of the heat is related to the trailing edge of the recording mark. However, in high density recording, this also influences the leading edge as well as the trailing edge because the recording mark is extremely short. Therefore, in this embodiment, the recording parameter is classified by the difference in the length of the space immediately subsequent to the shortest mark, so that a more appropriate recording mark can be formed in high density recording.

Namely, a recording condition is classified by the length of the first recording mark. The recording condition is a parameter for adjusting a position of the leading edge of the first recording mark. However, the recording condition classified by the length of the first recording mark into at least one category, i.e., a category that the length of the first recording mark is equal to or shorter than a prescribed length, is further classified into two in accordance with whether the length of the second space adjacently subsequent to the first recording mark is equal to or shorter than the prescribed length or longer than the prescribed length.

In this embodiment, regarding the length of the immediately subsequent space, the recording condition is classified in accordance with whether such a length is the shortest space 2Ts which is most liable to be influenced by the thermal conduction or another length, i.e., !2Ts. This is performed in consideration of the scale of the circuit having the recording parameter. In the case where the circuit scale can be ignored, it is desirable that 3T or longer spaces can be individually classified.

Especially in the case where the immediately previous space S(i−1) is a 3T space or longer, when the immediately subsequent space is the shortest space 2Ts, the recording condition to be adjusted is a recording condition regarding the 12B patterns of the transition data sequence shown in FIG. 10 (more strictly, also including the 12A patterns relating to the 2T continuous patterns). When the immediately subsequent space is other than the shortest space, i.e., !2Ts, the recording condition to be adjusted is a recording condition regarding the 12A patterns of the transition data sequence, shown in FIG. 9, which are not related to the 2T continuous patterns. Accordingly, when performing the evaluation using the above-described MLSE as an index, the 12A patterns (not related to the 2T continuous patterns) and the 12B patterns (including the 12A patterns relating to the 2T continuous patterns) can be separately evaluated and the recording conditions for these two types of patterns can be independently adjusted.

Figure 23:
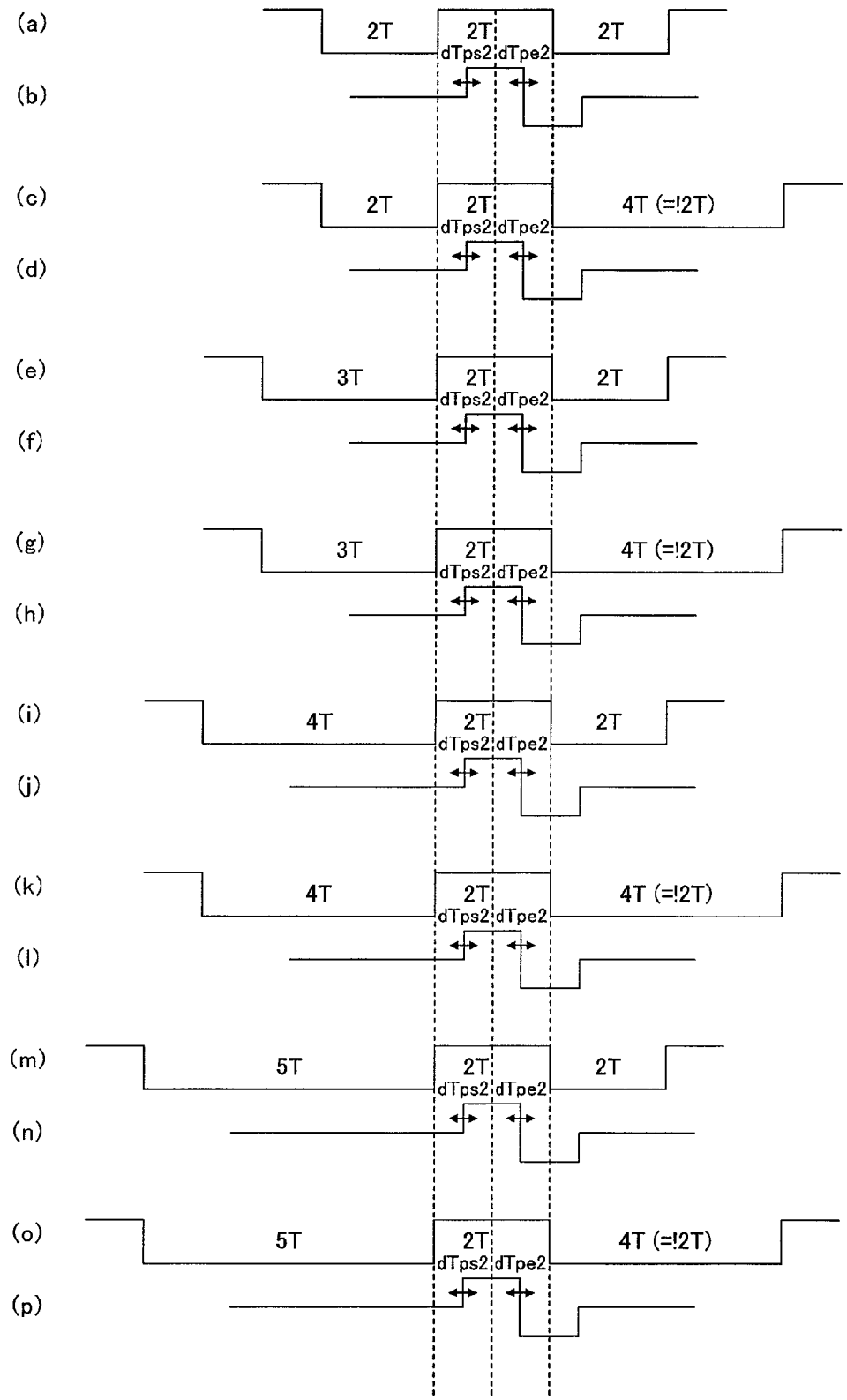
FIG. 23 shows recording pulses corresponding to the pattern table shown in FIG. 22.

FIG. 23 shows recording pulses corresponding to different recording parameters regarding the leading edge of a shortest mark sandwiched between the space immediately previous thereto and the space immediately subsequent thereto. FIG. 23, part (a), shows an NRZI signal of pattern 2s2Tm2s, and FIG. 23, part (b), shows a recording pulse for the NRZI signal of pattern 2s2Tm2s; FIG. 23, part (c), shows an NRZI signal of pattern 2s2Tm4s, and FIG. 23, part (d), shows a recording pulse for the NRZI signal of pattern 2s2Tm4s; FIG. 23, part (e), shows an NRZI signal of pattern 3s2Tm2s, and FIG. 23, part (f), shows a recording pulse for the NRZI signal of pattern 3s2Tm2s; FIG. 23, part (g), shows an NRZI signal of pattern 3s2Tm4s, and FIG. 23, part (h), shows a recording pulse for the NRZI signal of pattern 3s2Tm4s; FIG. 23, part (i), shows an NRZI signal of pattern 4s2Tm2s, and FIG. 23, part (j), shows a recording pulse for the NRZI signal of pattern 4s2Tm2s; FIG. 23, part (k), shows an NRZI signal of pattern 4s2Tm4s, and FIG. 23, part (l), shows a recording pulse for the NRZI signal of pattern 4s2Tm4s; FIG. 23, part (m), shows an NRZI signal of pattern 5s2Tm2s, and FIG. 23, part (n), shows a recording pulse for the NRZI signal of pattern 5s2Tm2s; and FIG. 23, part (o), shows an NRZI signal of pattern 5s2Tm4s, and FIG. 23, part (p), shows a recording pulse for the NRZI signal of pattern 5s2Tm4s.

The space immediately previous to the recording mark as the target of the recording parameter adjustment is: in FIG. 23, parts (a) and (c), a 2T space; in FIG. 23, parts (e) and (g), a 3T space; in FIG. 23, parts (i) and (k), a 4T space; and in FIG. 23, parts (m) and (o), a 5T space.

The two NRZI signals shown in FIG. 23, parts (a) and (c), indicate that the space immediately previous to the recording mark as the target of the recording parameter adjustment is the shortest space (2T space) in both cases, but the length of the space immediately subsequent to the recording mark is the 2T shortest space in one case and is a space other than the shortest space in the other case. Therefore, even for recording the same 2T mark, different recording parameters of different recording pulses are set in accordance with the pattern of the NRZI signal as shown in FIG. 23, parts (b) and (d).

Here, the leading edge of the recording mark is adjusted to an appropriate edge position by the recording parameters of the rise edge position dTps2 of the first pulse and the fall edge position dTpe2 of the first pulse. Therefore, dTps2 and dTpe2 each have a value classified in accordance with the pattern table shown in FIG. 22. Namely, there are a table of dTps2 and a table of dTpe2. In this embodiment, the leading edge of the recording mark is adjusted by the recording parameters of dTps2 and dTpe2. Alternatively, only the position of the rise edge position dTps2 of the first pulse may be changed.

<Recording Condition Adjustment Method 2-2 Regarding the Leading Edge>

The recording condition adjustment method 2-2 is also regarding a leading edge and is characterized by the following: in the case where the immediately subsequent space is the shortest space in the adjustment method 2-1, the recording parameter is classified by the length of a recording mark immediately subsequent to the immediately subsequent space.

Namely, where a recording mark having a leading edge to be adjusted is a first recording mark, the recording condition is classified using a length of the first recording mark, a length of a first space located adjacently previous to the first recording mark, a length of a second space not located adjacent to the first space and located adjacent to the first recording mark, and a second recording mark located adjacent neither to the first recording mark nor the first space and located adjacent to the second space.

FIG. 24 provides a recording parameter table which shows a specific classification method of the recording condition used for the recording condition adjustment method 2-2. In FIG. 24, the patterns framed by the thick line is expanded with respect to FIG. 22. The patterns in the expanded part will be described.

As shown in FIG. 24, according to the recording condition adjustment method 2-2, in the case where the immediately subsequent space S(i+1) is the shortest space, the recording parameter is set differently in accordance with the length of the recording mark M(i+2) immediately subsequent to the shortest space. Specifically, the recording parameter is set differently in accordance with whether the length of the immediately subsequent recording mark M(i+2) is 2T or not. Owing to this, for example, in an error that a 2T continuous pattern 2m2s formed of a recording mark M(i) and an immediately subsequent space is entirely bit-shifted, different recording parameters can be set for a three 2T continuous pattern of 2m2s2m and for a two 2T continuous pattern of 2m2s!2m. Therefore, the recording parameter can be more appropriately set for a 2T continuous pattern, and the shift of the 2T continuous pattern, which is the cause of the error, can be decreased.

Figure 25:
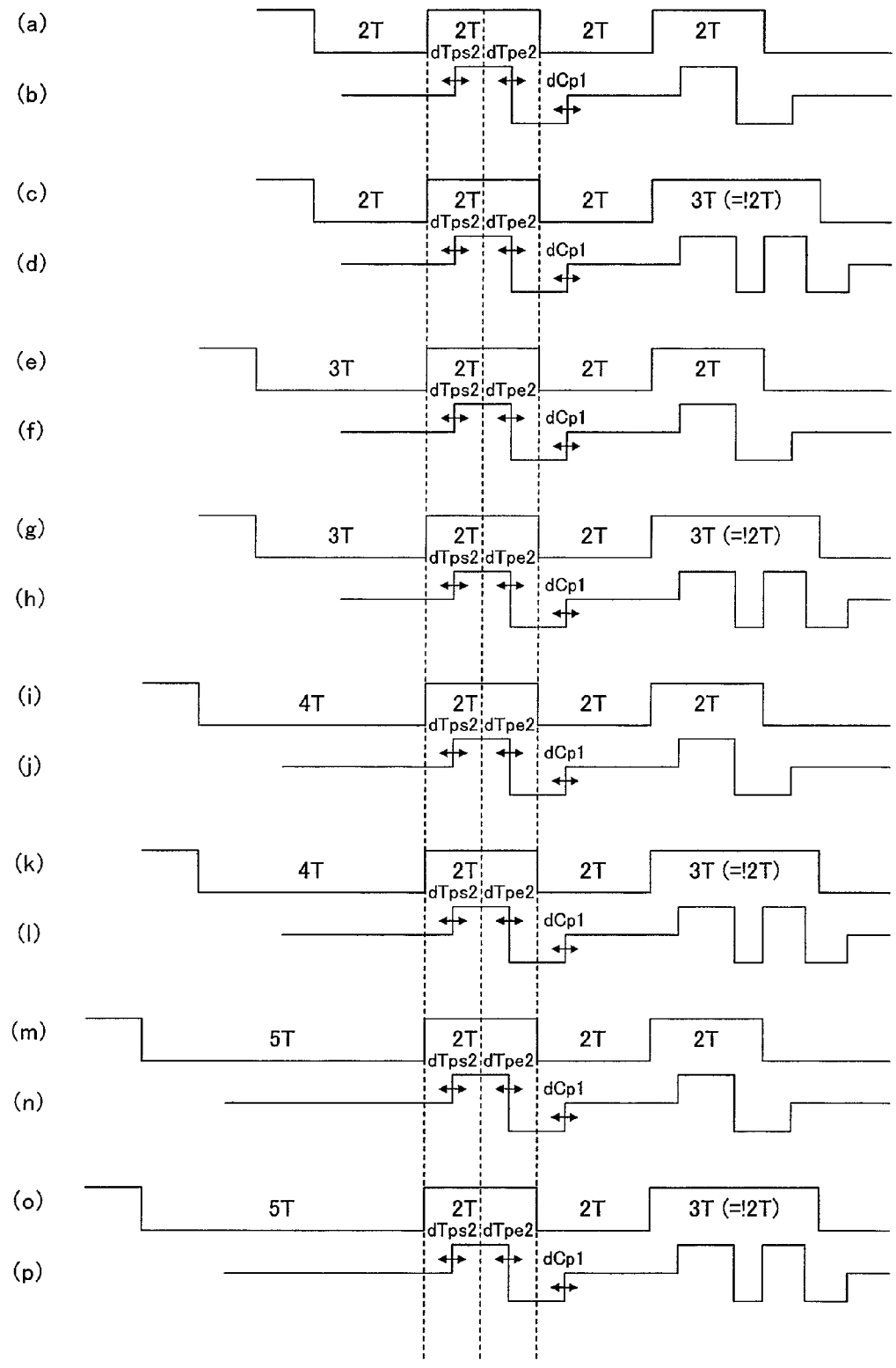
FIG. 25 shows recording pulses corresponding to the pattern table shown in FIG. 24.

FIG. 25 shows recording pulses corresponding to different recording parameters regarding the leading edge of a shortest mark sandwiched between the space immediately previous thereto and the shortest space immediately subsequent thereto. FIG. 25, part (a), shows an NRZI signal of pattern 2s2Tm2s2m, and FIG. 25, part (b), shows a recording pulse for the NRZI signal of pattern 2s2Tm2s2m; FIG. 25, part (c), shows an NRZI signal of pattern 2s2Tm2s3m, and FIG. 25, part (d), shows a recording pulse for the NRZI signal of pattern 2s2Tm2s3m; FIG. 25, part (e), shows an NRZI signal of pattern 3s2Tm2s2m, and FIG. 25, part (f), shows a recording pulse for the NRZI signal of pattern 3s2Tm2s2m; FIG. 25, part (g), shows an NRZI signal of pattern 3s2Tm2s3m, and FIG. 25, part (h), shows a recording pulse for the NRZI signal of pattern 3s2Tm2s3m; FIG. 25, part (i), shows an NRZI signal of pattern 4s2Tm2s2m, and FIG. 25, part (j), shows a recording pulse for the NRZI signal of pattern 4s2Tm2s2m; FIG. 25, part (k), shows an NRZI signal of pattern 4s2Tm2s3m, and FIG. 25, part (1) shows a recording pulse for the NRZI signal of pattern 4s2Tm2s3m; FIG. 25, part (m), shows an NRZI signal of pattern 5s2Tm2s2m, and FIG. 25, part (n), shows a recording pulse for the NRZI signal of pattern 5s2Tm2s2m; and FIG. 25, part (o), shows an NRZI signal of pattern 5s2Tm2s3m, and FIG. 25, part (p), shows a recording pulse for the NRZI signal of pattern 5s2Tm2s3m.

The space immediately previous to the recording mark as the target of the recording parameter adjustment is: in FIG. 25, parts (a) and (c), a 2T space; in FIG. 25, parts (e) and (g), a 3T space; in FIG. 25, parts (i) and (k), a 4T space; and in FIG. 25, parts (m) and (o), a 5T space. The two NRZI signals shown in FIG. 25, parts (a) and (c), indicate that the recording mark subsequent to the recording mark as the target of the recording parameter adjustment is the shortest 2T mark in one case and is a recording mark other than the shortest 2T mark (here, 3T mark) in the other case. Therefore, even for recording the same 2T mark, different recording parameters of different recording pulses are set in accordance with the pattern of the NRZI signal as shown in FIG. 25, parts (b) and (d). In FIG. 25, parts (b) and (d), the space immediately previous the recording mark as the target of the recording parameter adjustment is a 2T space. Regarding immediately previous spaces of other lengths, different recording parameters are set for different patterns in a similar manner.

<Recording Condition Adjustment Method 1-1 Regarding the Trailing Edge>

The recording condition adjustment method 1-1 is regarding a trailing edge and is characterized by the following: where a recording mark having a trailing edge to be adjusted is a first recording mark, the recording condition is classified using a length of the first recording mark, a length of a first space located adjacently subsequent to the first recording mark and a length of a second recording mark not located adjacent to the first recording mark and located adjacent to the first space.

FIG. 26 provides a recording parameter table which shows a specific classification method of the recording condition used for the recording condition adjustment method 1-1. As shown in the pattern table in FIG. 26, the recording condition is classified in the same manner as in the conventional pattern table in FIG. 4 in the case where the immediately subsequent space S(i+1) is a space other than the shortest space (2T), i.e., a 3T or longer space. Only in the case where the immediately subsequent space is the shortest space, the pattern representation varies in accordance with the length of the mark M(i+2) immediately subsequent to the shortest space. Namely, the recording parameter is set differently in accordance with the difference in the length of the mark immediately subsequent to the shortest space.

A reason for this is that as in the case where the immediately previous space is the shortest space, when the immediately subsequent space is the shortest space, the recording mark as the target of the recording parameter adjustment is most influenced by the thermal interference. Especially in the case where the recording mark M(i) is a 3T mark or longer, when the subsequent recording mark is the shortest mark 2Tm, the recording condition to be adjusted is a recording condition regarding the 12B patterns of the transition data sequence shown in FIG. 10 (more strictly, also including the 12A patterns relating to the 2T continuous patterns). When the previous recording mark is other than the shortest mark, i.e., !2Tm, the recording condition to be adjusted is a recording condition regarding the 12A patterns of the transition data sequence, shown in FIG. 9, which are not related to the 2T continuous patterns. Accordingly, when performing the evaluation using the above-described MLSE as an index, the 12A patterns (not related to the 2T continuous patterns) and the 12B patterns (including the 12A patterns relating to the 2T continuous patterns) can be separately evaluated and the recording conditions for these two types of patterns can be independently adjusted.

Figure 27:
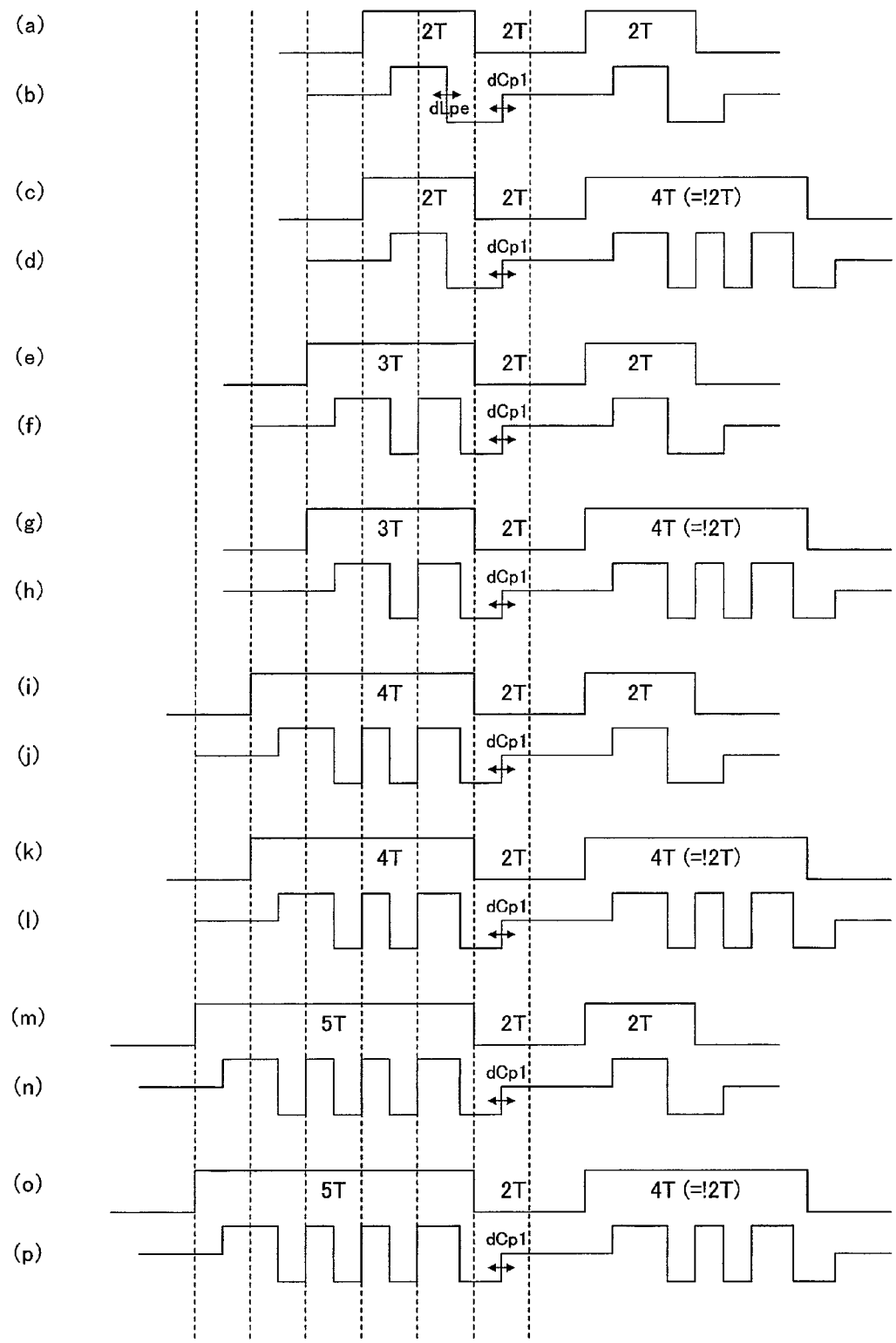
FIG. 27 shows recording pulses corresponding to the pattern table shown in FIG. 26.

FIG. 27 shows recording pulses corresponding to different recording parameters regarding the trailing edge of a recording mark in the case where the immediately subsequent space is the shortest space. FIG. 27, part (a), shows an NRZI signal of pattern 2Tm2s2m, and FIG. 27, part (b), shows a recording pulse for the NRZI signal of pattern 2Tm2s2m; FIG. 27, part (c), shows an NRZI signal of pattern 2Tm2s4m, and FIG. 27, part (d), shows a recording pulse for the NRZI signal of pattern 2Tm2s4m; FIG. 27, part (e), shows an NRZI signal of pattern 3Tm2s2m, and FIG. 27, part (f), shows a recording pulse for the NRZI signal of pattern 3Tm2s2m; FIG. 27, part (g), shows an NRZI signal of pattern 3Tm2s4m, and FIG. 27, part (h), shows a recording pulse for the NRZI signal of pattern 3Tm2s4m; FIG. 27, part (i), shows an NRZI signal of pattern 4Tm2s2m, and FIG. 27, part (j), shows a recording pulse for the NRZI signal of pattern 4Tm2s2m; FIG. 27, part (k), shows an NRZI signal of pattern 4Tm2s4m, and FIG. 27, part (1), shows a recording pulse for the NRZI signal of pattern 4Tm2s4m; FIG. 27, part (m), shows an NRZI signal of pattern 5Tm2s2m, and FIG. 27, part (n), shows a recording pulse for the NRZI signal of pattern 5Tm2s2m; and FIG. 27, part (o), shows an NRZI signal of pattern 5Tm2s4m, and FIG. 27, part (p), shows a recording pulse for the NRZI signal of pattern 5Tm2s4m.

The recording mark as the target of the recording parameter adjustment is: in FIG. 27, parts (a) and (c), a 2T mark; in FIG. 27, parts (e) and (g), a 3T mark; in FIG. 27, parts (i) and (k), a 4T mark; and in FIG. 27, parts (m) and (o), a 5T mark. The two NRZI signals shown in FIG. 27, parts (a) and (c), indicate that the recording mark immediately subsequent to the 2T shortest space which is subsequent to the 2T space is the shortest 2T mark in one case and is a mark other than the shortest 2T mark (here, 4T mark) in the other case. Therefore, even for recording the same 2T mark, different recording parameters of different recording pulses are set in accordance with the pattern of the NRZI signal as shown in FIG. 27, parts (b) and (d). In FIG. 27, parts (b) and (d), the recording mark is a 2T mark. Regarding recording marks of other lengths, different recording parameters are set for different patterns in a similar manner.

Here, the trailing edge of the recording mark is adjusted to an appropriate edge position by the recording parameter of the recording end position offset dCp1. In this case, the pattern table in FIG. 24 includes a table of dCp1. In this embodiment, the trailing edge of the recording mark is adjusted by the recording parameter of dCp1. Alternatively, the fall edge position dLpe of the last pulse (only shown in FIG. 27(b)) may be changed. It is noted that for a 2T mark, which is a mono-pulse, dTpe1 is in a competitive relationship against dTpe2 in terms of the pulse setting conditions. Therefore, the fall edge position dLpe of the pulse is usable only when neither dTpe1 nor dTpe2 is used in mono-pulse recording.

<Recording Condition Method 1-2 Regarding the Trailing Edge>

The recording condition adjustment method 1-2 is also regarding a trailing edge and is characterized by the following: in the case where the subsequent mark is the shortest mark in the adjustment method 1-1, the recording parameter is classified by the length of a space immediately subsequent to the subsequent mark. Namely, where a recording mark having a trailing edge to be adjusted is a first recording mark, the recording condition is classified using a length of the first recording mark, a length of a first space located adjacently subsequent to the first recording mark, a length of a second recording mark not located adjacent to the first recording mark and located adjacent to the first space, and a second space located adjacent neither to the first recording mark nor the first space and located adjacent to the second recording mark.

FIG. 28 provides a recording parameter table which shows a specific classification method of the recording condition used for the recording condition adjustment method 1-2. In FIG. 28, the patterns framed by the thick line is expanded with respect to FIG. 26. The patterns in the expanded part will be described.

As shown in FIG. 28, according to the recording condition adjustment method 1-2, in the case where the subsequent recording mark M(i+2) is the shortest mark, the recording parameter is set differently in accordance with the length of the space S(i+3) immediately subsequent to the shortest mark. Specifically, the recording parameter is set differently in accordance with whether the length of the immediately subsequent space S(i+3) is 2T or not. Owing to this, for example, in an error that a 2T continuous pattern 2s2m located immediately subsequent to the recording mark M(i) is entirely bit-shifted, different recording parameters can be set for a three 2T continuous pattern of 2s2m2s and for a two 2T continuous pattern of 2s2m!2s. Therefore, the recording parameter can be more appropriately set for a 2T continuous pattern, and the shift of the 2T continuous pattern, which is the cause of the error, can be decreased.

Figure 29:
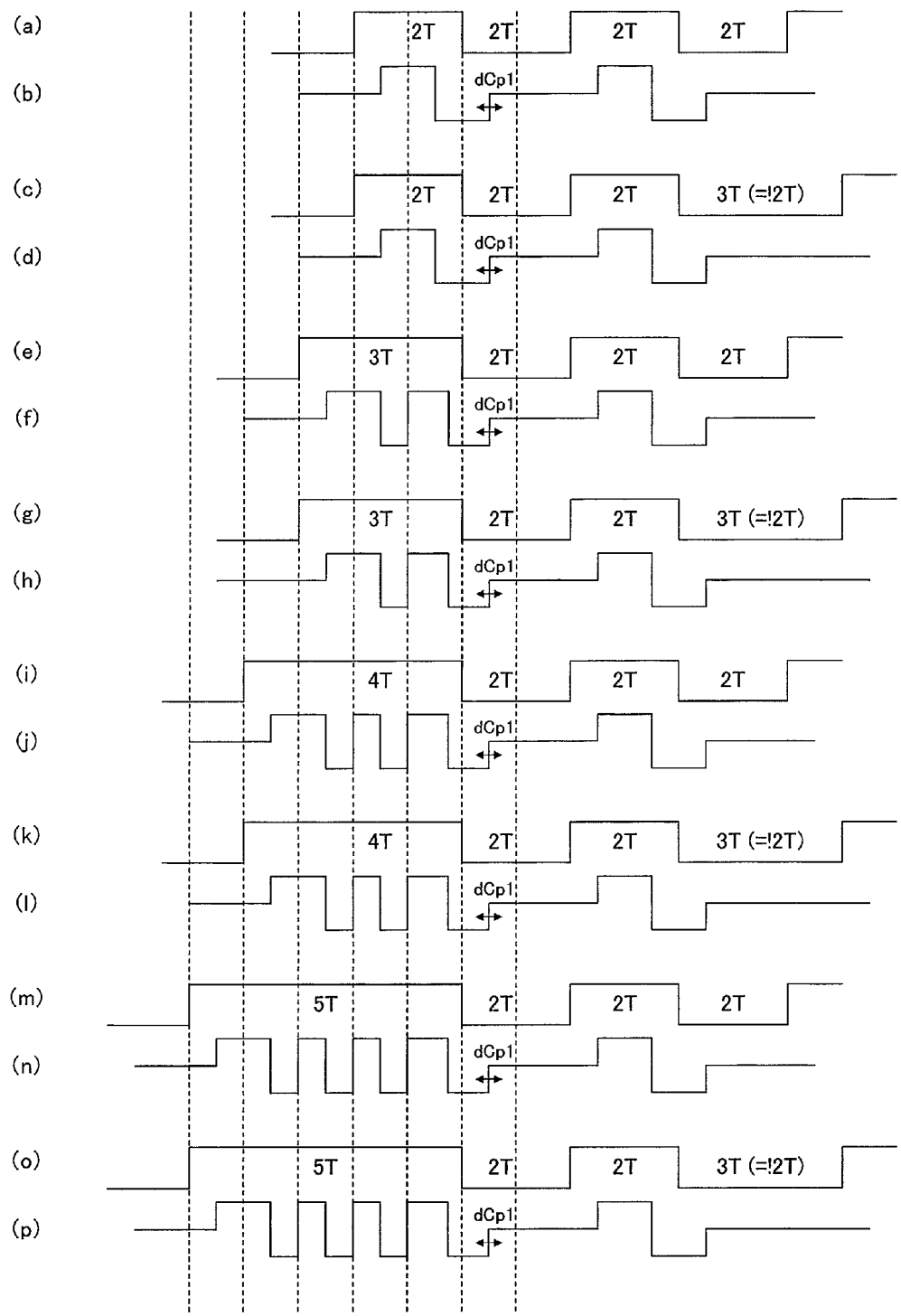
FIG. 29 shows recording pulses corresponding to the pattern table shown in FIG. 28.

FIG. 29 shows recording pulses corresponding to different recording parameters regarding the trailing edge of a recording mark in the case where the space immediately subsequent thereto is the shortest space and the recording mark immediately subsequent to the shortest space is the shortest mark. FIG. 29, part (a), shows an NRZI signal of pattern 2Tm2s2m2s, and FIG. 29, part (b), shows a recording pulse for the NRZI signal of pattern 2Tm2s2m2s; FIG. 29, part (c), shows an NRZI signal of pattern 2Tm2s2m3s, and FIG. 29, part (d), shows a recording pulse for the NRZI signal of pattern 2Tm2s2m3s; FIG. 29, part (e), shows an NRZI signal of pattern 3Tm2s2m2s, and FIG. 29, part (f), shows a recording pulse for the NRZI signal of pattern 3Tm2s2m2s; FIG. 29, part (g), shows an NRZI signal of pattern 3Tm2s2m3s, and FIG. 29, part (h), shows a recording pulse for the NRZI signal of pattern 3Tm2s2m3s; FIG. 29, part (i), shows an NRZI signal of pattern 4Tm2s2m2s, and FIG. 29, part (j), shows a recording pulse for the NRZI signal of pattern 4Tm2s2m2s; FIG. 29, part (k), shows an NRZI signal of pattern 4Tm2s2m3s, and FIG. 29, part (1), shows a recording pulse for the NRZI signal of pattern 4Tm2s2m3s; FIG. 29, part (m), shows an NRZI signal of pattern 5Tm2s2m2s, and FIG. 29, part (n), shows a recording pulse for the NRZI signal of pattern 5Tm2s2m2s; and FIG. 29, part (o), shows an NRZI signal of pattern 5Tm2s2m3s, and FIG. 29, part (p), shows a recording pulse for the NRZI signal of pattern 5Tm2s2m3s.

The recording mark as the target of the recording parameter adjustment is: in FIG. 29, parts (a) and (c), a 2T mark; in FIG. 29, parts (e) and (g), a 3T mark; in FIG. 29, parts (i) and (k), a 4T mark; and in FIG. 29, parts (m) and (o), a 5T mark. The two NRZI signals shown in FIG. 29, parts (a) and (c), indicate that the space immediately subsequent to the shortest mark which is subsequent to the recording mark as the target of the recording parameter adjustment is the shortest 2T space in one case and is a space other than the shortest 2T space (here, 3T space) in the other case. Therefore, even for recording the same 2T mark, different recording parameters of different recording pulses are set in accordance with the pattern of the NRZI signal as shown in FIG. 29, parts (b) and (d). In FIG. 29, parts (b) and (d), the recording mark is a 2T mark. Regarding recording marks of other lengths, different recording parameters are set for different patterns in a similar manner.

<Recording Condition Adjustment Method 2-1 Regarding the Trailing Edge>

The recording condition adjustment method 2-1 is regarding a trailing edge and is characterized by the following: where a recording mark having a trailing edge to be adjusted is a first recording mark, the recording condition is classified using a length of the first recording mark, a length of a first space located adjacently subsequent to the first recording mark and a length of a second space not located adjacent to the first space and located adjacent to the first recording mark.

More specifically, when a length of the first recording mark is longer than a prescribed length, the recording condition is classified using a combination of the length of the first recording mark and the length of the first space located adjacently subsequent to the first recording mark. By contrast, when the length of the first recording mark is equal to or shorter than the prescribed length, the recording condition is classified using a combination of the length of the first recording mark, the length of the first space, and the length of the second space not located adjacent to the first space and located adjacent to the first recording mark.

FIG. 30 provides a recording parameter table which shows a specific classification method of the recording condition used for the recording condition adjustment method 2-1. As shown in FIG. 30, it is understood that the recording condition is classified in the same manner as in the conventional pattern table in FIG. 4 in the case where the recording mark is a mark other than the shortest mark, i.e., a 3T or longer mark. Only in the case where the recording mark M(i) is the shortest mark, the pattern representation varies in accordance with the length of the space S(i−1) immediately previous to the shortest mark. Namely, the recording parameter is set differently in accordance with whether the length of the space immediately previous to the shortest mark is 2T or not. As shown in FIG. 30, the recording parameter is classified in accordance with the type of the immediately subsequent space S(i+1) among four types of 2T, 3T, 4T and 5T and also in accordance with the type of the immediately previous space S(i−1) among two types of 2T and other than 2T. In the case where the recording mark M(i) is 3T or longer, the recording parameter is classified in accordance with the type of the immediately subsequent space S(i+1) among four types of 2T, 3T, 4T and 5T but is not classified in accordance with the type of the immediately previous space S(i−1). Therefore, the number of types of the lengths of the immediately previous space is larger than the number of types of the lengths of the immediately subsequent space regardless of the length of the recording mark M(i).

As described above, in high density recording, the shortest mark is shorter than the other recording marks. Therefore, even when the immediately subsequent space is long, if the immediately previous space is short, the heat amount generated at the time of forming a recording mark immediately previous to the short space is conducted. Namely, the shortest mark is influenced by the heat generated by the previous formation of a recording mark. Generally in this case, the influence of the heat is related to the leading edge of the recording mark. However, in high density recording, this also influences the trailing edge as well as the leading edge because the recording mark is extremely short. Therefore, in this embodiment, the recording parameter is classified by the difference in the length of the space immediately previous to the shortest mark, so that a more appropriate recording mark can be formed in high density recording.

Namely, a recording condition is classified by the length of the first recording mark. The recording condition is a parameter for adjusting a position of the trailing edge of the first recording mark. However, the recording condition classified by the length of the first recording mark into at least one category, i.e., a category that the length of the first recording mark is equal to or shorter than a prescribed length, is further classified into two in accordance with whether the length of the second space adjacently previous to the first recording mark is equal to or shorter than the prescribed length or longer than the prescribed length.

In this embodiment, regarding the length of the immediately previous space, the recording condition is classified in accordance with whether such a length is the shortest space 2Ts which is most liable to be influenced by the thermal conduction or another length, i.e., !2Ts. This is performed in consideration of the scale of the circuit having the recording parameter. In the case where the circuit scale can be ignored, it is desirable that 3T or longer spaces can be individually classified.

Especially in the case where the immediately subsequent space S(i+1) is a 3T space or longer, when the immediately previous space is the shortest space 2Ts, the recording condition to be adjusted is a recording condition regarding the 12B patterns of the transition data sequence shown in FIG. 10 (more strictly, also including the 12A patterns relating to the 2T continuous patterns). When the immediately previous space is other than the shortest space, i.e., !2Ts, the recording condition to be adjusted is a recording condition regarding the 12A patterns of the transition data sequence, shown in FIG. 9, which are not related to the 2T continuous patterns. Accordingly, when performing the evaluation using the above-described MLSE as an index, the 12A patterns (not related to the 2T continuous patterns) and the 12B patterns (including the 12A patterns relating to the 2T continuous patterns) can be separately evaluated and the recording conditions for these two types of patterns can be independently adjusted.

Figure 31:
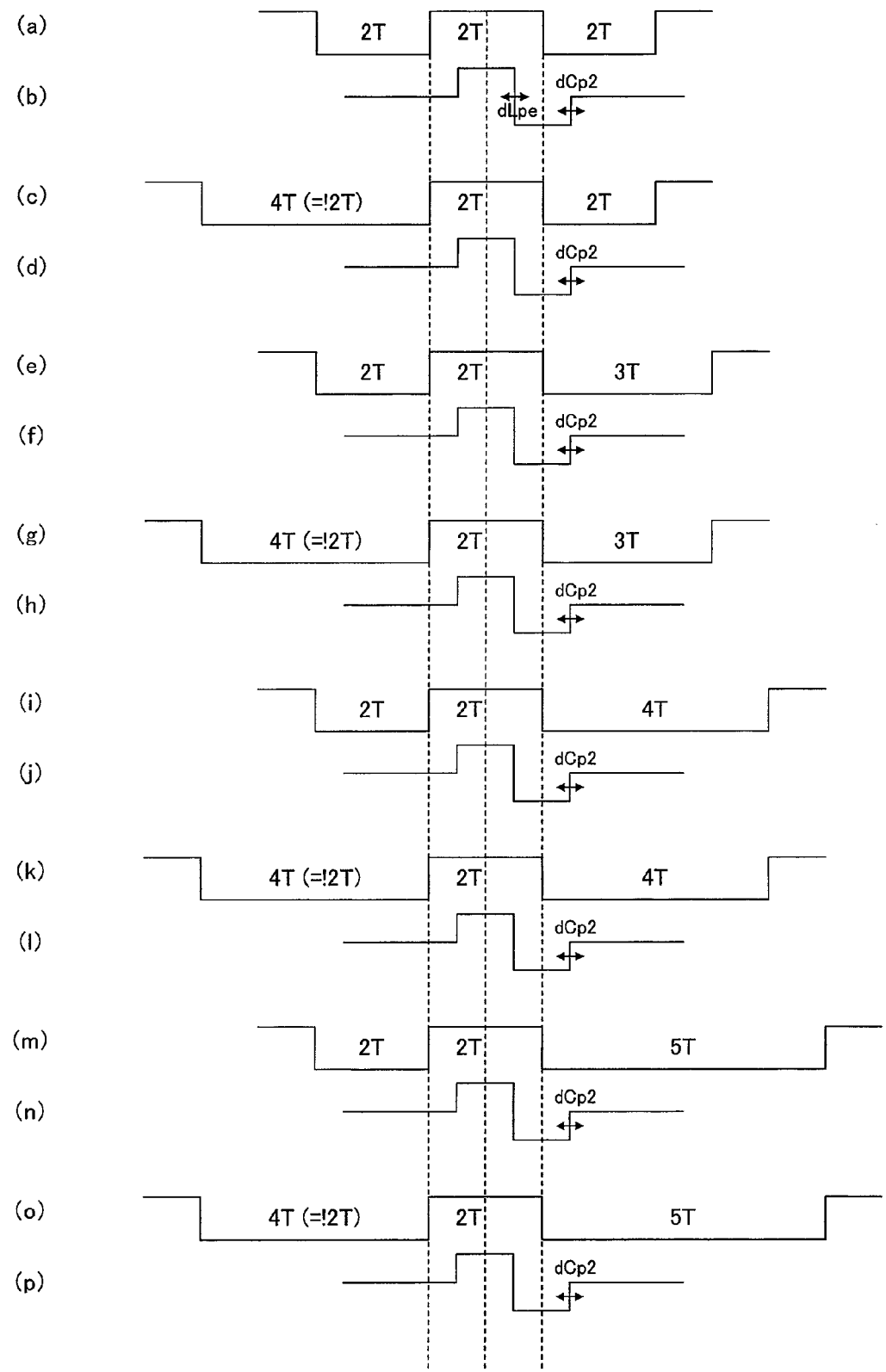
FIG. 31 shows recording pulses corresponding to the pattern table shown in FIG. 30.

FIG. 31 shows recording pulses corresponding to different recording parameters regarding the trailing edge of a shortest mark sandwiched between the space immediately previous thereto and the space immediately subsequent thereto. FIG. 31, part (a), shows an NRZI signal of pattern 2s2Tm2s, and FIG. 31, part (b), shows a recording pulse for the NRZI signal of pattern 2s2Tm2s; FIG. 31, part (c), shows an NRZI signal of pattern 4s2Tm2s, and FIG. 31, part (d), shows a recording pulse for the NRZI signal of pattern 4s2Tm2s; FIG. 31, part (e), shows an NRZI signal of pattern 2s2Tm3s, and FIG. 31, part (f), shows a recording pulse for the NRZI signal of pattern 2s2Tm3s; FIG. 31, part (g), shows an NRZI signal of pattern 4s2Tm3s, and FIG. 31, part (h), shows a recording pulse for the NRZI signal of pattern 4s2Tm3s; FIG. 31, part (i), shows an NRZI signal of pattern 2s2Tm4s, and FIG. 31, part (j), shows a recording pulse for the NRZI signal of pattern 2s2Tm4s; FIG. 31, part (k), shows an NRZI signal of pattern 4s2Tm4s, and FIG. 31, part (1), shows a recording pulse for the NRZI signal of pattern 4s2Tm4s; FIG. 31, part (m), shows an NRZI signal of pattern 2s2Tm5s, and FIG. 31, part (n), shows a recording pulse for the NRZI signal of pattern 2s2Tm5s; and FIG. 31, part (o), shows an NRZI signal of pattern 4s2Tm5s, and FIG. 31, part (p), shows a recording pulse for the NRZI signal of pattern 4s2Tm5s.

The space immediately subsequent to the recording mark as the target of the recording parameter setting is: in FIG. 31, parts (a) and (c), a 2T space; in FIG. 31, parts (e) and (g), a 3T space; in FIG. 31, parts (i) and (k), a 4T space; and in FIG. 31, parts (m) and (o), a 5T space.

The two NRZI signals shown in FIG. 31, parts (a) and (c), indicate that the space immediately previous to the recording mark as the target of the recording parameter adjustment is the shortest space in one case and is a space other than the shortest space (here, 4T space) in the other case. Therefore, even for recording the same 2T mark, different recording parameters of different recording pulses are set in accordance with the pattern of the NRZI signal as shown in FIG. 31, parts (b) and (d). In FIG. 31, parts (b) and (d), the space immediately subsequent to the recording mark as the target of the recording parameter adjustment is a 2T space. Regarding recording immediately subsequent spaces of other lengths, different recording parameters are set for different patterns in a similar manner.

Here, the trailing edge of the recording mark is adjusted to an appropriate edge position by the recording parameter of the recording end position offset dCp2. In this case, the pattern table in FIG. 28 includes a table of dCp2. In this embodiment, the trailing edge of the recording mark is adjusted by the recording parameter of dCp2. Alternatively, the fall edge position dLpe of the last pulse (only shown in FIG. 31(b)) may be changed. It is noted that for a 2T mark, which is a mono-pulse, dTpe1 is in a competitive relationship against dTpe2 in terms of the pulse setting conditions. Therefore, the fall edge position dLpe of the pulse is usable only when neither dTpe1 nor dTpe2 is used in mono-pulse recording.

<Recording Condition Adjustment Method 2-2 Regarding the Trailing Edge>

The recording condition adjustment method 2-2 is also regarding a leading edge and is characterized by the following: in the case where the immediately previous space is the shortest space in the adjustment method 2-1, the recording parameter is classified by the length of a recording mark immediately previous to the immediately previous space.

Namely, where a recording mark having a trailing edge to be adjusted is a first recording mark, the recording condition is classified using a length of the first recording mark, a length of a first space located adjacently subsequent to the first recording mark, a length of a second space not located adjacent to the first space and located adjacent to the first recording mark, and a second recording mark located adjacent neither to the first recording mark nor the first space and located adjacent to the second space.

FIG. 32 provides a recording parameter table which shows a specific classification method of the recording condition used for the recording condition adjustment method 2-2. In FIG. 32, the patterns framed by the thick line is expanded with respect to FIG. 30. The patterns in the expanded part will be described.

As shown in FIG. 32, according to the recording condition adjustment method 2-2, in the case where the immediately previous space S(i−1) is the shortest space, the recording parameter is set differently in accordance with the length of the recording mark M(i−2) immediately previous to the shortest space. Specifically, the recording parameter is set differently in accordance with whether the length of the immediately previous recording mark M(i−2) is 2T or not. Owing to this, for example, in an error that a 2T continuous pattern 2s2m formed of a recording mark M(i) and an immediately previous space is entirely bit-shifted, different recording parameters can be set for a three 2T continuous pattern of 2m2s2m and for a two 2T continuous pattern of !2m2s2m. Therefore, the recording parameter can be more appropriately set for a 2T continuous pattern, and the shift of the 2T continuous pattern, which is the cause of the error, can be decreased.

Figure 33:
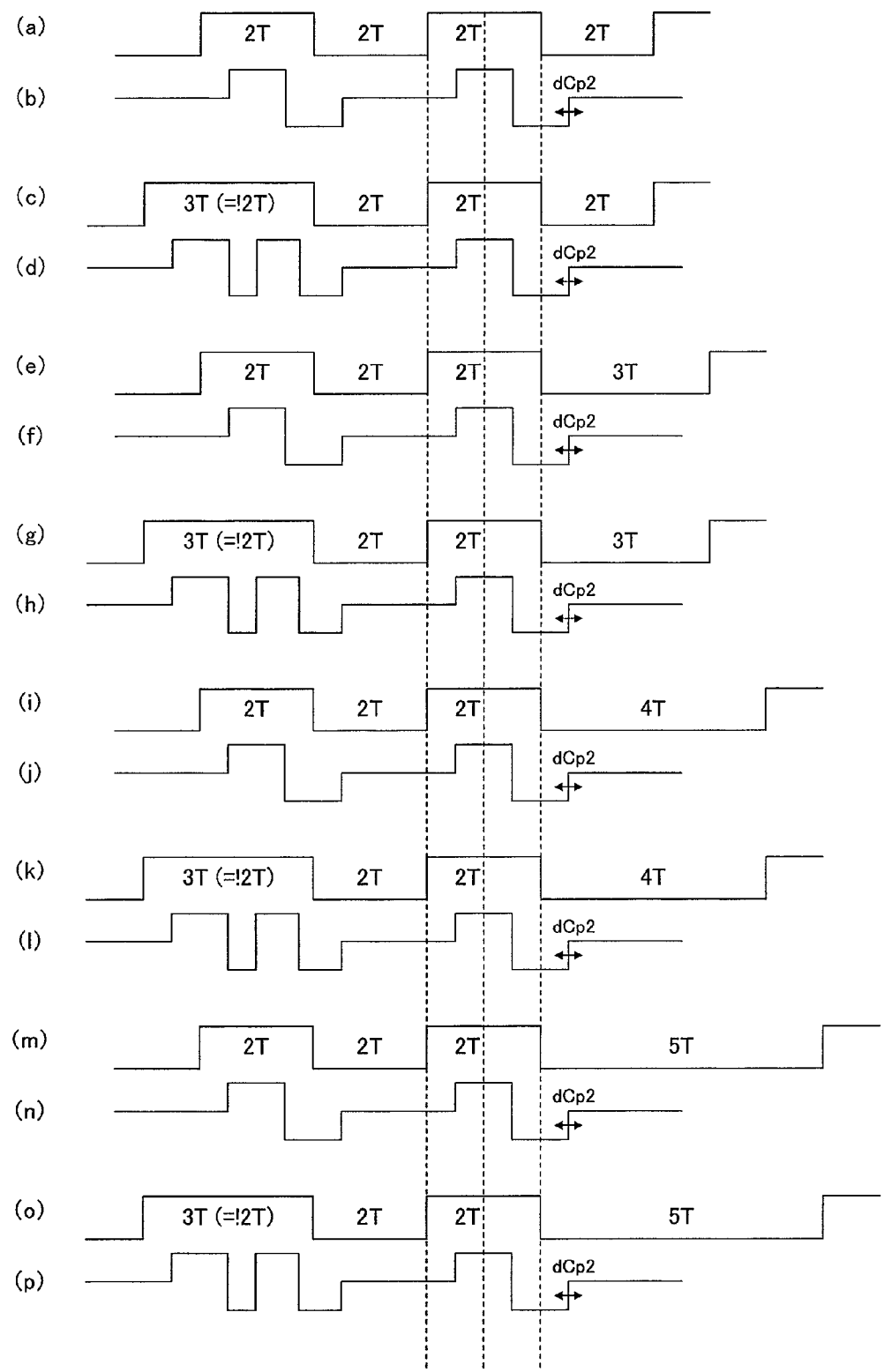
FIG. 33 shows recording pulses corresponding to the pattern table shown in FIG. 32.

FIG. 33 shows recording pulses corresponding to different recording parameters regarding the trailing edge of a shortest mark sandwiched between the space immediately subsequent thereto and the space immediately previous to the shortest space. FIG. 33, part (a), shows an NRZI signal of pattern 2m2s2Tm2s, and FIG. 33, part (b), shows a recording pulse for the NRZI signal of pattern 2m2s2Tm2s; FIG. 33, part (c), shows an NRZI signal of pattern 3m2s2Tm2s, and FIG. 33, part (d), shows a recording pulse for the NRZI signal of pattern 3m2s2Tm2s; FIG. 33, part (e), shows an NRZI signal of pattern 2m2s2Tm3s, and FIG. 33, part (f), shows a recording pulse for the NRZI signal of pattern 2m2s2Tm3s; FIG. 33, part (g), shows an NRZI signal of pattern 3m2s2Tm3s, and FIG. 33, part (h), shows a recording pulse for the NRZI signal of pattern 3m2s2Tm3s; FIG. 33, part (i), shows an NRZI signal of pattern 2m2s2Tm4s, and FIG. 33, part (j), shows a recording pulse for the NRZI signal of pattern 2m2s2Tm4s; FIG. 33, part (k), shows an NRZI signal of pattern 3m2s2Tm4s, and FIG. 33, part (l), shows a recording pulse for the NRZI signal of pattern 3m2s2Tm4s; FIG. 33, part (m), shows an NRZI signal of pattern 2m2s2Tm5s, and FIG. 33, part (n), shows a recording pulse for the NRZI signal of pattern 2m2s2Tm5s; and FIG. 33, part (o), shows an NRZI signal of pattern 3m2s2Tm5s, and FIG. 33, part (p), shows a recording pulse for the NRZI signal of pattern 3m2s2Tm5s.

The space immediately subsequent to the recording mark as the target of the recording parameter adjustment is: in FIG. 33, parts (a) and (c), a 2T space; in FIG. 33, parts (e) and (g), a 3T space; in FIG. 33, parts (i) and (k), a 4T space; and in FIG. 33, parts (m) and (o), a 5T space. The two NRZI signals shown in FIG. 33, parts (a) and (c), indicate that the recording mark previous to the recording mark as the target of the recording parameter adjustment is the shortest 2T mark in one case and is a recording mark other than the shortest 2T mark (here, 3T mark) in the other case.

Therefore, even for recording the same 2T mark, different recording parameters of different recording pulses are set in accordance with the pattern of the NRZI signal as shown in FIG. 33, parts (b) and (d). In FIG. 33, parts (b) and (d), the space immediately subsequent to the recording mark as the target of the recording parameter adjustment is a 2T space. Regarding immediately subsequent spaces of other lengths, different recording parameters are set for different patterns in a similar manner.

As described above, in this embodiment, the recording condition for recording a data sequence on a track is classified using a combination of a length of a recording mark as the target of the recording parameter adjustment and a length of a space adjacently previous or subsequent thereto. When the length of the recording mark as the target of the recording parameter adjustment is equal to or shorter than a prescribed length, the classification is performed also using a length of a space which is adjacently subsequent or previous to the above adjacent space. Therefore, even where the size of the recording mark is extremely decreased and the recording density of the information recording medium becomes high, a recording mark having an appropriate shape can be recorded at an appropriate position at higher precision in consideration of the influence of the heat generated when an adjacent recording mark is formed.

Only when the length of the recording mark as a target of the recording parameter adjustment is equal to or shorter than a prescribed length, the recording condition is classified into a smaller category. Therefore, the classification is not redundant, and the recording condition can be adjusted at an appropriate parameter scale. Thus, neither the circuit scale, of the recording apparatus, required for the recording adjustment nor the area for storing the recording parameters is made excessively large, and the time required for the adjustment of the recording conditions does not become excessively long.

Embodiment 2

Hereinafter, an embodiment of a recording apparatus, a reproduction apparatus, an evaluation apparatus, a recording method and a reproduction method according to the present invention will be described.

Figure 34:
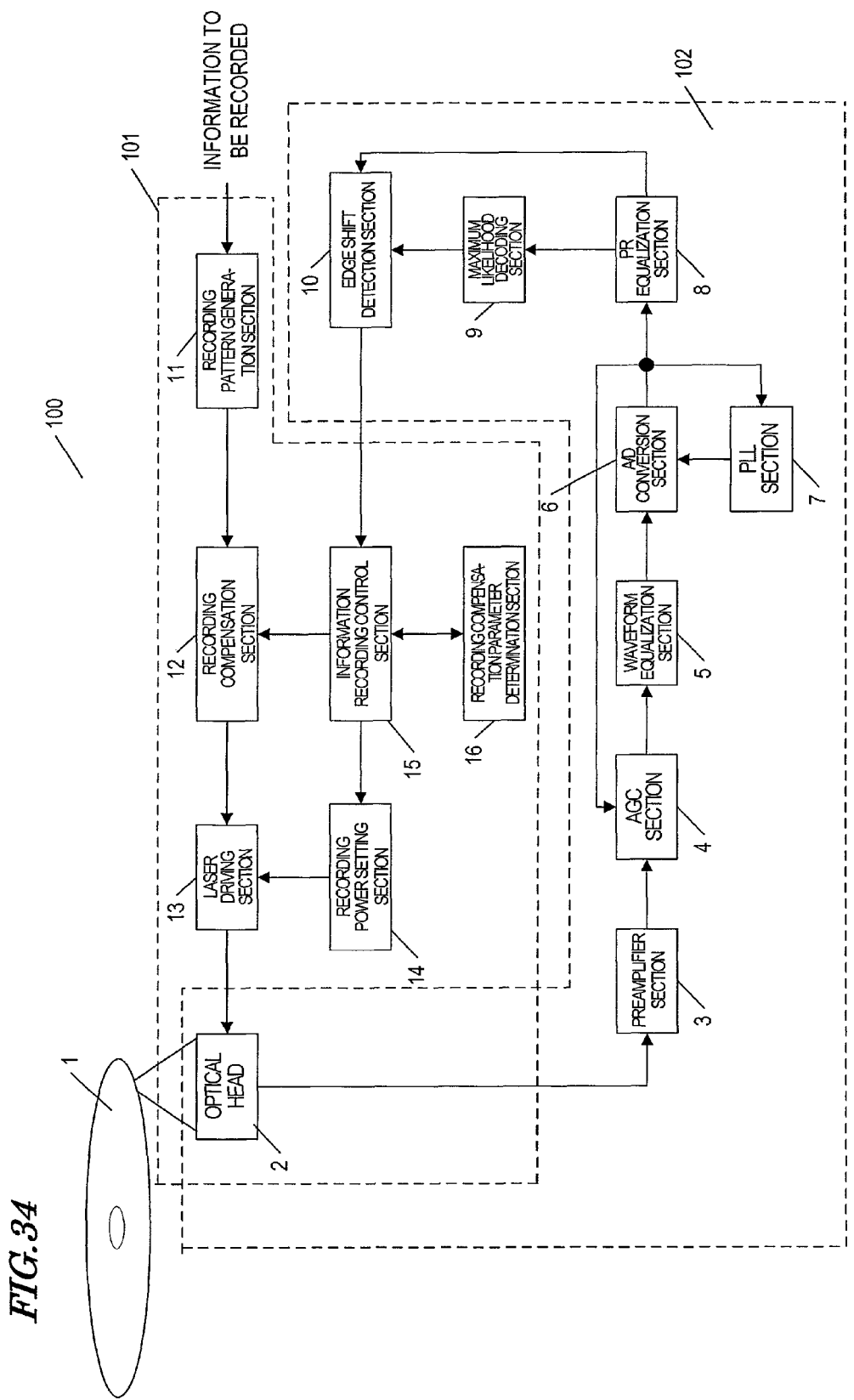
FIG. 34 is a block diagram showing an information recording/reproduction apparatus according to an embodiment of the present invention.

FIG. 34 is a block diagram showing a structure of an information recording/reproduction apparatus 100 acting as a recording apparatus, a reproduction apparatus and an evaluation apparatus. The information recording/reproduction apparatus 100 includes a recording control section 101 and a reproduction signal processing section 102.

The recording control section 101 includes an optical head 2, a recording pattern generation section 11, a recording compensation section 12, a laser driving section 13, a recording power setting section 14, an information recording control section 15, and a recording compensation parameter determination section 16. The reproduction signal processing section 102 includes an optical head 2, a preamplifier section 3, an AGC section 4, a waveform equalization section 5, an A/D conversion section 6, a PLL section 7, a PR equalization section 8, a maximum likelihood decoding section 9, and an edge shift detection section 10.

An information recording medium 1 is mounted on the information recording/reproduction apparatus 100. The information recording medium 1 is used for optical information recording or reproduction, and is, for example, an optical disc.

The optical head 2 converges laser light which has passed through an objective lens onto a track of an information recording layer of an information recording medium 1. For performing recording, the optical head 2 forms a recording mark on the track using laser light of a prescribed recording power. For performing reproduction, the optical head 2 receives reflected light obtained by irradiating the track with laser light of a reproduction power and generates an analog reproduction signal representing information which is recorded on the information recording medium 1. The numerical aperture of the objective lens is 0.7 to 0.9, and preferably 0.85. The wavelength of the laser light is 410 nm or shorter, and preferably 405 nm.

The preamplifier section 3 amplifiers the analog reproduction signal at a prescribed gain and outputs the resultant signal to the AGC section 4. The AGC section 4 amplifies the reproduction signal using a preset target gain such that the reproduction signal output from the A/D conversion section 6 has a constant level, and outputs the resultant signal to the waveform equalization section 5.

The waveform equalization section 5 has an LPF characteristic for blocking a high frequency range of the reproduction signal and a filtering characteristic for amplifying a prescribed frequency range of the reproduction signal. The waveform equalization section 5 shapes the waveform of the reproduction signal to a desired characteristic and outputs the resultant signal to the A/D conversion section 6. The PLL section 7 generates a reproduction clock synchronized with the waveform-equalized reproduction signal and outputs the reproduction clock to the A/D conversion section 6.

The A/D conversion section 6 samples the reproduction signal in synchronization with the reproduction clock output from the PLL section 7, converts the analog reproduction signal into a digital reproduction signal, and outputs the digital reproduction signal to the PR equalization section 8, the PLL section 7 and the AGC section 4.

The PR equalization section 8 has a frequency characteristic which is set such that the frequency characteristic of the reproduction system is the characteristic assumed by the maximum likelihood decoding section 9 (for example, the PR(1,2,2,2,1) equalization characteristic). The PR equalization section 8 executes PR equalization processing on the reproduction signal so as to suppress high range noise thereof, and intentionally add inter-symbol interference thereto, and outputs the resultant reproduction signal to the maximum likelihood decoding section 9. The PR equalization section 8 may include an FIR (Finite Impulse Response) filtering structure, and may adaptively control the tap coefficient using the LMS (The Least-Mean Square) algorithm (see, "Tekio Shingo Shori Algorithm (Adaptable Signal processing Algorithm) published by Kabushiki Kaisha Baifukan).

The maximum likelihood decoding section 9 is, for example, a Viterbi decoder. The maximum likelihood decoding section 9 decodes the reproduction signal which is PR-equalized by the PR equalization section 8 using a maximum likelihood decoding system of estimating a most likely sequence based on the code rule intentionally added in accordance with the type of the partial response, and outputs binary data. This binary data is demodulated, and as a result, use data, which is information recorded on the information recording medium 1, is reproduced.

The edge shift detection section 10 receives the waveform-shaped digital reproduction signal output from the PR equalization section 8 and the binary signal output from the maximum likelihood decoding section 9. The edge shift detection section 10 compares the transition data sequences shown in FIGS. 8, 9 and 10 against the binary signal. When the binary signal matches the transition data sequences shown in FIGS. 8, 9 and 10, the edge shift detection section 10 selects a most likely first state transition sequence 1 and a most likely second state transition sequence 2 based on FIGS. 8, 9 and 10.

Based on the selection results, a metric, which is a distance between an ideal value of each state transition sequence (PR equalization ideal value; see FIGS. 8, 9 and 10) and the digital reproduction signal, is calculated. Also, a difference between the metrics calculated on the two state transition matrices is calculated. Finally, based on the binary signal, the edge shift detection section 10 assigns the metric difference to each of leading edge/trailing edge patterns of the recording mark, and finds an edge shift of a recording compensation parameter from the optimal value, for each pattern.

The recording compensation parameter determination section 16 classifies a data sequence including a plurality of recording marks and a plurality of spaces provided between the plurality of recording marks by data pattern including at least one recording mark and at least one space, and determines the recording condition for each data pattern.

Specifically, the classification is performed using a combination of the length of a first recording mark and the length of a first space located adjacently previous or subsequent to the first recording mark, which are both included in the data sequence. Then, the classification is further performed using the length of a second recording mark which is not located adjacent to the first recording mark and is located adjacent to the first space. A recording condition is assigned to each classified data pattern.

Alternatively, the classification is performed using a combination of the length of a first recording mark and the length of a first space located adjacently previous or subsequent to the first recording mark, which are both included in the data sequence. Then, the classification is further performed using the length of a second space which is not located adjacent to the first space and is located adjacent to the first recording mark. A recording condition is assigned to each classified data pattern.

Namely, the recording compensation parameter determination section 16 determines a pattern table of the recording parameters, which are the recording conditions classified by data pattern. The pattern table does not need to be determined for each recording operation, and is uniquely determined in accordance with the type of the information recording medium 1 to which the data is to be recorded, conditions such as the recording speed, for example, 2×, and the PRML system of the reproduction signal processing.

The information recording control section 15 changes the setting of the recording parameter in accordance with the pattern table determined by the recording compensation parameter determination section 16.

It is noted here that the information recording control section 15 determines a position at which the recording parameter setting needs to be changed, based on the edge shift amount detected by the edge shift detection section 10. Therefore, it is desirable that the pattern classification obtained by the edge shift detection section 10 is the same as the pattern table classification obtained by the recording compensation parameter determination section 16.

The recording pattern generation section 11 modulates the information to be recorded and generates an NRZI signal, which is a data sequence. The recording compensation section 12 generates a recording pulse sequence in accordance with the NRZI signal based on the recording parameter changed by the information recording control section 15. The recording power setting section 14 sets recording powers including the peak power Pp and bottom power Pbw. The laser driving section 13 controls the laser light emitting operation of the optical head 2 in accordance with the recording pulse sequence and the recording powers which are set by the recording power setting section 14.

Now, an operation of the information recording/reproduction apparatus 100 will be described in detail. As shown in FIG. 34, when the information recording medium 1 is mounted, the optical head 2 moves to a recording area for adjusting the recording parameter to the optimal recording parameter. The recording area is, for example, a recording area for adjusting the recording powers and the recording pulse, which are provided in an innermost zone of the information recording medium.

The recording pattern generation section 11 generates a pattern for recording adjustment as a data sequence for test recording, and outputs the pattern to the recording compensation section 12. The information recording control section 15 applies initial recording conditions stored inside the recording/reproduction apparatus (for example, on a memory) to the recording conditions of the pattern table determined by the recording compensation pattern determination section 16, and thus sets the recording parameters of the recording pulse shape and the recording powers. The recording conditions may be recorded in the PIC area of the information recording medium 1. In this case, information on the recording conditions may be obtained from the information recording medium 1 by irradiating the PIC area with laser light and applied to the initial recording conditions.

The recording compensation section 12 generates a recording pulse sequence having the laser light emitting waveform in accordance with the pattern for the recording adjustment based on the recording pulse waveform, which is output from the information recording control section 15 as the recording parameter.

The recording power setting section 14 sets the recording powers including the peak power Pp and the bottom power Pbw in accordance with the initial recording conditions provided by the information recording control section 15.

The laser driving section 13 controls the laser light emitting operation of the optical head 2 in accordance with the recording pulse sequence generated by the recording compensation section 12 and the recording powers which are set by the recording power setting section 14. Then, the laser driving section 13 records the recording data on the information recording medium 1.

Next, the information recording/reproduction apparatus 100 reproduces recording data which has been recorded.

The optical head 2 generates an analog reproduction signal indicating information which is read from the information recording medium 1. The analog reproduction signal is amplified and AC-coupled by the preamplifier section 3 and then is input to the AGC section 4. By the AGC section 4, the gain is adjusted such that the output from the waveform equalizer 5 on a later stage has a constant amplitude. The analog reproduction signal output from the AGC section 4 is waveform-shaped by the waveform equalizer 5. The waveform-shaped analog reproduction signal is output to an A/D conversion section 6. The A/D conversion section 6 samples the analog reproduction signal in synchronization with a reproduction clock output from the PLL section 7. The PLL section 7 extracts the reproduction clock from a digital reproduction signal obtained by the sampling performed by the A/D conversion section 6.

The digital reproduction signal generated by the sampling performed by the A/D conversion section 6 is input to the PR equalization section 8. The PR equalization section 8 shapes the waveform of the digital reproduction signal. The maximum likelihood decoding section 9 performs maximum likelihood decoding on the waveform-shaped digital reproduction signal output from the PR equalization section 8 to generate a binary signal.

The edge shift detection section 10 receives the waveform-shaped digital reproduction signal output from the PR equalization section 8 and the binary signal output from the maximum likelihood decoding section 9. The edge shift detection section 10 also finds an edge shift, which is a shift of the recording compensation parameter from the optimal value. The edge shift is output to the information recording control section 15.

Based on the result of comparing the edge shift amount detected by the edge shift detection section 10 and a target amount of the edge shift stored inside the information recording/reproduction apparatus (for example, on a memory), the information recording control section 15 changes a recording parameter, the setting change of which is determined as being required, for example, a recording parameter which is different from the target value by more than a prescribed value (for example, an error of 20%). The target value is desirably 0 because the edge shift is a shift of the recording parameter from the optimal value.

By the above-described operation, the information recording/reproduction apparatus 100 according to this embodiment performs a recording operation on the information recording medium 1, detects an edge shift amount by reproducing the recorded information, and updates and adjusts the recording condition such that the edge shift amount approaches the target value. In this manner, the information recording/reproduction apparatus 100 can optimize the recording condition.

As described in Embodiment 1, the above-described recording operation is performed in accordance with the pattern table created in consideration of a high-order PRML system. Therefore, the recording is performed in consideration of edges of a plurality of marks and spaces, instead of an edge shift between one space and one recording mark considered in the conventional art. Hence, in high density recording which requires a high-order PRML system, the error rate of the recording information can be reduced, and thus a more stable recording/reproduction system can be provided.

In the above embodiment, the information recording/reproduction apparatus including the reproduction signal processing section 102 is used in order to describe the recording/reproduction operation. The present invention is also applicable to an information recording apparatus including only the recording control section 101 for performing only recording control.

In the pattern tables in the above embodiment, the recording marks or spaces having a length of 5T or longer are put into one category. Alternatively, the recording marks or spaces having a length of 5T through the maximum length may be set differently from one another.

In the above embodiment, the edge position of the recording pulse is varied in accordance with the pattern. Alternatively, the entire recording pulse may be shifted in accordance with the pattern. In this case, the recording parameter used for recording adjustment is not necessary. Therefore, the memory capacity in the information recording/reproduction apparatus for storing the recording parameters can be reduced.

The recording conditions classified in the pattern tables may be described in the information recording medium. In this case, the recording compensation parameter determination section 16 does not need to determine the pattern table for each type of the information recording medium or for each recording speed. Therefore, the circuit scale can be reduced. In the case where the optimal recording condition for each information recording medium is described in accordance with the pattern table, the work or time of recording parameter adjustment can be reduced.

In the above embodiment, the target value of the edge shift is 0. Alternatively, the edge shift may be set for each type of information recording mediums of various manufacturers, for each recording speed, or for each specific pattern included in the pattern table. The target value is stored, for example, during the production of the information recording/reproduction apparatus. By keeping on storing target values corresponding to newly developed information recording mediums, compatibility to new information recording mediums is obtained. Therefore, it is desirable to store the target values on rewritable memories. A target value for a new information recording medium can be determined by reproducing the recording mark, formed with the optimal recording parameter, by the information recording/reproduction apparatus 100.

In the above embodiment, maximum likelihood decoding is performed using a state transition rule defined by a code having a shortest mark length of 2 and the equalization system PR(1,2,2,2,1). The present invention is not limited to this.

For example, the present invention is also applicable to a case where a code having a shortest mark length of 2 or 3 and the equalization system PR(C0, C1, C0) are used, to a case where a code having a shortest mark length of 2 or 3 and the equalization system PR(C0, C1, C1, C0) are used, or to a case where a code having a shortest mark length of 3 and the equalization system PR(C0, C1, C2, C1, C0) are used. C0, C1 and C2 are each an arbitrary positive numeral.

In the above embodiment, detailed classification is performed using only the marks and spaces having the shortest length, but the present invention is not limited to this. For example, the present invention is applicable to marks or spaces having the second shortest length, or marks or spaces having larger lengths, instead of marks having the shortest length.

The information recording medium in the above embodiment is not limited to an optical disc such as a CD, DVD or BD, and may be a magneto-optical medium such as an MO (Magneto-Optical Disc), or an information recording medium on which information is stored by changing the length or phase of the information in accordance with a polarity interval, by which the recording code (0 or 1) of a digital signal is continuous (such information is a recording mark or a space in the above embodiment).

A part of the recording/reproduction apparatus according to the present invention may be produced as a one-chip LSI (semiconductor integrated circuit) or a partial function thereof as a recording condition adjustment apparatus, which is for adjusting the recording pulse shape for recording information on an information recording medium. When a part of the recording/reproduction apparatus is produced as a one-chip LSI, the signal processing time for adjusting the recording parameter can be significantly reduced. Each part of the recording/reproduction apparatus may be independently produced as an LSI.

(Recording Waveform)

In the above embodiment, the write pulse included in the write pulse sequence has a multi-pulse waveform. Alternatively, the write pulse may have other waveforms. Hereinafter, with reference to FIGS. 35 through 37, the waveforms of write pulse usable in the present invention including the multi-pulse waveform will be described.

Figure 1:
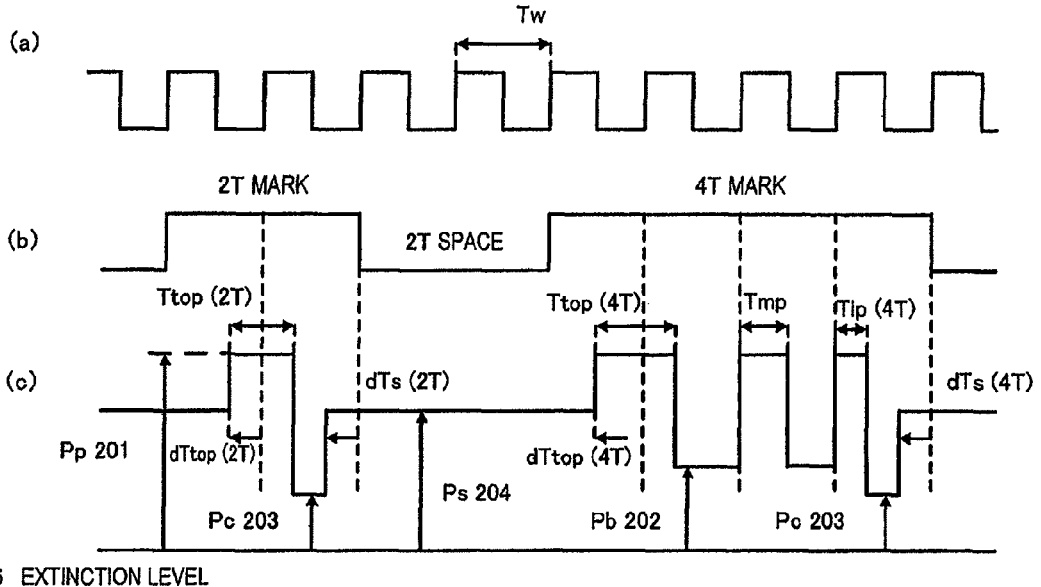
FIG. 1 shows recording pulse waveforms and recording power for forming a data sequence including a recording mark and a space.
Figure 2:
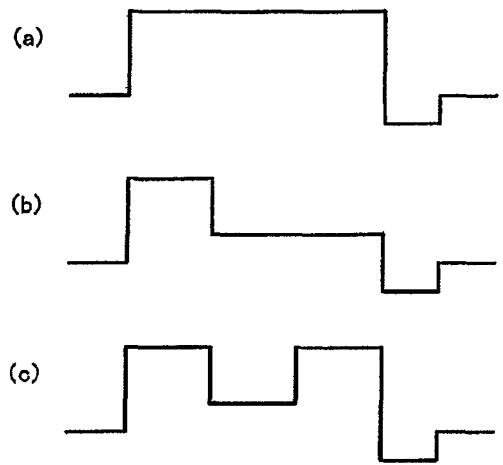
FIG. 2 shows examples of recording pulse shapes.
Figure 35:
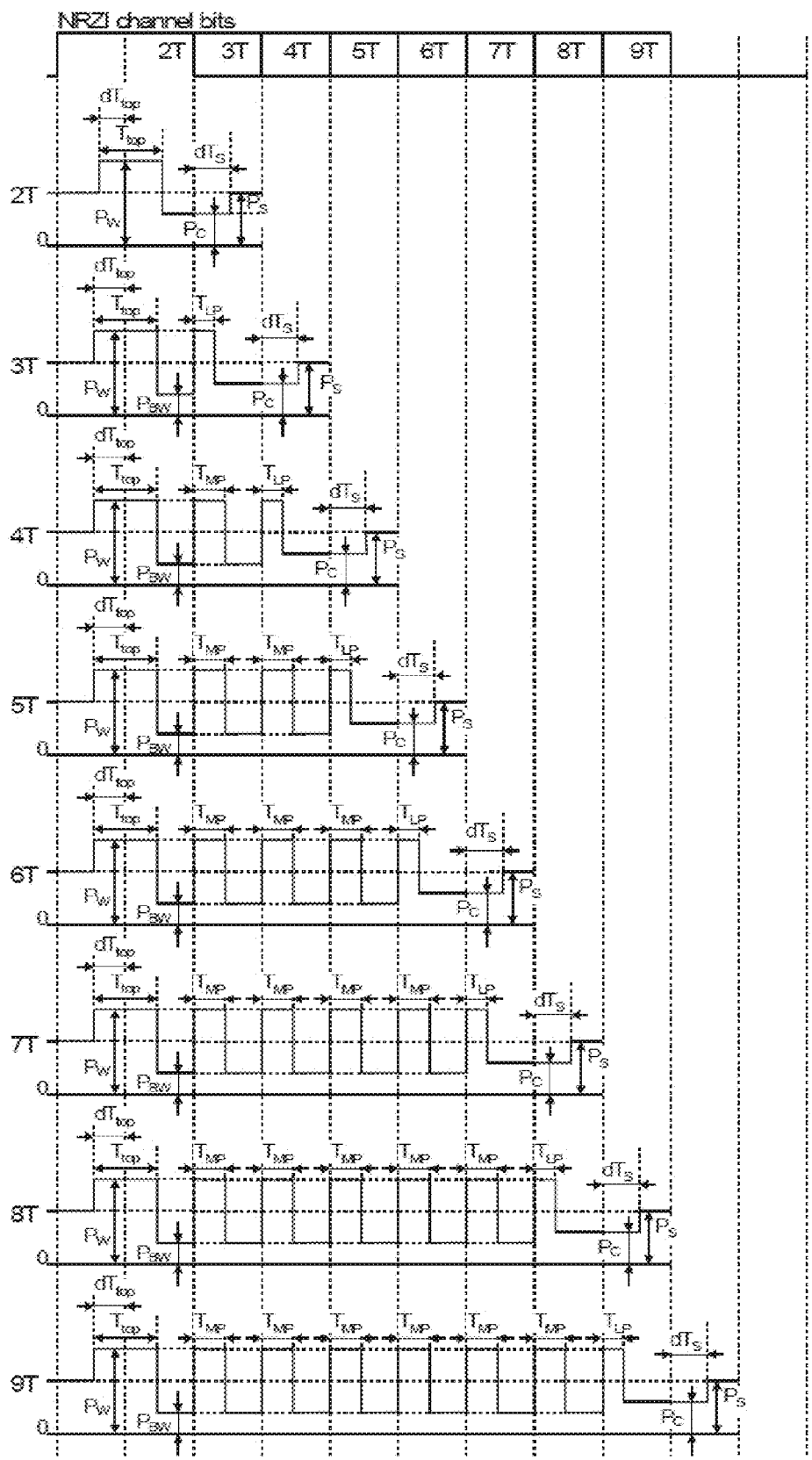
FIG. 35 shows an example of recording pulse waveforms usable in the present invention.
Figure 36:
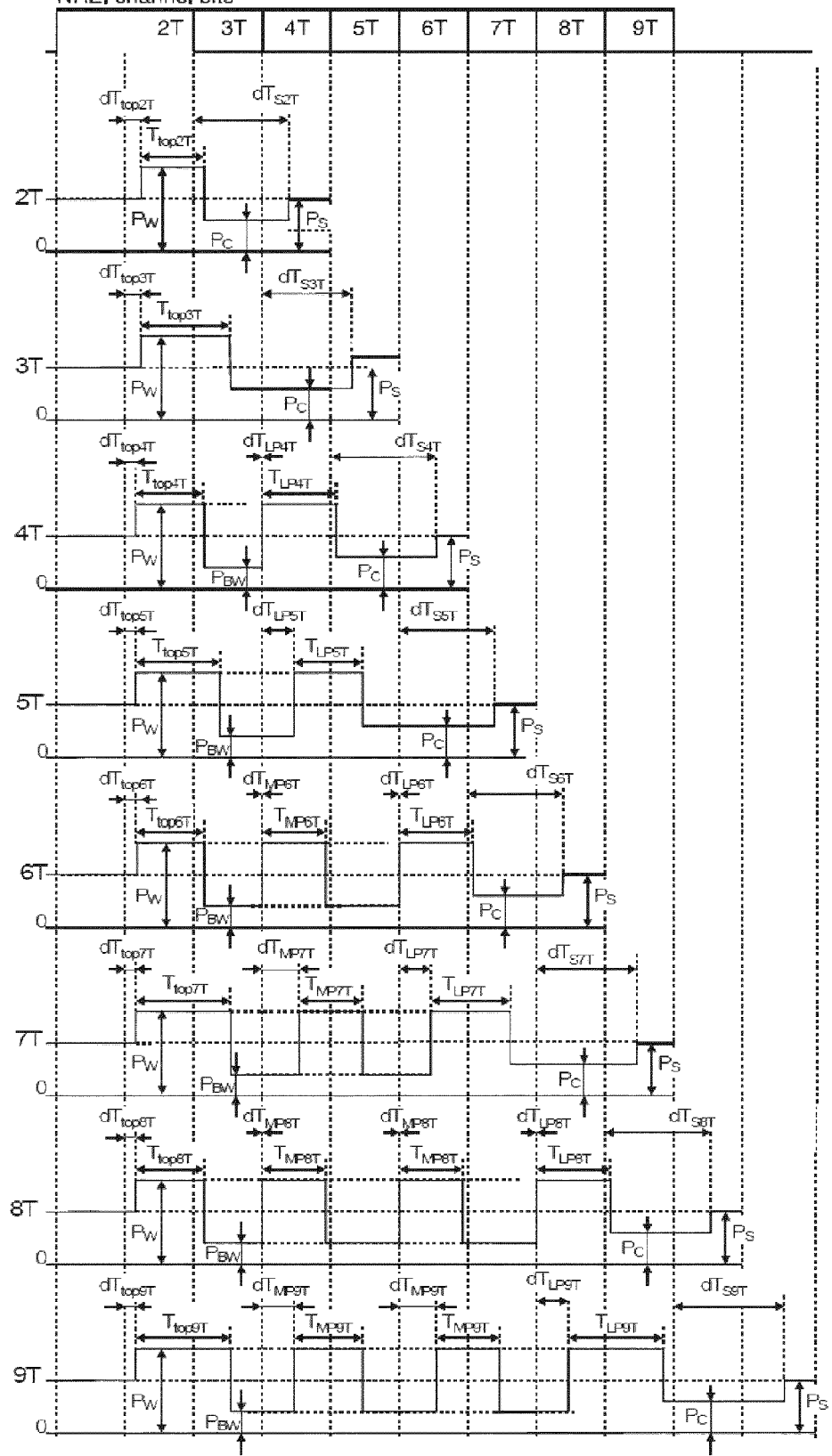
FIG. 36 shows another example of recording pulse waveforms usable in the present invention.
Figure 37:
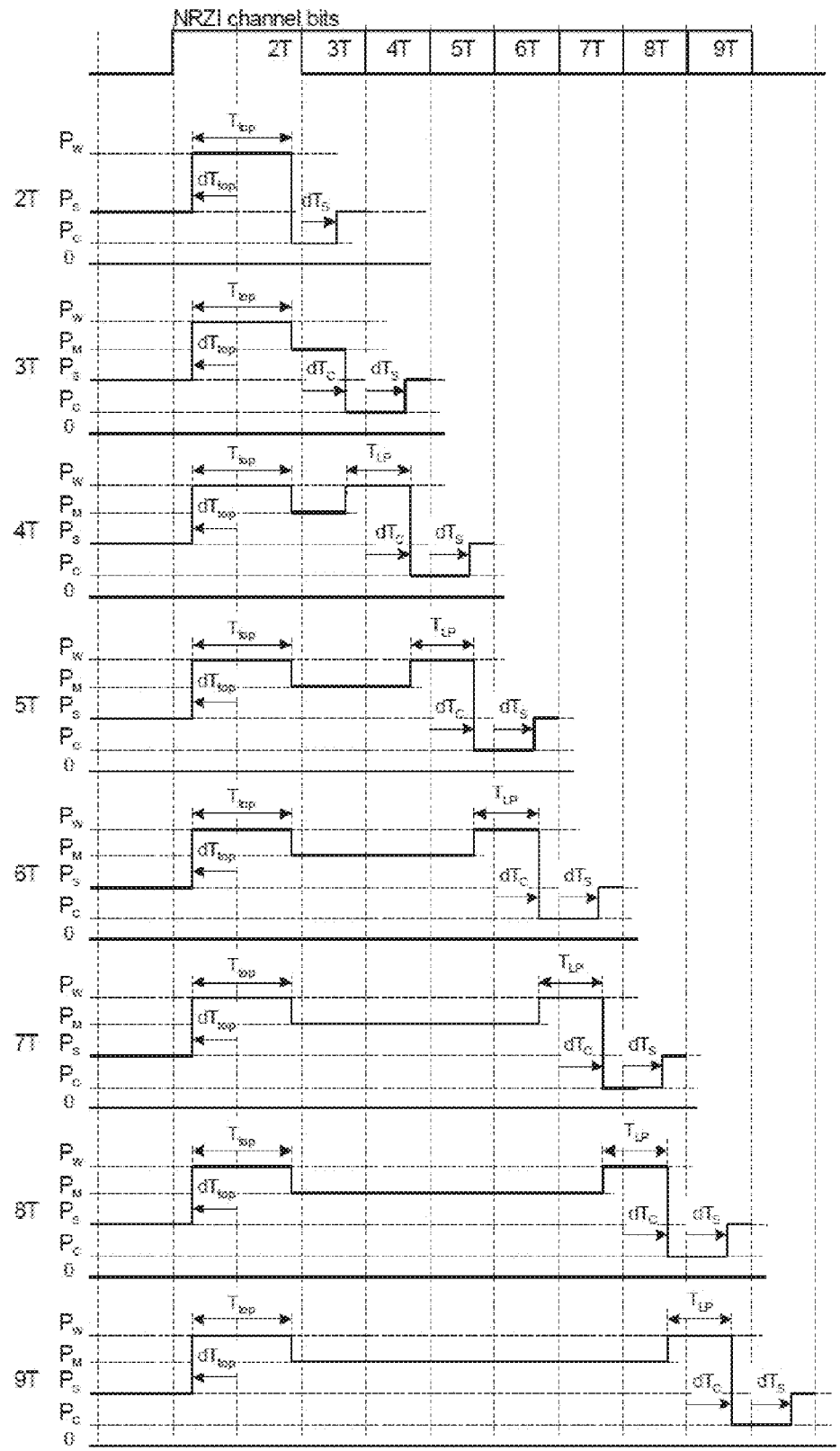
FIG. 37 shows still another example of recording pulse waveforms usable in the present invention.

Generally speaking, a write operation is performed on an optical disc by modulating data to be written (user data or source data) following a predetermined modulation rule to generate multiple modulated recording code patterns, irradiating the disc with pulsed light beams, and forming recording marks and spaces, each having a length corresponding to that of an associated one of the multiple modulated recording code patterns. Hereinafter, three examples will be given to describe on what write waveforms those pulsed light beams are generated. In each of FIGS. 35 through 37, the shortest mark is supposed to have a length of 2T (where T is one reference cycle time of a reference clock and modulation). However, the shortest mark is not limited to this. In the description on FIG. 1, the length of each of a recording mark and a space is 2T through 8T. In FIGS. 35 through 37, the length of 9T is also included. 9T is a pattern used as a sync. code (synchronization code sequence).

Usually, for writing data (original source data/pre-modulation binary data) on a storage medium, data is divided into data of a prescribed size, and the data divided into the prescribed size is further divided into frames of a prescribed length. For each frame, a prescribed sync. code/synchronization code sequence is inserted (frame sync. area). The data divided into frames is written as a data code sequence modulated in accordance with a prescribed modulation rule matching the recording/reproduction signal characteristics of the storage medium (frame data area).

By contrast, to the sync. code/synchronization code sequence inserted between the frames, the prescribed modulation rule is not applied. Therefore, the sync. code/synchronization code sequence can include a pattern other than the code length restricted by the modulation rule. The sync. code/synchronization code sequence determines the reproduction processing timing for reproducing the written data. When, for example, the 1-7 modulation is used as the prescribed modulation rule, the length of a mark is limited to 2T to 8T. Therefore, as a pattern included in the sync. code, 9T, which does not appear by the 1-7 modulation, is used.

<N-1 Strategy>

FIG. 35 illustrates a first type of write waveforms. Each write waveform of this first type has a multi-pulse-type strategy (i.e., includes multiple pulses), and includes a first pulse (with a width Ttop) to be arranged earlier than any other one of the multiple pulses, a last pulse (with a width Tlp) to be arranged at the very last, and middle pulses (with a width Tmp) interposed between the first and last pulses. Among the recording-power-related parameters, Pw represents the recording power, Pbw represents the bottom power, Pc represents the cooling power, and Ps (Pe) represents the bias power. More specifically, Ps represents a space power in a write-once disc and Pe represents an erase power in a rewritable disc. The recording power Pw is also referred to as the "peak power Pp". The bottom power is also represented as Pb.

The write waveform to record the shortest mark (2T) has no last pulse or middle pulses. The write waveform to record the second shortest mark (3T) has no middle pulses. The middle pulses start to be included in the write waveform to record the third shortest mark (4T). And every time the length increases by 1T, the number of middle pulses increases by one. This first type of write waveform is partly characterized in that a write waveform to record an nT mark (where n is a natural number) has (n-1) pulses.

In this case, the various types of parameters may be defined by classifying the lengths of the recording marks and their adjacent spaces in the following manner. First of all, dTtop and Ttop representing the leading edge position and width of the first pulse may be defined by classifying the lengths of the recording marks into the three categories of "2T", "3T" and "4T or more" and/or classifying the lengths of adjacent preceding spaces into the four categories of "2T", "3T", "4T" and "5T or more".

Also, Tlp representing the width of the last pulse may be defined by classifying the lengths of the recording marks into the two categories of "3T" and "4T or more".

Furthermore, dTs marking the end point of the cooling power level Pc (or the start point of the bias power level Ps or Pe) may be defined by classifying the lengths of the recording marks into the three categories of "2T", "3T" and "4T or more".

<N/2 Strategy>

FIG. 36 illustrates a second type of write waveforms. Each write waveform of this second type also has a multi-pulse-type strategy. The write waveforms to record the shortest mark (2T) and the second shortest mark (3T) have no last pulse or middle pulses. The write waveforms to record the third shortest mark (4T) and the fourth shortest mark (5T) have no middle pulses. The middle pulses start to be included in the write waveform to record the fifth shortest mark (6T). And every time the length increases by 2T, the number of middle pulses increases by one. This second type of write waveform is partly characterized in that a write waveform to record an mT mark (where m is a natural number) is the quotient of (m+2).

In this case, the various types of parameters may be defined by classifying the lengths of the recording marks in the following manner. First of all, dTtop and Ttop representing the leading edge position and width of the first pulse may be defined by classifying the lengths of the recording marks into the four categories of "2T", "3T", "4T, 6T or 8T" and "5T, 7T or 9T".

Also, dTmp representing the leading edge position of the middle pulses may be defined by classifying the lengths of the recording marks into the two categories of "6T or 8T" and "7T or 9T". Furthermore, the leading edge position may agree with that of the reference clock pulse in the former category and may shift from that of the reference clock pulse by T/2 in the latter category.

Furthermore, dTlp and Tlp representing the position and width of the leading edge of the last pulse may be defined by classifying the lengths of the recording marks into the two categories of "4T, 6T or 8T" and "5T, 7T or 9T". Optionally, the leading edge position dTlp may agree with that of the reference clock pulse in the former category and may shift from that of the reference clock pulse by T/2 in the latter category.

Furthermore, dTs marking the end point of the cooling power level Pc (or the start point of the bias power level Ps or Pe) may be defined by classifying the lengths of the recording marks into the four categories of "2T", "3T", "4T, 6T or 8T" and "5T, 7T or 9T".

<Castle Type>

FIG. 37 illustrates a third type of write waveforms. Unlike the first and second types of write waveforms with the multi-pulse-type strategy, each waveform of this third type is shaped such that the power level between pulses, for which the recording powers Pw are set, does not decrease to the bottom power Pbw but is maintained at a certain intermediate power level Pm. That is to say, the write waveform of this third type has a castle-type strategy, and also is formed of a first pulse (with a width Ttop) to be arranged at the top, a last pulse (with a width Tlp) to be arranged at the very last, and a middle pulse interposed between the first and last pulses. Among the recording-power-related parameters, Pw represents the recording power, Pm represents the intermediate power, Pc represents the cooling power, and Ps (Pe) represents the bias power. More specifically, Ps represents a space power in a write-once disc and Pe represents an erase power in a rewritable disc.

The write waveform to record the shortest mark (2T) has no last pulse or middle pulse. The write waveform to record the second shortest mark (3T) have no last pulse. The last and middle pulses start to be both included in the write waveform to record the third shortest mark (4T). In each write waveform to make a recording mark of 3T or more, the end point of the first pulse agrees with the start point of the middle pulse. And in each write waveform to make a recording mark of 4T or more, the end point of the middle pulse agrees with the start point of the last pulse.

The castle type strategy is available in several shapes; specifically, castle-shape, L-shape and mono pulse-shape. In the castle-shape, the write waveform to make a recording mark is formed of only one write pulse and has a shape that includes a first interval that begins with the leading edge of the write pulse and that defines a first power level (i.e., the recording power Pw), a second interval that begins with the end point of the first interval and that defines a second power level (i.e., the intermediate power Pm) that is lower than the first power level, and a third interval that begins with the end point of the second interval and that defines a power level that is higher than the second power level but is as high as the first power level (i.e., the recording power Pw) or a lower than the first power level. In the L-shape, the write waveform has a shape in which the power levels of the third and second intervals of the castle-shape are made equal to each other. In the mono pulse-shape, the write waveform has a shape in which the power levels of the first, second and third intervals of the castle-shape are made equal to one another.

In the example illustrated in FIG. 37, the power levels of the first and third intervals are supposed to equal to each other to avoid complicating the description overly. Naturally, however, mutually different levels may be set for these two intervals, too. In any case, in the foregoing description, a portion of this write pulse for which the power level of the first interval is defined is referred to as a "first pulse", another portion of the write pulse for which the power level of the second interval is defined an "middle pulse", and the other portion of the write pulse for which the power level of the third interval is defined a "last pulse". Thus, this naming (i.e., the first, intermediate and last pulses) will be used continuously for the rest of the description.

In this case, the various types of parameters may be defined by classifying the lengths of the recording marks and their adjacent spaces in the following manner. First of all, dTtop and Ttop representing the leading edge position and width of the first pulse may be defined by classifying the lengths of the recording marks into the three categories of "2T", "3T" and "4T or more" and/or classifying the lengths of adjacent preceding spaces into the three categories of "2T", "3T", and "4T or more".

Also, Tlp representing the width of the last pulse may be defined by regarding the lengths of the recording marks to be "4T or more". That is to say, every recording mark including the last pulse and having a length of 4T or more may have the same width.

Furthermore, dTc marking the start point of the cooling power level Pc may be defined by classifying the lengths of the recording marks into the three categories of "3T", "4T" and "5T or more".

Furthermore, dTs marking the end point of the cooling power level Pc (i.e., the start point of the bias power level Ps or Pe) may be defined by classifying the lengths of the recording marks into the three categories of "2T", "3T" and "4T or more".

The manner of classification of the parameters described regarding the N-1 strategy, N/2 strategy and castle type write pulses usable in the present invention is different from the manner of classification described in the above embodiments for the convenience of explanation. For example, in the above embodiments, the parameters are classified by only the length of a recording mark, or a combination of only the length of a recording mark and the length of a space adjacent thereto. However, the manner of classification in the above embodiments can be preferably combined with the manner of classification described regarding the waveforms of the write pulses.

Specifically, as shown in, for example, FIGS. 22 and 23, a recording parameter for adjusting the leading edge of the recording mark having the N-1 strategy, N/2 strategy or castle type write pulse waveform may be classified by a combination of the length of the recording mark M(i) and the length of a space immediately previous thereto S(i−1). When the length of M(i) is equal to or shorter than a prescribed length (for example, is the shortest mark), the recording parameter may be further classified by a combination including the length of a space immediately subsequent thereto S(i+1); more specifically, in accordance with whether S(i+1) is equal to or shorter than a prescribed length (for example, is the shortest space) or longer than the prescribed length.

Alternatively, as shown in, for example, FIGS. 28 and 29, a recording parameter for adjusting the trailing edge of the recording mark having the N-1 strategy, N/2 strategy or castle type write pulse waveform may be classified by a combination of the length of the recording mark M(i) and the length of a space immediately subsequent thereto S(i+1). When the length of M(i) is equal to or shorter than a prescribed length (for example, is the shortest mark), the recording parameter may be further classified by a combination including the length of a space immediately previous thereto S(i−1); more specifically, in accordance with whether S(i−1) is equal to or shorter than a prescribed length (for example, is the shortest space) or longer than the prescribed length.

The manner of the classification may be changed in accordance with the recording density (25 GB per layer, or 32 GB and/or 33.4 GB per layer) or the type of the recording medium (write once, rewritable, etc.).

When setting the pulse or the power level, the position and the width thereof may be adjusted by a unit of T/16 in any of the N-1 strategy, N/2 strategy and castle type write pulse waveform. Alternatively, such adjustment may be done more precisely, i.e., by a unit of T/32. This adjustment unit may be changed in accordance with the recording density (25 GB per layer, or 32 GB and/or 33.4 GB per layer) or the type of the storage medium (write once, rewritable, etc.). As the resolution at which the write pulse can be set is smaller, the recording mark can be fine-tuned more precisely. Therefore, the resolution at which the write pulse can be set is changed when a higher precision recording adjustment is desired. By setting the write pulse condition in accordance with the resolution at which the write pulses is set (more preferably, by setting the write pulse such that the resolution is smaller), a more appropriate recording mark can be formed.

As for the relation between these types of write waveforms and writing speeds, it could be said that the N/2 strategy write waveform is more suitable for high-speed writing than the N-1 strategy write waveform, and that the castle type write waveform is more suitable for high-speed writing than the N/2 strategy write waveform. This is because the N/2 strategy write waveform would require more frequent application of the recording power Pw, i.e., would take a greater total amount of time to make the pulses rise and fall, than the castle type write waveform, thus delaying the high-speed processing more significantly. The N-1 strategy write waveform would require more frequent application of the recording power Pw, i.e., would take a greater total amount of time to make the pulses rise and fall, than the N/2 strategy write waveform, thus delaying the high-speed processing more significantly. Considering this point, the writing conditions may be stored on an optical disc in the following manner.

First of all, if writing conditions for a 1× writing speed are stored, parameters about the N-1 strategy write waveform may be stored as indispensable ones but parameters about the second write waveform may be stored optionally, for example. Also, if the writing speed is 1×, the third write waveform may not be used, for example.

Also, if writing conditions for a 2× writing speed are stored, parameters about the N-1 strategy write waveform may be stored optionally, parameters about the N/2 strategy write waveform may be stored optionally, and parameters about the castle type write waveform may be stored optionally, for example. In addition, parameters about at least one of the N-1 strategy write waveform and the N/2 strategy write waveform may be stored as indispensable ones, for example.

Furthermore, if writing conditions for a 4× writing speed are stored, parameters about the castle type write waveform may be stored as indispensable ones, for example. Also, if the writing speed is 4×, neither the N-1 strategy write waveform nor the N/2 strategy write waveform may be used, for example.

Furthermore, if writing conditions for a 6× writing speed are stored, parameters about the castle type write waveform may be stored as indispensable ones, for example. Also, if the writing speed is 6×, neither the N-1 strategy write waveform nor the N/2 strategy write waveform may be used, for example.

Furthermore, if writing conditions for an 8× or higher writing speed are stored, the same rule as the 4× and 6× writing speeds may be applied, for example. That is to say, parameters about the castle type write waveform may be stored as indispensable ones. Also, if the writing speed is 6×, neither the N-1 strategy write waveform nor the N/2 strategy write waveform may be used, for example.

On top of that, when those writing conditions are stored, the contents to be stored may or may not be the same depending on whether the given disc is an HTL one (High to Low; having a lower reflectance in its recorded portions than in its unrecorded portions) or an LTH one (Low to High; having a higher reflectance in its recorded portions than in its unrecorded portions).

The write pulse condition may be set in accordance with the setting of the writing speed (recording linear velocity). When the recording is performed at a lower writing speed in the same optical conditions, the amount of information per unit area is increased and the recording density is raised. However, when the recording density is raised, the recording mark as the target of the adjustment is more liable to be influenced by the heat amount caused by the recording mark previous or subsequent thereto. For this reason, a more appropriate recording mark can be formed by setting the write pulse condition in accordance with the setting of the linear velocity (preferably, by setting the write pulse condition such that the linear velocity is lower).

(Blu-Ray Disc)

The present invention is applicable to various storage mediums including Blu-ray disc (BD) and other format optical discs. Herein, BD will be described in detail. BDs are classified according to the property of their recording film into various types. Examples of those various BDs include a BD-R (write-once) and a BD-RE (rewritable). And the present invention is applicable to any type of BD or an optical disc compliant with any other standard, no matter whether the storage medium is a ROM (read-only), an R (write-once) or an RE (rewritable). Main optical constants and physical formats for Blu-ray Discs are disclosed in "Blu-ray Disc Reader" (published by Ohmsha, Ltd.) and on White Paper at the website of Blu-ray Disc Association (http://www.bluraydisc.com), for example.

Specifically, as for a BD, a laser beam with a wavelength of approximately 405 nm (which may fall within the range of 400 nm to 410 nm supposing the tolerance of errors is ±5 nm with respect to the standard value of 405 nm) and an objective lens with an NA (numerical aperture) of approximately 0.85 (which may fall within the range of 0.84 to 0.86 supposing the tolerance of errors is ±0.01 with respect to the standard value of 0.85) are used. A BD has a track pitch of about 0.32 μm (which may fall within the range of 0.310 to 0.330 μm supposing the tolerance of errors is ±0.010 μm with respect to the standard value of 0.320 μm) and has one or two information storage layers. A BD has a single-sided single-layer or a single-sided dual-layer structure on the laser beam incident side, and its storage plane or storage layer is located at a depth of 75 μm to 100 μm as measured from the surface of the protective coating of the BD.

A write signal is supposed to be modulated by 17PP modulation technique. Recording marks are supposed to have the shortest mark length of 0.149 μm or 0.138 μm (which is the length of a 2T mark, where T is one cycle of a reference clock pulse and a reference period of modulation in a situation where a mark is recorded in accordance with a predetermined modulation rule), i.e., a channel bit length T of 74.50 nm or 69.00 nm. The BD has a storage capacity of 25 GB or 27 GB (more exactly, 25.025 GB or 27.020 GB) if it is a single-sided, single-layer disc but has a storage capacity of 50 GB or 54 GB (more exactly, 50.050 GB or 54.040 GB) if it is a single-sided, dual-layer disc.

The channel clock frequency is supposed to be 66 MHz (corresponding to a channel bit rate of 66.000 Mbit/s) at a standard BD transfer rate (BD 1×), 264 MHz (corresponding to a channel bit rate of 264.000 Mbit/s) at BD 4× transfer rate, 396 MHz (corresponding to a channel bit rate of 396.000 Mbit/s) at BD 6× transfer rate, and 528 MHz (corresponding to a channel bit rate of 528.000 Mbit/s) at BD 8× transfer rate.

And the standard linear velocity (which will also be referred to herein as "reference linear velocity" or "1×") is supposed to be 4.917 m/sec or 4.554 m/sec. The 2×, 4×, 6× and 8× linear velocities are 9.834 m/sec, 19.668 m/sec, 29.502 m/sec, and 39.336 m/sec, respectively. A linear velocity higher than the standard linear velocity is normally a positive integral number of times as high as the standard linear velocity. But the factor does not have to be an integer but may also be a positive real number. Optionally, a linear velocity that is lower than the standard linear velocity (such as a 0.5× linear velocity) may also be defined.

It should be noted that these parameters are those of single-layer or dual-layer BDs already on the market, which have a storage capacity of approximately 25 GB or approximately 27 GB per layer. To further increase the storage capacities of BDs, high-density BDs with a storage capacity of approximately 32 GB or approximately 33.4 GB per layer and three- or four-layer BDs have already been researched and developed. Hereinafter, exemplary applications of the present invention to such BDs will be described.

<Structure with Multiple Information Storage Layers>

Figure 38:
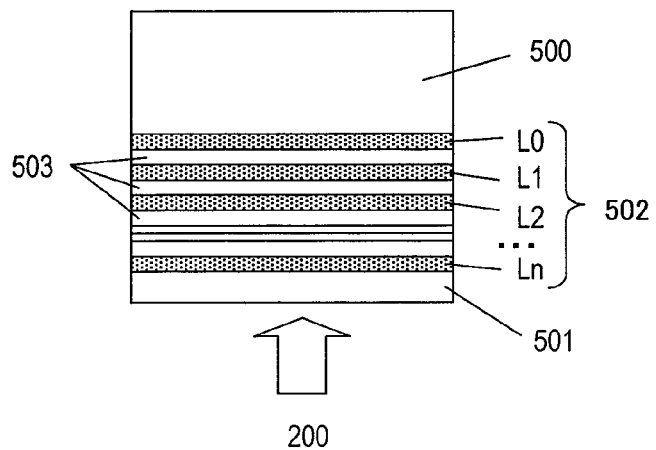
FIG. 38 is a schematic view showing an example of a structure of an information recording medium to which the present invention is applicable.
Figure 39:
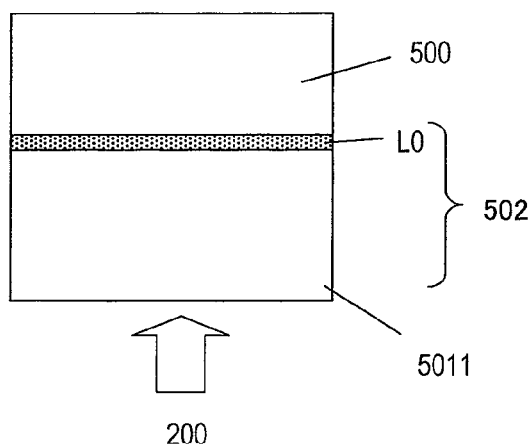
FIG. 39 is a schematic view showing a structure of a single layer information recording medium.
Figure 40:
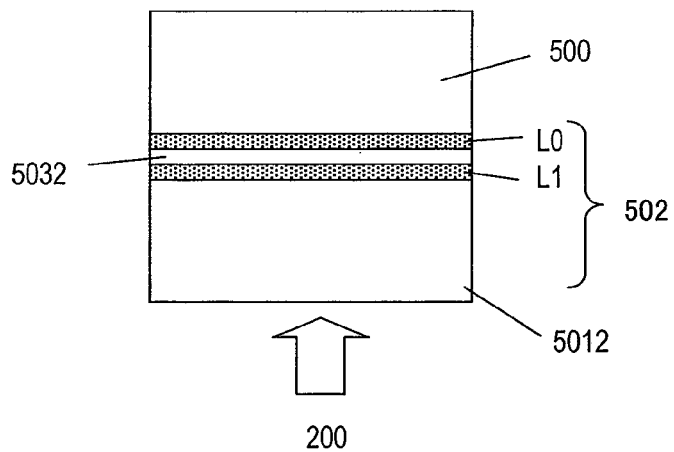
FIG. 40 is a schematic view showing a structure of a two-layer information recording medium.
Figure 41:
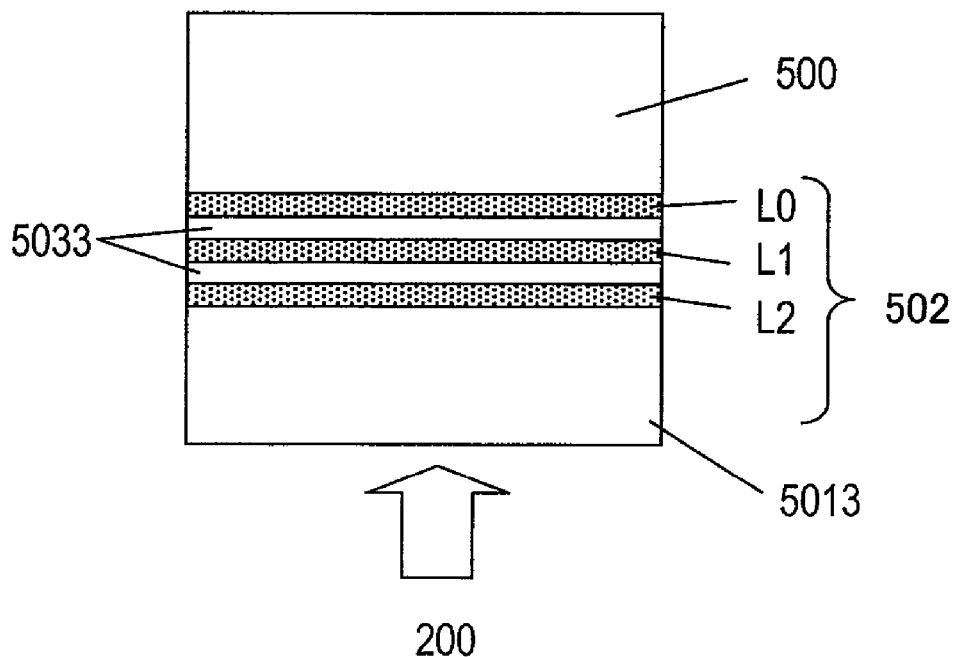
FIG. 41 is a schematic view showing a structure of a three-layer information recording medium.
Figure 42:
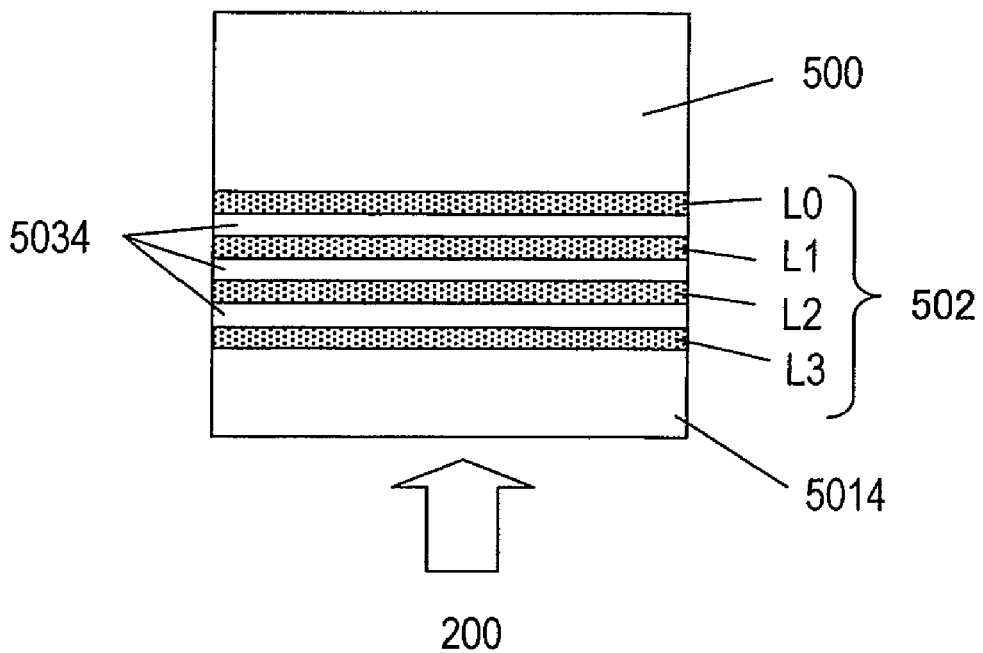
FIG. 42 is a schematic view showing a structure of a four-layer information recording medium.

For example, supposing the optical disc is a single-sided disc, from/on which information is read and/or written by having a laser beam incident on the protective coating (cover layer) side, if two or more information storage layers need to be provided, then those multiple information storage layers should be arranged between the substrate and the protective coating. An exemplary structure for such a multilayer disc is shown in FIG. 38. The optical disc shown in FIG. 38 has (n+1) information storage layers 502 (where n is an integer that is more than zero). Specifically, in this optical disc, a cover layer 501, (n+1) information storage layers (layers Ln through L0) 502, and a substrate 500 are stacked in this order on the surface on which a laser beam 200 is incident. Also, between each pair of adjacent ones of the (n+1) information storage layers 502, inserted as an optical buffering material is a spacer layer 503. That is to say, the reference layer L0 may be arranged at the deepest level that is located at a predetermined depth from the light incident surface (i.e., at the greatest distance from the light source). Multiple information storage layers L1, L2, . . . and Ln may be stacked one upon the other from over the reference layer L0 toward the light incident surface.

In this case, the depth of the reference layer L0 as measured from the light incident surface of the multi-layer disc may be equal to the depth (e.g., approximately 0.1 mm) of the only information storage layer of a single-layer disc as measured from the light incident surface. If the depth of the deepest layer (i.e., the most distant layer) is constant irrespective of the number of storage layers stacked (i.e., if the deepest layer of a multilayer disc is located at substantially the same distance as the only information storage layer of a single-layer disc), compatibility can be ensured in accessing the reference layer, no matter whether the given disc is a single-layer one or a multilayer one. In addition, even if the number of storage layers stacked increases, the influence of tilt will hardly increase. This is because although the deepest layer is affected by tilt most, the depth of the deepest layer of a multilayer disc is approximately the same as that of the only information storage layer of a single-layer disc, and does not increase in this case even if the number of storage layers stacked is increased.

As for the beam spot moving direction (which will also be referred to herein as a "tracking direction" or a "spiral direction"), the optical disc may be either a parallel path type or an opposite path type. In a disc of the parallel path type, the spot goes in the same direction on every layer, i.e., from some inner radial location toward the outer edge of the disc or from some outer radial location toward the inner edge of the disc on every information storage layer.

On the other hand, in a disc of the opposite path type, the spot moving directions are changed into the opposite one every time the layers to scan are changed from an information storage layer into an adjacent one. For example, if the spot on the reference layer L0 goes from some inner radial location toward the outer edge (which direction will be simply referred to herein as "outward"), then the spot on the information storage layer L1 will go from some outer radial location toward the inner edge (which direction will be simply referred to herein as "inward"), the spot on the information storage layer L2 will go outward, and so forth. That is to say, the spot on the information storage layer Lm (where m is either zero or an even number) will go outward but the spot on the information storage layer Lm+1 will go inward. Conversely, the spot on the information storage layer Lm (where m is either zero or an even number) will go inward but the spot on the information storage layer Lm+1 will go outward.

As for the thickness of the protective coating (cover layer), to minimize the influence of spot distortion due to either a decrease in focal length with an increase in numerical aperture NA or the tilt, the protective coating may have its thickness reduced. A numerical aperture NA is defined to be 0.45 for a CD, 0.65 for a DVD, but approximately 0.85 for a BD. For example, if the information storage medium has an overall thickness of approximately 1.2 mm, the protective coating may have a thickness of 10 μm to 200 μm. More specifically, a single-layer disc may include a transparent protective coating with a thickness of approximately 0.1 mm and a substrate with a thickness of approximately 1.1 mm. On the other hand, a dual-layer disc may include a protective coating with a thickness of approximately 0.075 mm, a spacer layer with a thickness of approximately 0.025 mm and a substrate with a thickness of approximately 1.1 mm.

<Configurations for Single- to Four-Layer Discs>

FIGS. 39, 40, 41 and 42 illustrate exemplary configurations for single-layer, dual-layer, three-layer and four-layer discs, respectively. As described above, if the distance from the light incident surface to the reference layer L0 is supposed to be constant, each of these discs may a total disc thickness of approximately 1.2 mm (but is more preferably 1.40 mm or less if there is a label printed) and the substrate 500 may have a thickness of approximately 1.1 mm. That is why the distance from the light incident surface to the reference layer L0 will be approximately 0.1 mm. In the single-layer disc shown in FIG. 39 (i.e., if n=0 in FIG. 38), the cover layer 5011 has a thickness of approximately 0.1 mm. In the dual-layer disc shown in FIG. 40 (i.e., if n=1 in FIG. 38), the cover layer 5012 has a thickness of approximately 0.075 mm and the spacer layer 5032 has a thickness of approximately 0.25 mm. And in the three-layer disc shown in FIG. 41 (i.e., if n=2 in FIG. 38) and in the four-layer disc shown in FIG. 42 (i.e., if n=3 in FIG. 38), the cover layer 5014 and/or the spacer layer 5034 may be even thinner.

Also, in a recorder/player that uses an optical head including an objective lens with a high NA, aberrations such as a spherical aberration to be produced due to the thickness from the light incident surface of the disc to the information storage layer will seriously affect the quality of a laser beam to be converged on the information storage layer. For that reason, such an apparatus is provided with means for correcting such aberrations to be produced due to the thickness.

To eliminate the aberration components such as a spherical aberration to be produced due to the thickness from the surface of the protective coating of an optical information storage medium to the information storage layer from/on which information is read or written, the aberration correcting means generates an aberration that will cancel the aberration component that has been produced by each information storage layer. Such an aberration correcting means is originally designed optically so as to reduce the aberration with respect to the information storage layer of a single-layer structure and also takes into account the aberration to be produced when a read/write operation is performed on an information storage medium with a dual-layer structure. The minimum aberration point designed is defined to be located at a depth of approximately 80-90 μm as measured from the surface of the protective coating. That is why if a read/write radiation needs to be focused on an information storage layer, of which the depth is not equal to the minimum aberration point, then an appropriate aberration correction value should be set for that information storage layer by controlling the aberration correcting means.

<BD's Physical Structure>

Figure 43:
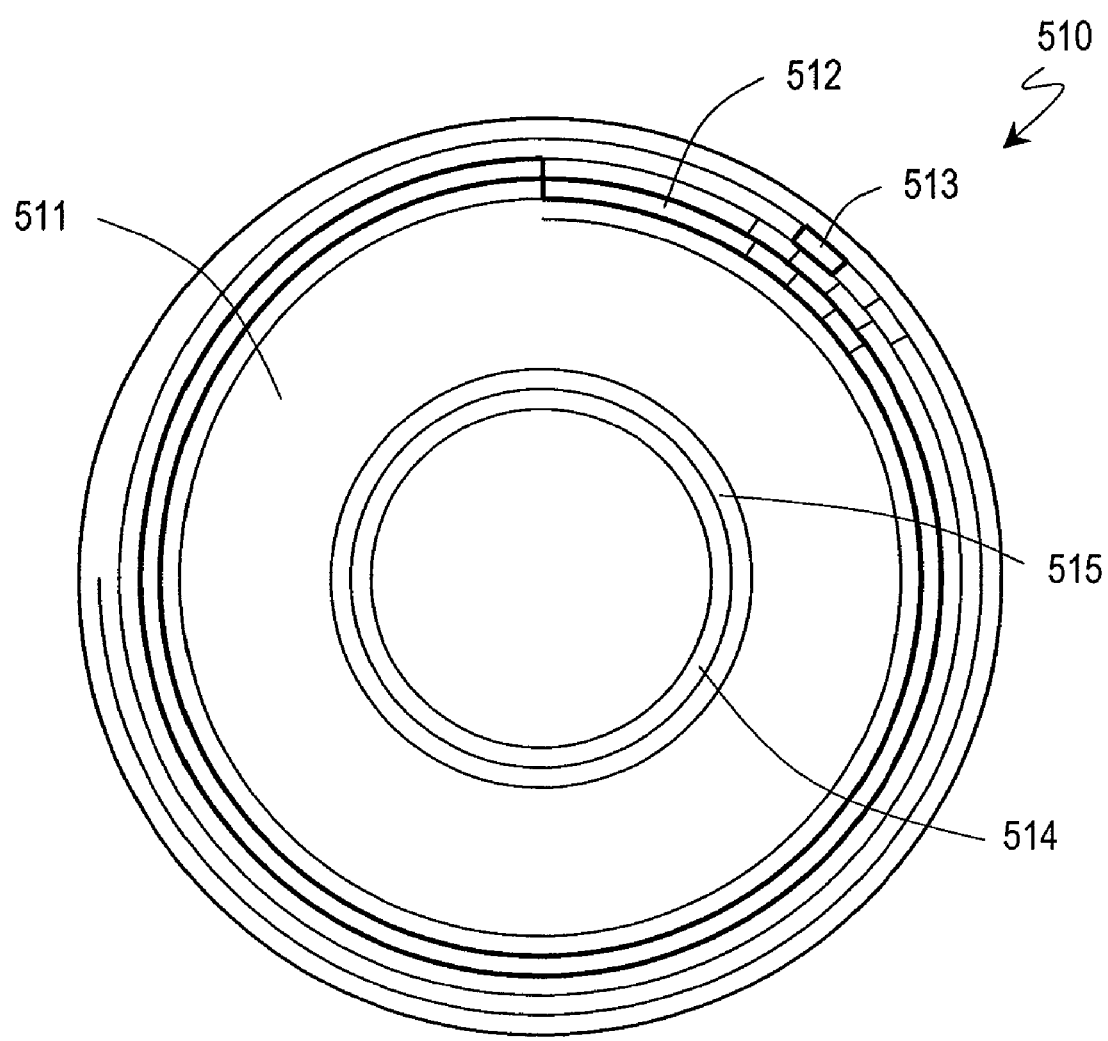
FIG. 43 is a schematic view showing a physical structure of an information recording medium.

FIG. 43 illustrates the physical structure of an optical disc 510 to which the present invention is applicable. On the discus-like optical disc 510, a lot of tracks 512 are arranged either concentrically or spirally. And each of those tracks 512 is subdivided into a lot of sectors. As will be described later, data is supposed to be written on each of those tracks 512 on the basis of a block 513 of a predetermined size. The data is actually written on a track as a data sequence, including a plurality of recording marks and a plurality of spaces provided between the plurality of recording marks, which is obtained by modulating information to be written.

The optical disc 510 includes a PIC (Permanent Information & Control data) area 514 and an OPC (Optimum Power Control) area 515 at an inner side. The OPC area 515 is used, before user data is recorded, for performing test recording to find the conditions such as a recording power and a write pulse sequence which are optimum for each information storage layer. The OPC area 515 is occasionally referred to as a "calibration area". In the OPC area 515, test recording is performed also for adjusting the fluctuations of the recording power or the write pulse sequence which are caused by an individual variance among optical disc apparatuses or environmental changes such as rapid temperature change, adhesion of stain or dust, or the like. The PIC area 514 is a reproduction-only area. In this area, disc management information is stored by modulating the grooves at high speed. As the disc management information, OPC parameters required for finding the optimum recording power, write strategy type, recommended values of timing, length, etc. of laser pulse generation (recording conditions described in Embodiments 1 and 2), recording linear speed, reproduction power, version No. and the like are stored.

The optical disc 510 has a greater storage capacity per information storage layer than a conventional optical disc (such as a 25 GB BD). The storage capacity is increased by increasing the storage linear density, e.g., by shortening the mark length of recording marks to be left on the optical disc, for example. As used herein, "to increase the storage linear density" means shortening the channel bit length, which is a length corresponding to one cycle time T of a reference clock signal (i.e., a reference cycle time T of modulation in a situation where marks are recorded by a predetermined modulation rule). The optical disc 510 may have multiple information storage layers. In the following description, however, only one information storage layer thereof will be described for convenience sake. In a situation where there are multiple information storage layers in the same optical disc, even if the tracks have the same width between the respective information storage layers, the storage linear densities could also be different from one layer to another by uniformly varying the mark lengths on a layer-by-layer basis.

Each track 512 is divided into a lot of blocks 513 every 64 kB (kilobytes), which is the data storage unit. And those blocks are given sequential block addresses. Each of those blocks 513 is subdivided into three subblocks, each having a predetermined length. The three subblocks are assigned subblock numbers of 0, 1 and 2 in this order.

<Storage Density>

Hereinafter, the storage density will be described with reference to FIGS. 44, 45, 46 and 47.

Figure 44:
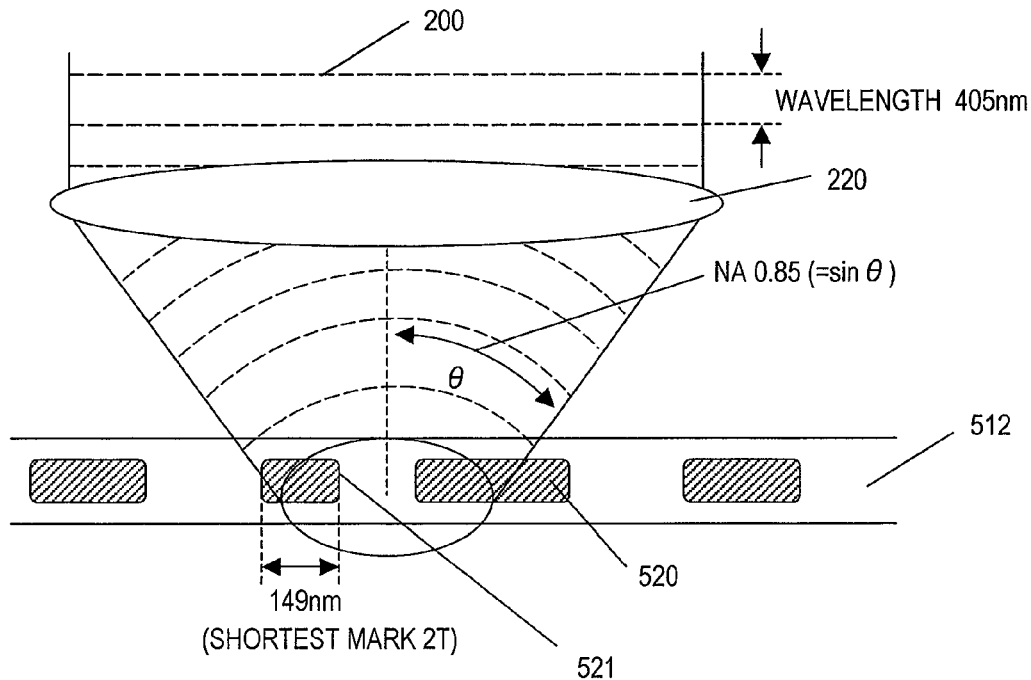
FIG. 44 is a schematic view showing an optical spot of a laser beam and marks recorded on a track.

FIG. 44 illustrates an example of a 25 GB BD, for which the laser beam 200 is supposed to have a wavelength of 405 nm and the objective lens 220 is supposed to have a numerical aperture (NA) of 0.85.

As in a DVD, data is also written on the track 512 of a BD as a series of marks 520, 521 that are produced as a result of a physical variation. The shortest one of this series of marks will be referred to herein as the "shortest mark". In FIG. 44, the mark 521 is the shortest mark.

In a BD with a storage capacity of 25 GB, the shortest mark 521 has a physical length of 0.149 μm, which is approximately 1/2.7 of the shortest mark of a DVD. And even if the resolution of a laser beam is increased by changing the parameters of an optical system such as the wavelength (405 nm) and the NA (0.85), this value is still rather close to the limit of optical resolution, below which recording marks are no longer recognizable for the light beam.

Figure 46:
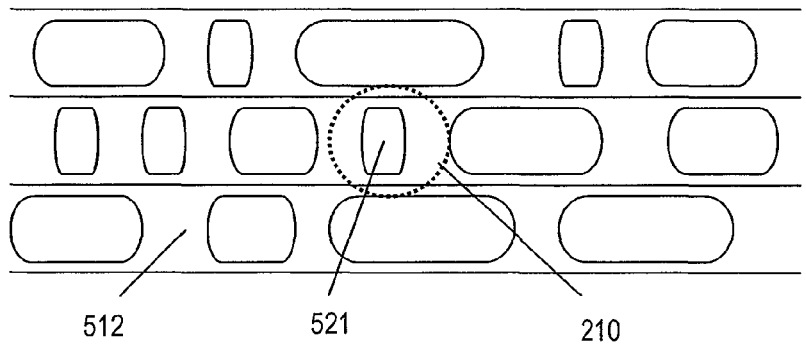
FIG. 46 shows how a mark sequence recorded on a track is irradiated with a light beam.

FIG. 46 illustrates a state where a light beam spot has been formed on the series of recording marks on the track 512. In a BD, the light beam spot 210 has a diameter of about 0.39 μm, which may vary with parameters of the optical system. If the storage linear density is increased without changing the structures of the optical system, then the recording marks will shrink for the same spot size of the light beam spot 210 and the read resolution will decrease.

Figure 45:
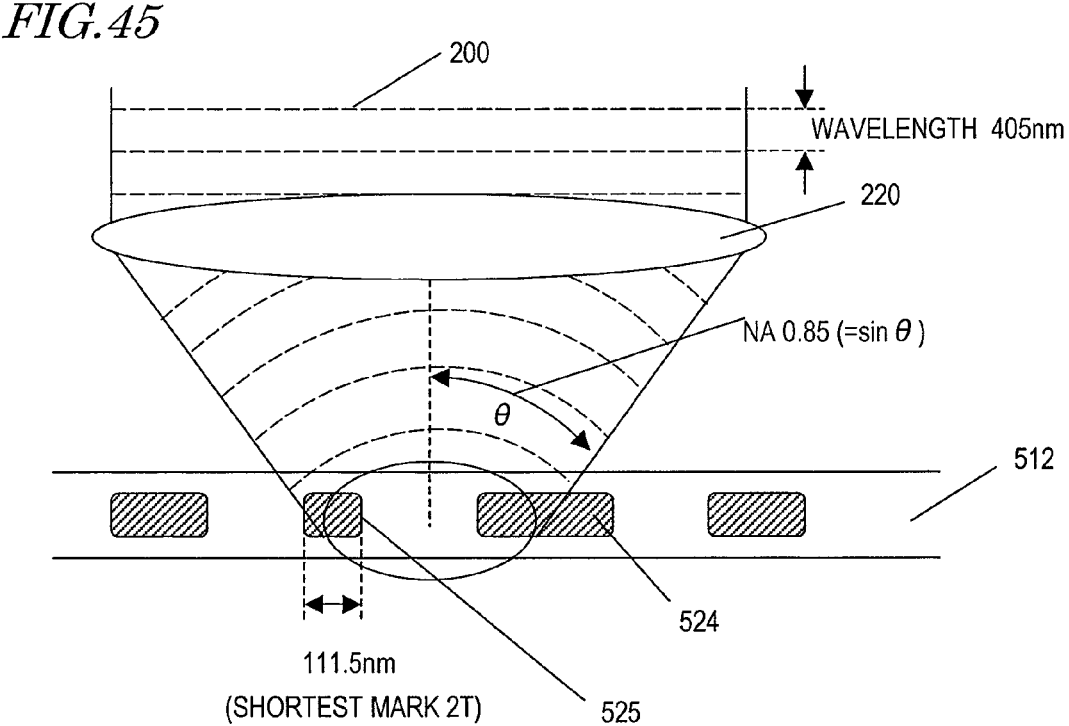
FIG. 45 is another schematic view showing an optical spot of a laser beam and marks recorded on a track.

On the other hand, FIG. 45 illustrates an example of an optical disc with an even higher storage density than a 25 GB BD. But even for such a disc, the laser beam 200 is also supposed to have a wavelength of 405 nm and the objective lens 220 is also supposed to have a numerical aperture (NA) of 0.85. Among the series of marks 524, 525 of such a disc, the shortest mark 525 has a physical length of 0.1115 μm. Compared to FIG. 44, the spot size remains approximately 0.39 μm but both the recording marks and the interval between the marks have shrunk. As a result, the read resolution will decrease.

The shorter a recording mark is, the smaller the amplitude of a read signal to be generated when the recording mark is scanned with a light beam. And the amplitude goes zero when the mark length gets equal to the limit of optical resolution. The inverse number of one period of these recording marks is called a "spatial frequency" and a relation between the spatial frequency and the signal amplitude is called an "optical transfer function (OTF)". As the spatial frequency rises, the signal amplitude decreases almost linearly. And the readable limit at which the amplitude of the signal goes zero is called an OTF cutoff.

Figure 47:
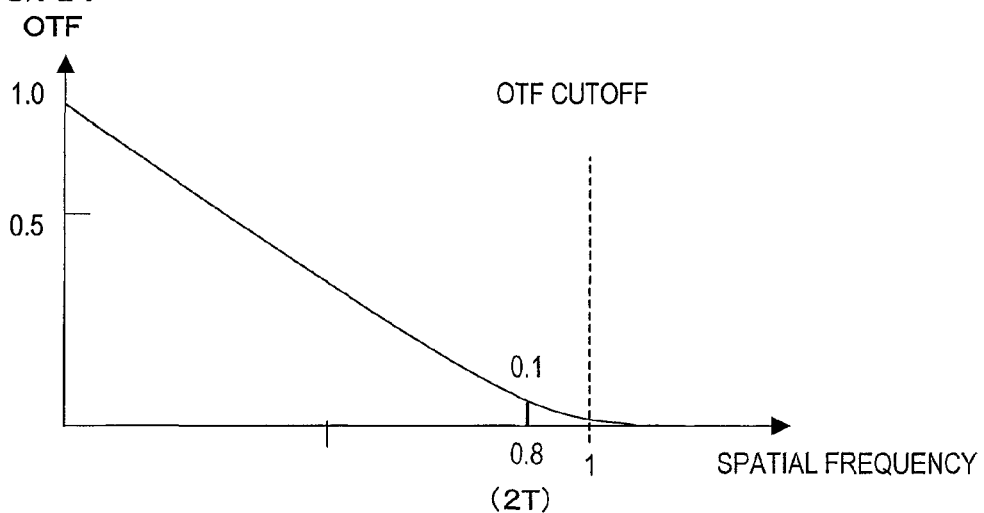
FIG. 47 is a graph showing the relationship between the OTF and the shortest recording mark.

FIG. 47 is a graph showing how the OTF of a BD with a storage capacity of 25 GB changes with the shortest recording mark length. The spatial frequency of the shortest mark on a BD is approximately 80% of, and is rather close to, the OTF cutoff frequency. It can also be seen that a read signal representing the shortest mark has amplitude that is as small as approximately 10% of the maximum detectable amplitude. The storage capacity at which the spatial frequency of the shortest mark on a BD is very close to the OTF cutoff frequency (i.e., the storage capacity at which the read signal has almost no amplitude) corresponds to approximately 31 GB in a BD. When the frequency of the read signal representing the shortest mark comes close to, or exceeds, the OTF cutoff frequency, the limit of optical resolution may have been reached or even surpassed for the laser beam. As a result, the read signal comes to have decreased amplitude and the SNR drops steeply.

That is why the high storage density optical disc shown in FIG. 45 would have its storage linear density defined by the frequency of the read signal representing the shortest mark, which may be in the vicinity of the OTF cutoff frequency (i.e., it is lower than, but not significantly lower than, the OTF cutoff frequency) or higher than the OTF cutoff frequency.

Figure 48:
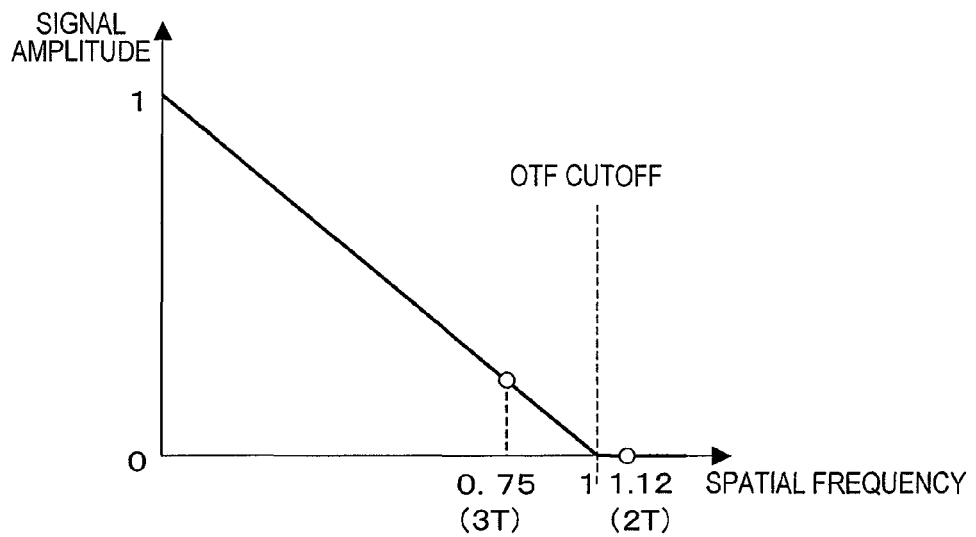
FIG. 48 is another graph showing the relationship between the OTF and the shortest recording mark.

FIG. 48 is a graph showing how the signal amplitude changes with the spatial frequency in a situation where the spatial frequency of the shortest mark (2T) is higher than the OTF cutoff frequency and where the 2T read signal has zero amplitude. In FIG. 48, the spatial frequency of the shortest mark 2T is 1.12 times as high as the OTF cutoff frequency.

<Relation Between Wavelength, NA and Mark Length>

An optical disc with high storage density needs to satisfy the following relation between the wavelength, the numerical aperture, and the mark/space lengths.

Supposing the shortest mark length is TM nm and the shortest space length is TS nm, the sum P of the shortest mark length and the shortest space length is TM+TS nm. In the case of 17 modulation, P=2T+2T=4T. Using the three parameters of the wavelength λ of the laser beam (which is 405 nm±5 nm, i.e., in the range of 400 nm to 410 nm), the numerical aperture NA (which is 0.85±0.01, i.e., in the range of 0.84 to 0.86) and the sum P of the shortest mark length and the shortest space length (where P=2T+2T=4T in the case of 17 modulation, in which the shortest length is 2T), if the unit length T decreases to the point that the inequality $$P \leq \lambda/2NA$$

is satisfied, then the spatial frequency of the shortest mark exceeds the OTF cutoff frequency.

If NA=0.85 and λ=405, then the unit length T corresponding to the OTF cutoff frequency is calculated by $$T=405/(2\times0.85)/4=59.558 \text{ nm}$$

Conversely, if P>λ/2NA is satisfied, then the spatial frequency of the shortest mark becomes lower than the OTF cutoff frequency.

As can be seen easily, just by increasing the storage linear density, the SNR would decrease due to the limit of optical resolution. That is why if the number of information storage layers per disc were increased excessively, then the decrease in SNR might be an impermissible degree, considering the system margin. Particularly around a point where the frequency of the shortest recording mark exceeds the OTF cutoff frequency, the SNR will start to decrease steeply.

In the foregoing description, the storage linear density has been described by comparing the frequency of the read signal representing the shortest mark to the OTF cutoff frequency. However, if the storage density of BDs is further increased, then the storage density (and the storage linear density and the storage capacity) can be defined based on the same principle as what has just been described by reference to the relation between the frequency of the read signal representing the second shortest mark (or the third shortest mark or an even shorter recording mark) and the OTF cutoff frequency.

<Storage Density and Number of Layers>

A BD, of which the specifications include a wavelength of 405 m and a numerical aperture of 0.85, may have one of the following storage capacities per layer. Specifically, if the spatial frequency of the shortest marks is in the vicinity of the OTF cutoff frequency, the storage capacity could be approximately equal to or higher than 29 GB (such as 29.0 GB±0.5 GB or 29 GB±1 GB), approximately equal to or higher than 30 GB (such as 30.0 GB±0.5 GB or 30 GB±1 GB), approximately equal to or higher than 31 GB (such as 31.0 GB±0.5 GB or 31 GB±1 GB), or approximately equal to or higher than 32 GB (such as 32.0 GB±0.5 GB or 32 GB±1 GB).

On the other hand, if the spatial frequency of the shortest marks is equal to or higher than the OTF cutoff frequency, the storage capacity per layer could be approximately equal to or higher than 32 GB (such as 32.0 GB±0.5 GB or 32 GB±1 GB), approximately equal to or higher than 33 GB (such as 33.0 GB±0.5 GB or 33 GB±1 GB), approximately equal to or higher than 33.3 GB (such as 33.3 GB±0.5 GB or 33.3 GB±1 GB), approximately equal to or higher than 33.4 GB (such as 33.4 GB±0.5 GB or 33.4 GB±1 GB), approximately equal to or higher than 34 GB (such as 34.0 GB±0.5 GB or 34 GB±1 GB) or approximately equal to or higher than 35 GB (such as 35.0 GB±0.5 GB or 35 GB±1 GB).

In this case, if the storage density per layer is 33.3 GB, an overall storage capacity of approximately 100 GB (more exactly, 99.9 GB) is realized by the three storage layers combined. On the other hand, if the storage density per layer is 33.4 GB, an overall storage capacity that is more than 100 GB (more exactly, 100.2 GB) is realized by the three storage layers combined. Such a storage capacity is almost equal to the capacity in a situation where four storage layers, each having a storage density of 25 GB, are provided for a single BD. For example, if the storage density per layer is 33 GB, the overall storage capacity is 33×3=99 GB, which is just 1 GB (or less) smaller than 100 GB. On the other hand, if the storage density per layer is 34 GB, the overall storage capacity is 34×3=102 GB, which is 2 GB (or less) larger than 100 GB. Furthermore, if the storage density per layer is 33.3 GB, the overall storage capacity is 33.3×3=99.9 GB, which is only 0.1 GB (or less) smaller than 100 GB. And if the storage density per layer is 33.4 GB, the overall storage capacity is 33.4×3=100.2 GB, which is just 0.2 GB (or less) larger than 100 GB.

It should be noted that if the storage density were increased significantly, then it would be difficult to perform a read operation accurately because the shortest marks should be read under rather severe conditions. That is why a realistic storage density that would realize an overall storage capacity of 100 GB or more without increasing the storage density too much would be approximately 33.4 GB per layer.

In this case, the optical disc may have either a four-layer structure with a storage density of 25 GB per layer or a three-layer structure with a storage density of 33-34 GB per layer. If the number of information storage layers stacked in a disc is increased, however, the read signal obtained from each of those layers will have decreased amplitude (or a decreased SNR) and stray layer will also be produced from those layers (i.e., the read signal obtained from each information storage layer will be affected by a signal obtained from an adjacent layer). For that reason, if a three-layer disc with a storage density of 33-34 GB per layer is adopted instead of a four-layer disc with a storage density of 25 GB per layer, then an overall storage capacity of approximately 100 GB will be realized by the smaller number of layers (i.e., three instead of four) with the influence of such stray light minimized. That is why a disc manufacturer who'd like to realize an overall storage capacity of approximately 100 GB while minimizing the number of information storage layers stacked would prefer a three-layer disc with a storage density of 33-34 GB per layer. On the other hand, a disc manufacturer who'd like to realize an overall storage capacity of approximately 100 GB using the conventional format as it is (i.e., a storage density of 25 GB per layer) could choose a four-layer disc with a storage density of 25 GB per layer. In this manner, manufacturers with different needs could achieve their goals using mutually different structures, and, and therefore, are afforded an increased degree of flexibility in disc design.

Alternatively, if the storage density per layer is in the 30-32 GB range, the overall storage capacity of a three-layer disc will be short of 100 GB (i.e., approximately 90-96 GB) but that of a four-layer disc will be 120 GB or more. Among other things, if the storage density per layer is approximately 32 GB, a four-layer disc will have an overall storage capacity of approximately 128 GB, which is the seventh power of two that would be processed easily and conveniently by a computer. On top of that, compared to the overall storage capacity of approximately 100 GB realized by a three-layer disc, even shortest marks could also be read under less severe conditions.

That is why when the storage density needs to be increased, a number of different storage densities per layer (such as approximately 32 GB and approximately 33.4 GB) are preferably offered as multiple options so that a disc manufacturer can design a disc more flexibly by adopting one of those multiple storage densities and any number of storage layers in an arbitrary combination. For example, a manufacturer who'd like to increase the overall storage capacity while minimizing the influence of multiple layers stacked is offered an option of making a three-layer disc with an overall storage capacity of approximately 100 GB by stacking three storage layers with a storage density of 33-34 GB per layer. On the other hand, a manufacturer who'd like to increase the overall storage capacity while minimizing the impact on read performance is offered an option of making a four-layer disc with an overall storage capacity of approximately 120 GB or more by stacking four storage layers with a storage density of 30-32 GB per layer.

Whichever of these two structures may be adopted for a BD, the present invention is preferably usable for adjusting the recording conditions of the recording marks to be written on the BD.

As described above, even when the number of information storage layers is increased, the position of the information storage layer L0 farthest from the light incidence surface is not changed. Therefore, as the number of the information storage layers is increased, the distance between the information storage layers is decreased and the inter-layer crosstalk is increased. As a result, the reproduction signal fluctuates locally or entirely. This fluctuation does not rely on the length of the recording mark in the same information storage layer. However, as the recording mark is shorter, the influence of the fluctuation increases. For this reason, it is preferable that as the recording mark is shorter, the adjustment precision on the recording mark is higher.

Accordingly, when the present invention is applied to a multi-layer BD, a more appropriate recording mark can be formed by setting the write pulse conditions in accordance with the number of the information storage layers or the distance between the information storage layers in the information storage medium. When the number of the information storage layers increases, the reflectance of each information storage layer needs to be decreased. Therefore, the present invention may be applied when the reflectance is low.

The write pulse conditions may be set in accordance with the recording power setting range used for recording information on the information storage layer. The recording power setting range defined by the peak power or the like can be changed in accordance with the number of the information storage layers. The reason for this is that the intensity of the laser light to be transmitted through the information storage layers needs to be changed in accordance with the number of the information storage layers. Where the recording is performed at the same speed, as the recording power increases, the variance in recording is larger due to the response characteristics of laser. Accordingly, it is preferable that as the recording power increases, the recording adjustment is performed at higher precision.

For example, the upper limit of the power value set for an information storage medium including two information storage layers can be set to be larger than the upper limit of the power value set for an information storage medium including one information storage layer. Similarly, the upper limit of the power value set for an information storage medium including three information storage layers can be set to be larger than the upper limit of the power value set for an information storage medium including two information storage layers. The upper limit of the power value set for an information storage medium including four information storage layers can be set to be larger than the upper limit of the power value set for an information storage medium including three information storage layers.

Accordingly, when the present invention is applied to a multi-layer BD, a more appropriate recording mark can be formed by setting the write pulse conditions in accordance with the recording power setting range of the information storage medium.

The present invention is applicable to various types of recording mediums, on which a data signal can be recorded by laser light, an electromagnetic force or the like, for example, DVD-RAM, BD-RE or other information recording mediums; and also to a recording operation or other uses in a recording/reproduction apparatus for performing recording on or reproduction from the above information recording medium, for example, a DVD driver, a DVD recorder, a BD recorder or other apparatuses.

what is claimed is:

1. An information recording medium, comprising:
  a track on which a data sequence including a plurality of recording marks and a plurality of spaces provided between the plurality of recording marks is recordable; and
  a recording condition recording area in which a recording condition of recording pulses for recording the data sequence on the track is recordable;
  wherein:
  where a recording mark which is included in the data sequence and is to be formed on the track based on the recording condition is a first recording mark,
  when a length of the first recording mark is longer than a prescribed length, the recording condition of the recording pulses for recording the first recording mark is classified using only a combination of the length of the first recording mark and a length of a first space located adjacently previous or subsequent to the first recording mark, and
  when the length of the first recording mark is equal to or shorter than the prescribed length, all the recording conditions of the recording pulses for recording the first recording mark are classified using only a combination of the length of the first recording mark, the length of the first space, and a length of a second space not located adjacent to the first space and located adjacent to the first recording mark.

2. The information recording medium of claim 1, wherein in the classification performed using a combination of the length of the first recording mark, the length of the first space, and the length of the second space, the number of types of the lengths of the first space is larger than the number of types of the lengths of the second space.

3. A recording apparatus for recording a data sequence, including a plurality of recording marks and a plurality of spaces provided between the plurality of recording marks, on an information recording medium based on a recording condition of recording pulses recorded on the information recording medium, the recording apparatus comprising:
  a reproduction signal processing section for irradiating the information recording medium with laser light to reproduce the recording condition; and
  a recording control section for recording information on the information recording medium based on the recording condition;
  wherein:
  where a recording mark which is included in the data sequence and is to be formed on the track based on the recording condition is a first recording mark,
  when a length of the first recording mark is longer than a prescribed length, the recording condition of the recording pulses for recording the first recording mark is classified using only a combination of the length of the first recording mark and a length of a first space located adjacently previous or subsequent to the first recording mark; and
  when the length of the first recording mark is equal to or shorter than the prescribed length, all the recording conditions of the recording pulses for recording the first recording mark are is classified using only a combination of the length of the first recording mark, the length of the first space, and a length of a second space not located adjacent to the first space and located adjacent to the first recording mark.

4. An evaluation apparatus for evaluating an information recording medium having a recording parameter of recording pulses recorded thereon, the recording parameter being for recording a data sequence including a plurality of recording marks and a plurality of spaces provided between the plurality of recording marks; wherein:
  where a recording mark which is included in the data sequence and is to be formed on the track based on the recording condition is a first recording mark,
  when a length of the first recording mark is longer than a prescribed length, the recording parameter of the recording pulses for recording the first recording mark is classified using only a combination of the length of the first recording mark and a length of a first space located adjacently previous or subsequent to the first recording mark, and
  when the length of the first recording mark is equal to or shorter than the prescribed length, all the recording parameters of the recording pulses for recording the first recording mark are is-classified using only a combination of the length of the first recording mark, the length of the first space, and a length of a second space not located adjacent to the first space and located adjacent to the first recording mark; and the evaluation apparatus comprises a reproduction signal processing section for generating a digital signal from a signal reproduced from the information recording medium using a PRML signal processing system, decoding a binary signal from the digital signal, calculating a differential metric, which is a difference of the reproduction signal from each of a most likely first state transition sequence and a most likely second state transition sequence, from the binary signal and detecting each differential metric as an edge shift, and determining whether or not the information recording medium fulfills a prescribed quality based on the edge shifts.

5. A recording/reproduction apparatus for performing at least one of reproduction from and recording on an information recording medium determined by the evaluation apparatus of claim 4 as fulfilling the prescribed quality.

6. The information recording medium of claim 2, wherein the prescribed length is a length of a shortest recording mark in the data sequence, and the number of types of the lengths of the second space is two and obtained by classification performed using only a length of a shortest space and only the length of a space that has longer length than the shortest length in the data sequence.

7. The information recording medium of claim 6, wherein:
when the recording condition of the recording pulses is a recording condition of a parameter for adjusting a position of a leading edge of the first recording mark, the first space is a space that is located adjacently previous to the first recording mark; and the second space is a space that is located adjacently subsequent to the first recording mark, and when the recording condition of the recording pulses is a recording condition of a parameter for adjusting a position of a trailing edge of the first recording mark, the first space is a space that is located adjacently subsequent to the first recording mark; and the second space is a space that is located adjacently previous to the first recording mark.

8. The information recording medium of claim 7, wherein all the recording conditions of the recording pulses are a rise edge position dTps2 and a fall edge position dTpe2 of the first pulse for adjusting the leading edge of the recording mark, and a recording end position offset dCp2 for adjusting the trailing edge of the recording mark.

9. The information recording medium of claim 1, wherein:
where the length of the first recording mark is equal to or shorter than the prescribed length;

when the recording condition of the recording pulses is a recording condition of a parameter for adjusting a position of a leading edge of the first recording mark, the first space is a space that is located adjacently previous to the first recording mark; and the second space is a space that is located adjacently subsequent to the first recording mark, when the recording condition of the recording pulses is a recording condition of a parameter for adjusting a position of a trailing edge of the first recording mark, the first space is a space that is located adjacently subsequent to the first recording mark; and the second space is a space that is located adjacently previous to the first recording mark, in the classification performed using a combination of the length of the first recording mark, the length of the first space, and the length of the second space;

a number of types of the lengths of the first space is the same between the leading edge and the trailing edge, a number of types of the lengths of the second space is the same between the leading edge and the trailing edge, and the number of types of the lengths of the first space is larger than the number of types of the lengths of the second space.

* * * * *

UNITED STATES PATENT AND TRADEMARK OFFICE
CERTIFICATE OF CORRECTION

| | | |
|---|---|---|
| PATENT NO. | : 8,289,829 B2 | |
| APPLICATION NO. | : 12/570063 | |
| DATED | : October 16, 2012 | |
| INVENTOR(S) | : Isao Kobayashi, Atsushi Nakamura and Yasumori Hino | |

It is certified that error appears in the above-identified patent and that said Letters Patent is hereby corrected as shown below:

Column 54, line 44, "recording mark are is classified" should read -- recording mark are classified --.

Column 55, line 1, "recording mark are is-classified" should read -- recording mark are classified --.

Signed and Sealed this
First Day of January, 2013

David J. Kappos
*Director of the United States Patent and Trademark Office*